US006009177A

United States Patent [19]
Sudia

[11] Patent Number: 6,009,177
[45] Date of Patent: Dec. 28, 1999

[54] ENHANCED CRYPTOGRAPHIC SYSTEM AND METHOD WITH KEY ESCROW FEATURE

[75] Inventor: Frank Wells Sudia, New York, N.Y.

[73] Assignee: Certco LLC, New York, N.Y.

[21] Appl. No.: 08/802,603

[22] Filed: Feb. 19, 1997

Related U.S. Application Data

[60] Division of application No. 08/272,203, Jul. 8, 1994, abandoned, which is a continuation-in-part of application No. 08/181,859, Jan. 13, 1994, abandoned.

[51] Int. Cl.[6] .................................................. H04L 9/32
[52] U.S. Cl. ............................................. 380/25; 380/30
[58] Field of Search .................................. 380/30, 4, 25, 380/49

[56] References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,558,176 | 12/1985 | Arnold et al. ................................ 380/4 |
| 4,771,461 | 9/1988 | Matyas ..................................... 380/24 |
| 4,868,877 | 9/1989 | Fischer . |
| 4,995,082 | 2/1991 | Schnorr . |
| 5,001,752 | 3/1991 | Fischer . |
| 5,005,200 | 4/1991 | Fischer . |
| 5,136,643 | 8/1992 | Fischer . |
| 5,150,411 | 9/1992 | Maurer . |
| 5,164,988 | 11/1992 | Matyas et al. . |
| 5,199,070 | 3/1993 | Matsuzaki et al. . |
| 5,214,700 | 5/1993 | Pinkas et al. . |
| 5,214,702 | 5/1993 | Fischer . |
| 5,222,140 | 6/1993 | Beller et al. . |
| 5,261,002 | 11/1993 | Perlman et al. . |
| 5,276,737 | 1/1994 | Micali . |
| 5,313,521 | 5/1994 | Torii et al. . |
| 5,315,658 | 5/1994 | Micali . |
| 5,499,295 | 3/1996 | Cooper ..................................... 380/23 |
| 5,787,172 | 7/1998 | Arnold ..................................... 380/21 |

OTHER PUBLICATIONS

American National Standard X9.30, "Public Key Cryptography Using Irreversible Algorithms for the Financial Services Industry: Part 1: The Digital Signature Algorithm (DSA)" (American Bankers Assn., Washington, D.C., 1993).

American National Standard X9.30, "Public Key Cryptography Using Irreversible Algorithms for the Financial Services, Industry: Part 2: The Secure Hash Algorithm (SHA)" (American Bankers Assn., Washington, D.C., 1993).

American National Standard X9.30, "Public Key Cryptography Using Irreversible Algorithms for the Financial Services, Industry: Part 3: Certificate Management for DSA" (American Bankers Assn., Washington, D.C., 1993).

Silvio Micali, "Fair Public Key Cryptosystems", Laboratory for Computer Science of the Massachusetts Institute of Technology,. Oct. 13, 1993.

Donn B. Parker, "Crypto and Avoidance of Business Information Anarchy" First Annual AC Conference on Computer and Communication Security, Nov. 3–5, 1993, Reston, VA.

(List continued on next page.)

*Primary Examiner*—Gilberto Barrón, Jr.
*Attorney, Agent, or Firm*—Steptoe & Johnson LLP

[57] ABSTRACT

The invention provides a cryptographic system and method with a key escrow feature that uses a method for verifiably splitting users' private encryption keys into components and for sending those components to trusted agents chosen by the particular users, and provides a system that uses modern public key certificate management, enforced by a chip device that also self-certifies. The methods for key escrow and receiving an escrow certificate are also applied herein to a more generalized case of registering a trusted device with a trusted third party and receiving authorization from that party enabling the device to communicate with other trusted devices. Further preferred embodiments provide for rekeying and upgrading of device firmware using a certificate system, and encryption of stream-oriented data.

18 Claims, 25 Drawing Sheets

OTHER PUBLICATIONS

CCITT Recommendation X.509, "The Directory—Authentication Framework", International Standards Organization (ISO), Melbourne, Australia 1988.

Dorothy E. Denning, "The Clipper Encryption System", American Scientist, Jul.–Aug., 1993, pp. 319–323.

Martin E. Hellman, "Commercial Encryption", IEEE Network Magazine, Apr. 1987, vol. 1, No. 2, pp. 6–10.

David B. Newman, Jr., Jim K. Omura and Raymond L. Pickholtz, "Public Key Management for Network Security", IEEE Network Magazine, Apr. 1987, vol. 1, No. 2, pp. 11–16.

IBM Technical Disclosure Bulletin, "Cyrptographic Microcode Loading Controller for Secure Function", vol. 34, No. 4B, Sep. 1991, pp. 34–36.

DIFFIE-HELLMAN AND MICALI ABBREVIATIONS

| x | RECIPIENTS PRIVATE KEY (EXPONENT) |
|---|---|
| x1...n | NUMBERED FRAGMENTS OF PRIVATE KEY |
| xi | i-th FRAGMENT OF PRIVATE KEY |
| y | SENDER'S EPHEMERAL PRIVATE KEY (EXPONENT) |
| a | PUBLIC BASE NUMBER |
| P | PUBLIC PRIME MODULUS NUMBER |
| DHx | INTERMEDIATE NUMBER, $= a^x \bmod P$ |
| DHy | INTERMEDIATE NUMBER, $= a^y \bmod P$ |
| Kdh | DIFFIE-HELLMAN DERIVED MESSAGE KEY |
| V1...n | MICALI INTERMEDIATE NUMBER, $= a^{xi} \bmod P$ |

OTHER SYMMETRIC KEY ABBREVIATIONS

| $k_{msg}$ | RANDOM OR DERIVED MESSAGE KEY |
|---|---|
| M | PLAINTEXT MESSAGE |
| C | CIPHERTEXT MESSAGE |

FIG. 1A

FIG. 1B GENERAL ASSYMETRIC KEY NOTATION

|  | PUBLIC | PRIVATE |
|---|---|---|
| SIGNATURE | KS+ | KS− |
| ENCRYPTION | KE+ | KE− |

FIG. 1C PUBLIC KEY CERTIFICATE NOTATION (EXAMPLE)

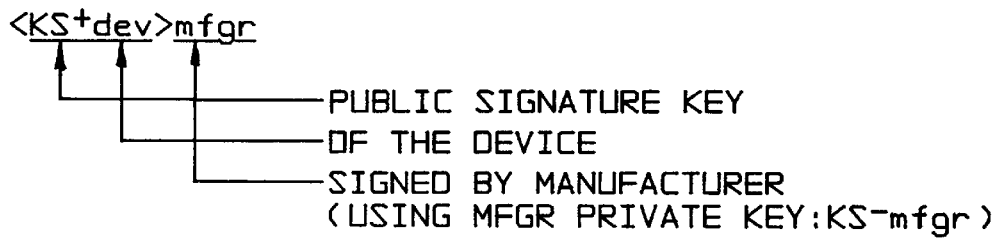

FIG. 1D
PUBLIC KEY ENCRYPTION NOTATION (EXAMPLE)

$$(\underline{\text{MESSAGE}}) \underline{KE^+_{recip}}$$

- MESSAGE TO BE ENCRYPTED USING
- PUBLIC ENCRYPTION KEY
- OF THE RECIPIENT

FIG. 1E
SUFFIXES USED TO DENOTE KEY OWNERSHIP

| box       | LAW ENFORCEMENT DECODER BOX |
| ca1...n   | CERTIFYING AUTHORITY (FOR PUBLIC SIGNATURE KEYS) |
| dev       | DTRUSTED DEVICE |
| ea1...n   | ESCROW AGENT |
| ec1...n   | ESCROW CENTER |
| mfg1...n  | MANUFACTURER OF THE TRUSTED DEVICE |
| owner     | OWNER OF DEVICE (IF OTHER THAN USER) |
| recip     | RECIPIENT OF A MESSAGE |
| sender    | SENDER OF A MESSAGE |
| swa       | SYSTEM-WIDE AUTHORITY |
| user1...n | USER OF THE TRUSTED DEVICE |

FIG. 1F
SHORTHAND NOTATION - SIGNING
<data>dev (OR) [data -dev] = <data> KS-dev
FIG. 1G
SHORTHAND NOTATION - ENCRYPTION
<data>sender = (data) KE+sender
FIG. 2
INTERACTIVE DIFFIE-HELLMAN KEY DERIVATIVE
PRIOR AGREEMENT ON (NON-SECRET) PRIME p AND VALUE a
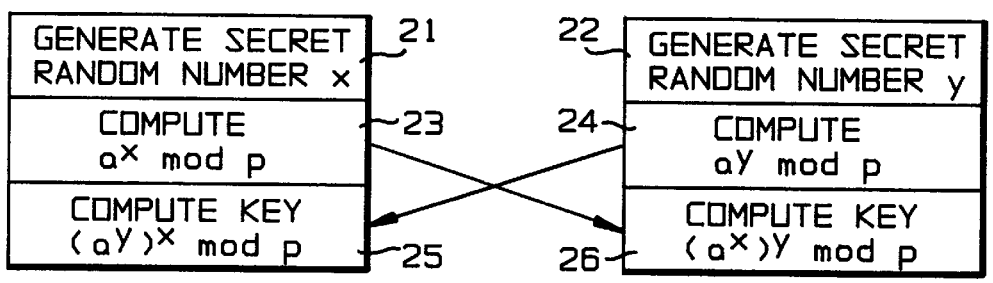
COMMON KEY $a^{xy}$ mod p KNOWN BY A AND B
BUT NOT DEDUCIBLE BY AN EAVESDROPPER
FIG. 22
DEVICE OWNER'S CERTIFICATE (EXAMPLE)
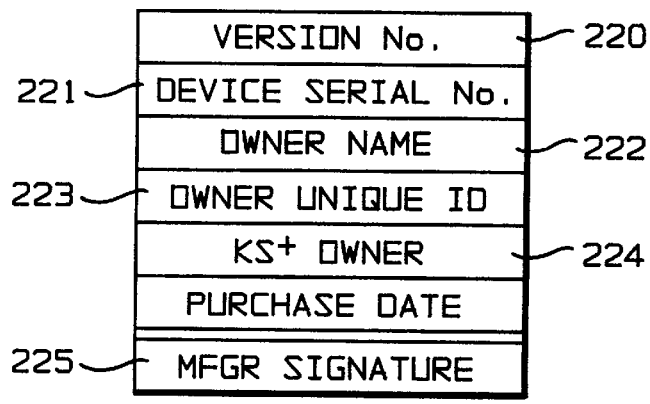

CERTIFIED DIFFIE-HELLMAN
— CERTIFICATION

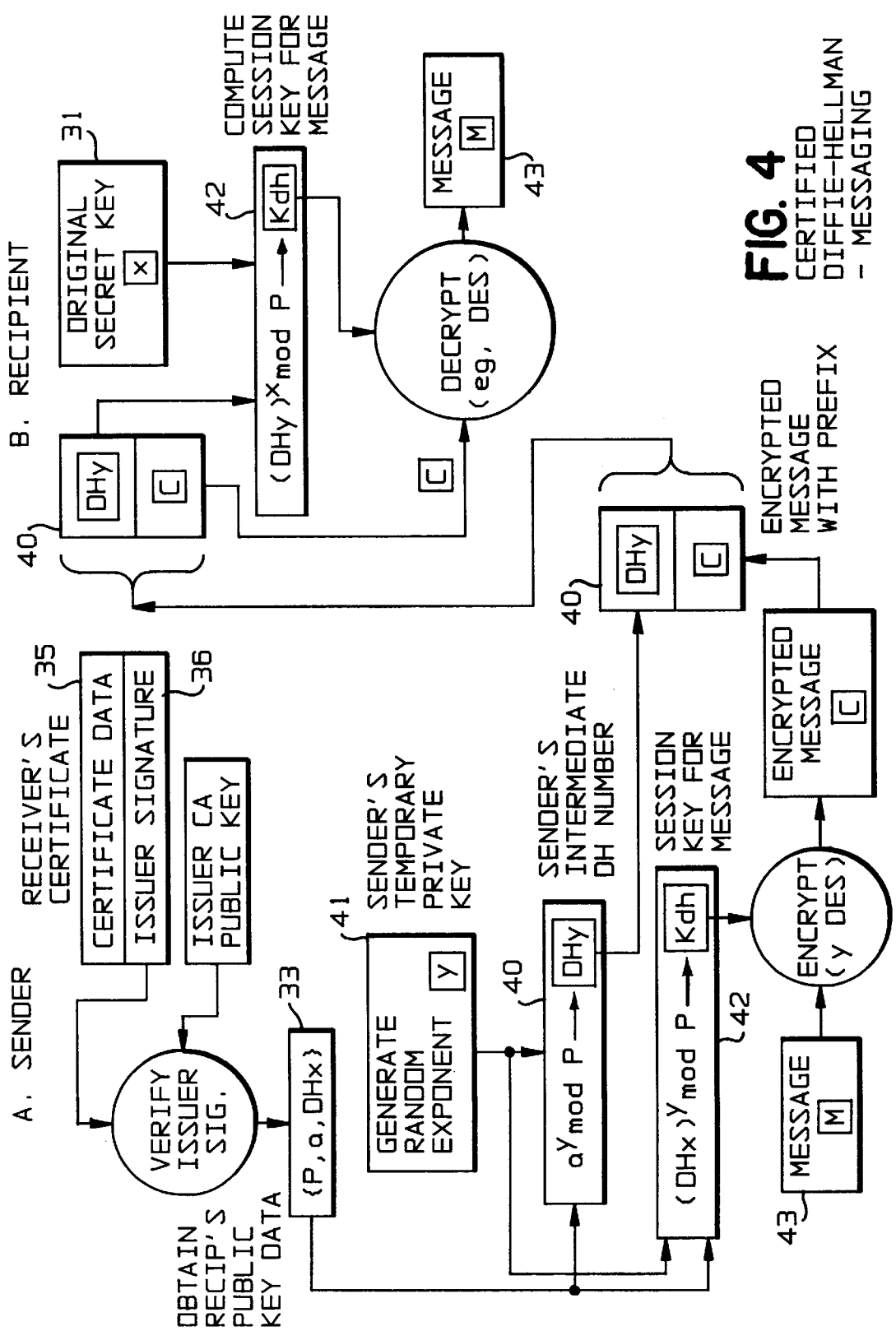
FIG. 4 CERTIFIED DIFFIE-HELLMAN MESSAGING

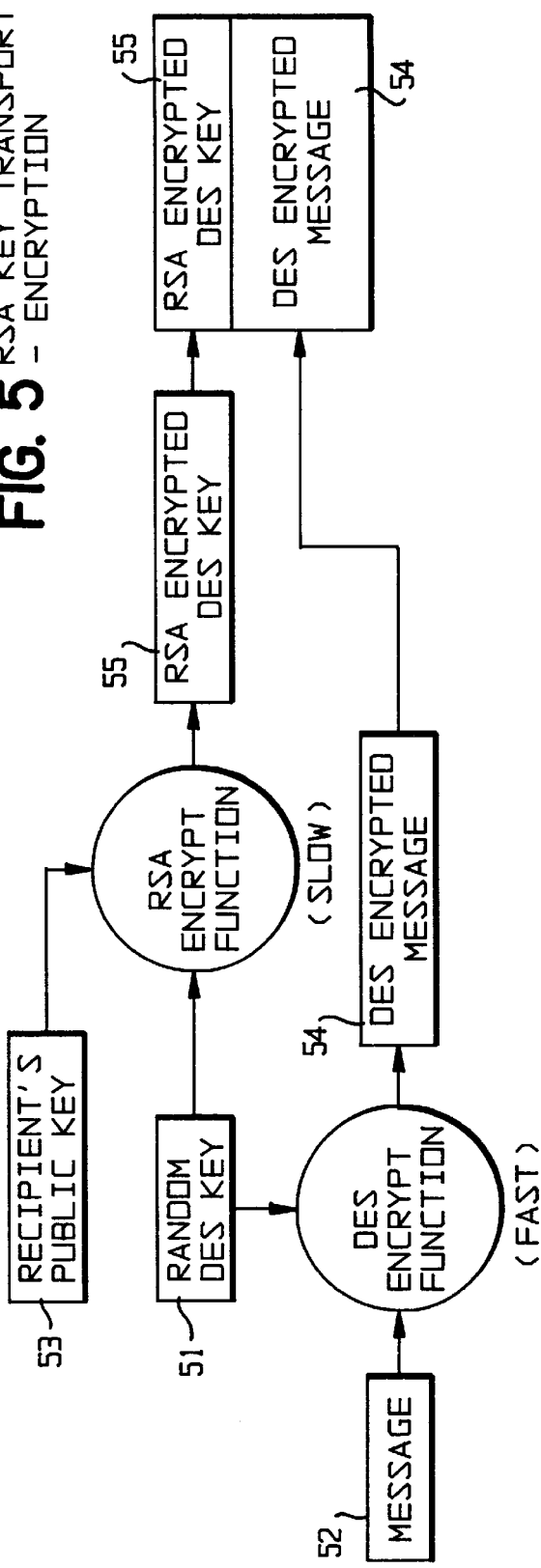
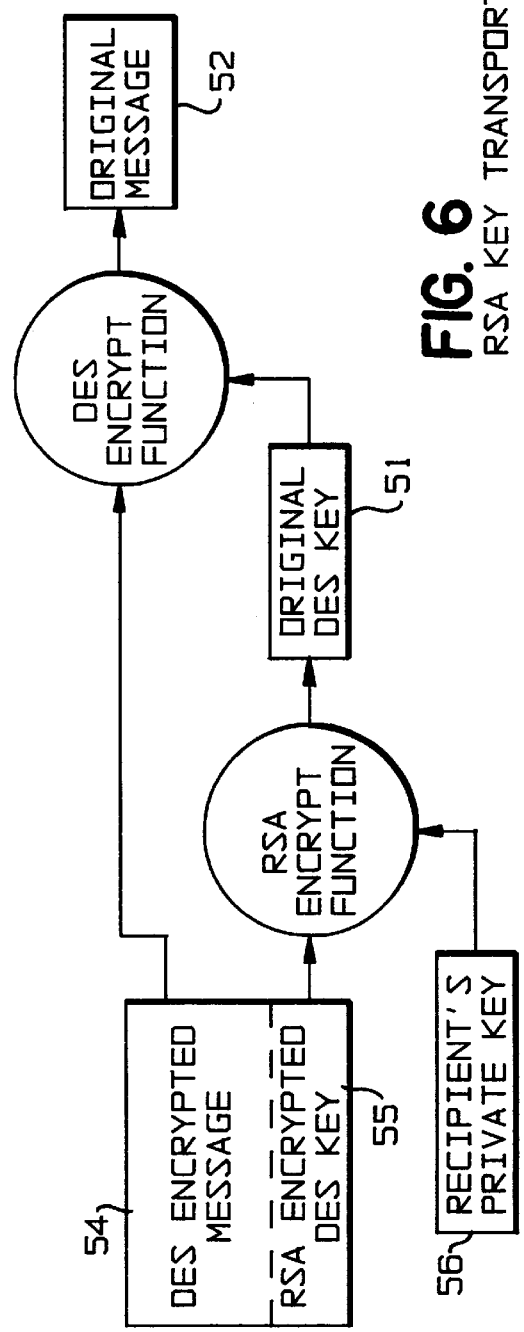
FIG. 5 RSA KEY TRANSPORT – ENCRYPTION
FIG. 6 RSA KEY TRANSPORT – DECRYPTION

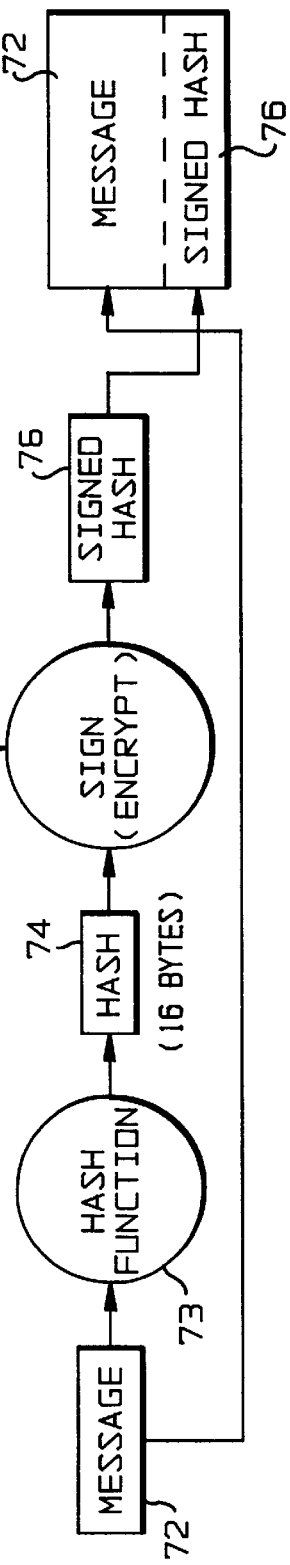
FIG. 7 RSA SIGNATURE – CREATION
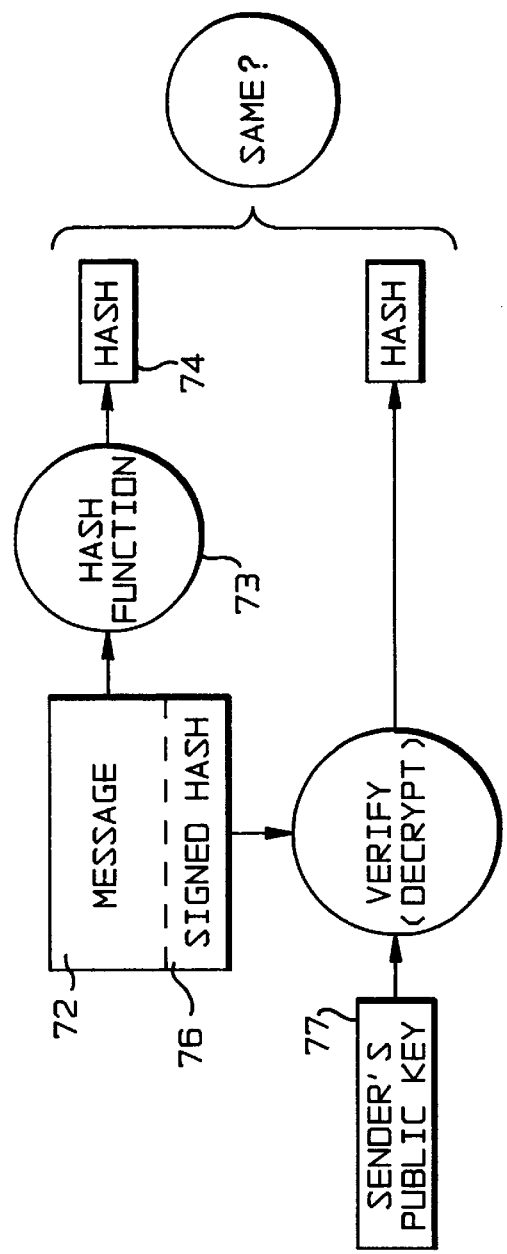
FIG. 8 RSA SIGNATURE – VERIFICATION

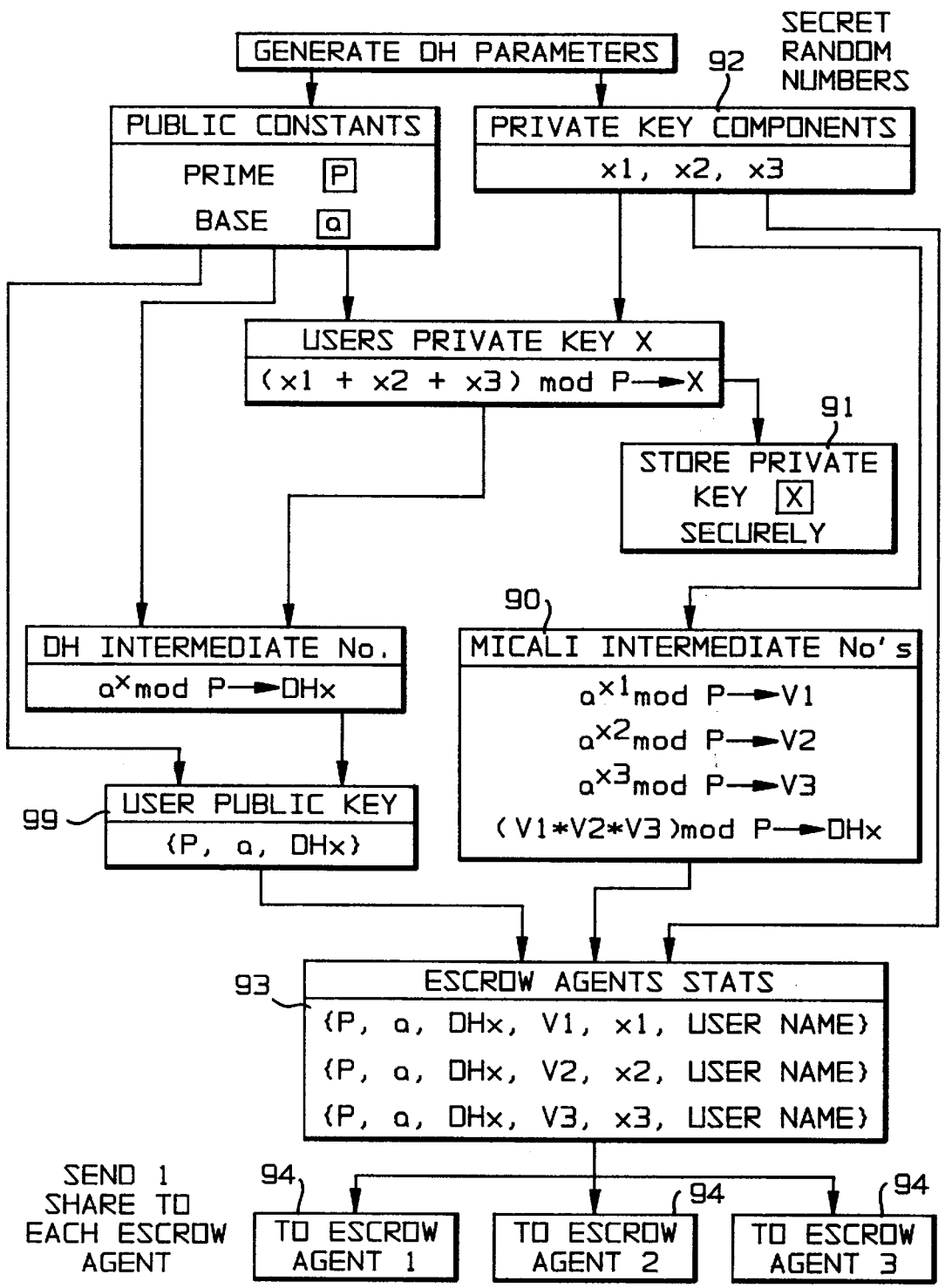

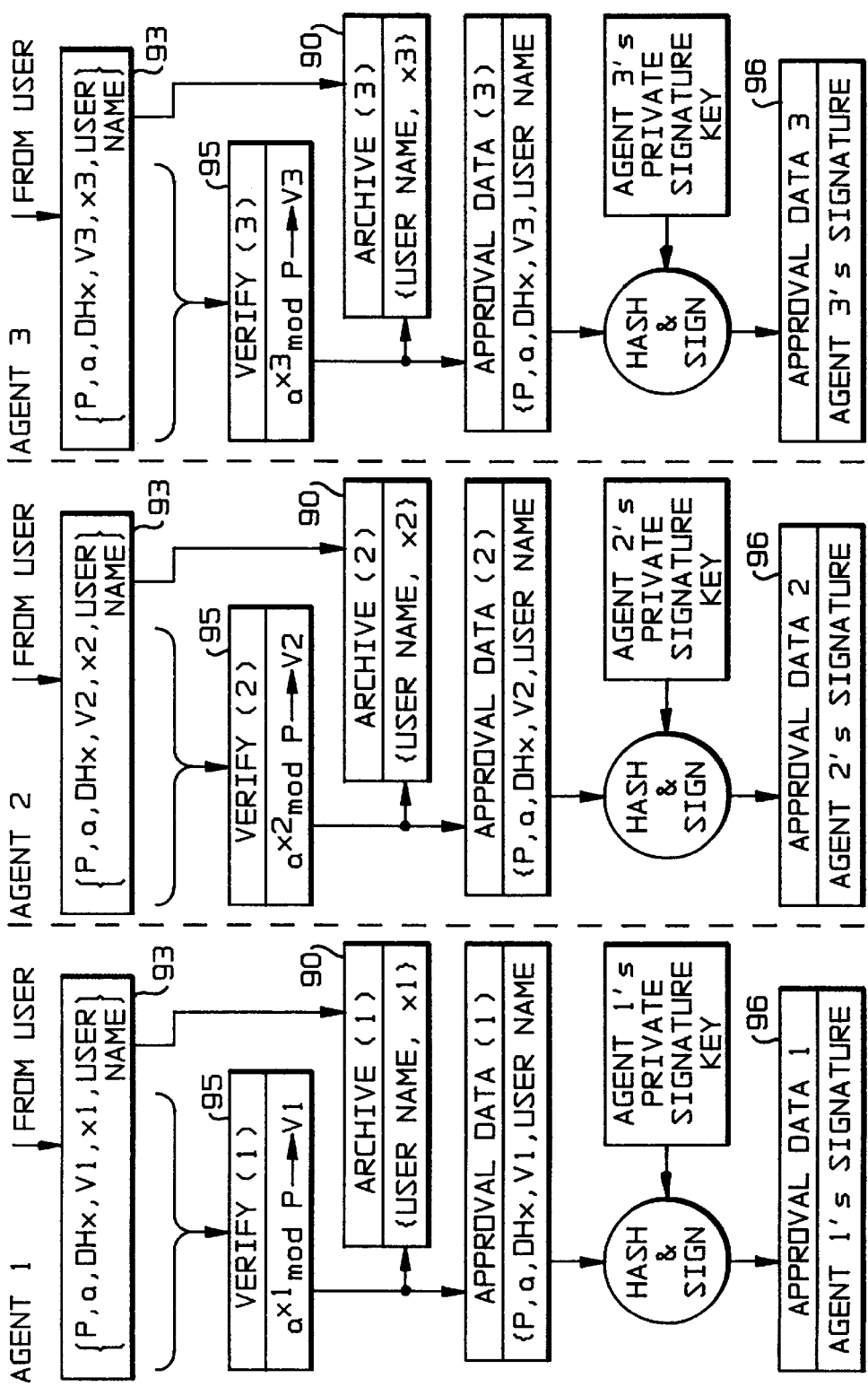
FIG. 10 MICALI ESCROW PROCESS EXAMPLE – ESCROW AGENT OPERATIONS

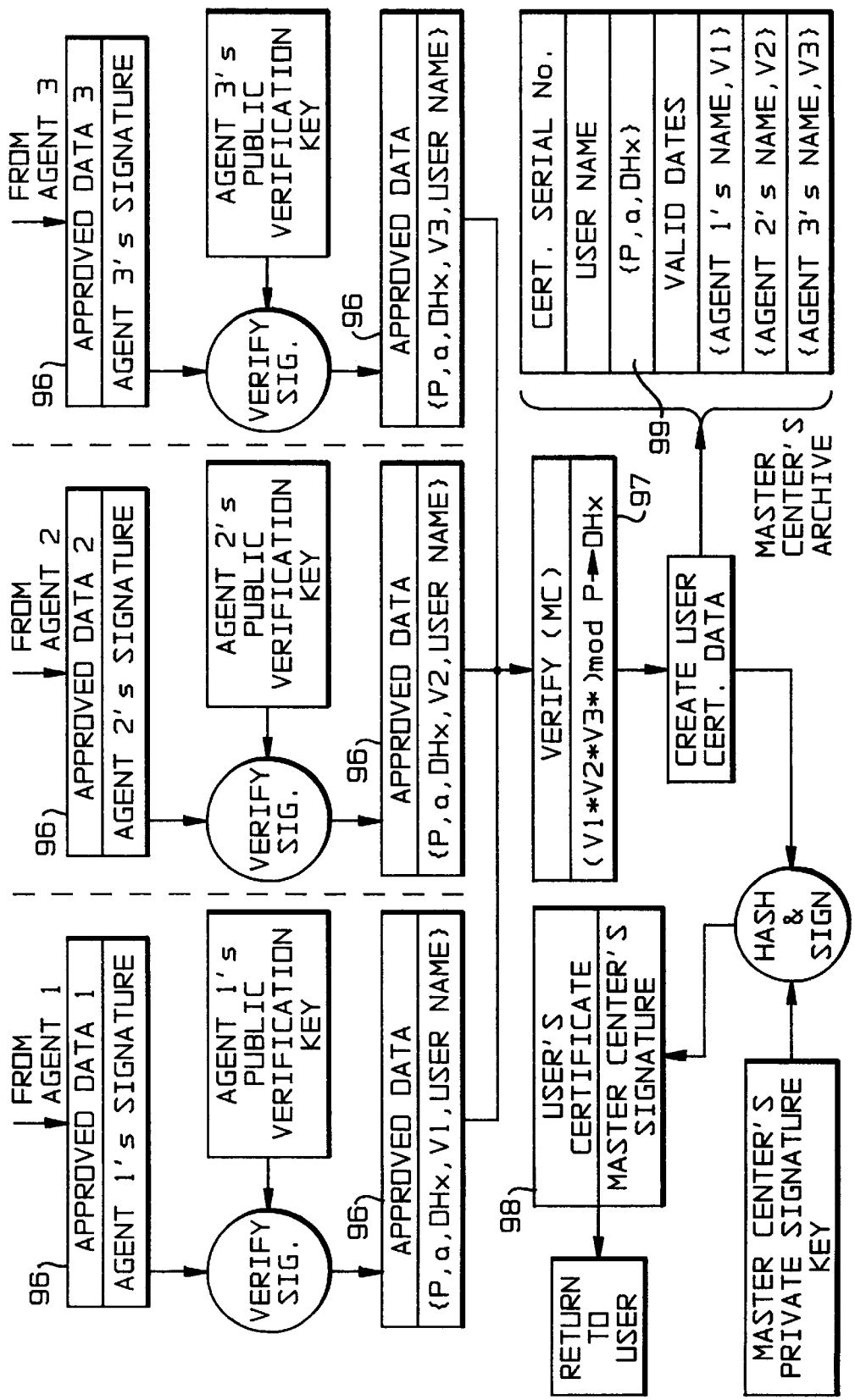

FIG. 12
ESCROW CERTIFICATE (EXAMPLE)

| VERSION No. |
|---|
| CERTIFICATE SERIAL No. ←123 |
| ESCROW CENTER NAME ←121 |
| ESCROW CENTER COUNTRY CODE |
| $KE^+ec$ (FOR LEAF USE) |
| USER NAME |
| $KE^+user$ (FOR MESSAGES) ←122 |
| $KS^+dev$ (TO VERIFY LEAF) |
| VALIDITY PERIOD ←124 |
| ESCROW CENTER SIGNATURE ←125 |

FIG. 13
CLIPPER LEAF PACKET (CONJECTURED)

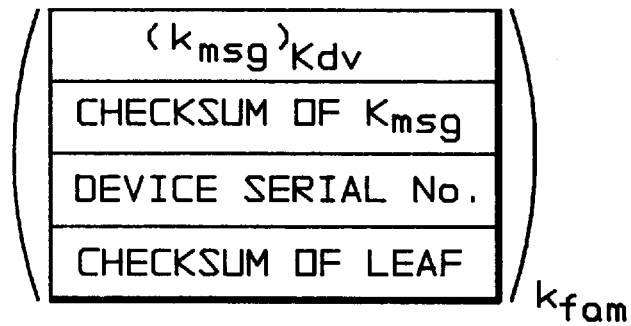

| $k_{msg}$ | SYMMETRIC MESSAGE KEY |
|---|---|
| $k_{dev}$ | EMBEDDED SYMMETRIC DEVICE KEY |
| $k_{fam}$ | SYMMETRIC CLIPPER FAMILY KEY |

FIG. 14

DEVICE CERTIFICATE: <KS⁺dev>mfgr (EXAMPLE)

| VERSION No. |
|---|
| MFGR NAME |
| DEVICE SERIAL No. |
| DEVICE TYPE/MODEL |
| MFG DATE |
| KS⁺dev |
| ATTRIBUTE CODES (OPTIONAL) |
| MFGR SIGNATURE |

FIG. 18

MESSAGE CONTROL HEADER (EXAMPLE)
(IN RSA - KEY - TRANSPORT FORMAT)

| | |
|---|---|
| VERSION No. | |
| (MESSAGE KEY) KE⁺recip | ←181 |
| SENDER ESCROW CENTER NAME (ec1) | |
| SENDER ESCROW CENTER COUNTRY CODE | |
| RECIPIENT ESCROW CENTER NAME (ec2) | |
| RECIPIENT ESCROW CENTER COUNTRY CODE | |
| (SENDER ESCROW CERT. No.) KE⁺ec1 | ←181 |
| (MESSAGE KEY) KE⁺sender (TO HIMSELF) | ←181 |
| (RECIP. ESCROW CERT. No.) KE⁺ec2 | ←181 |
| TIMESTAMP (OPTIONAL) | |
| SENDER DEVICE SIGNATURE | |

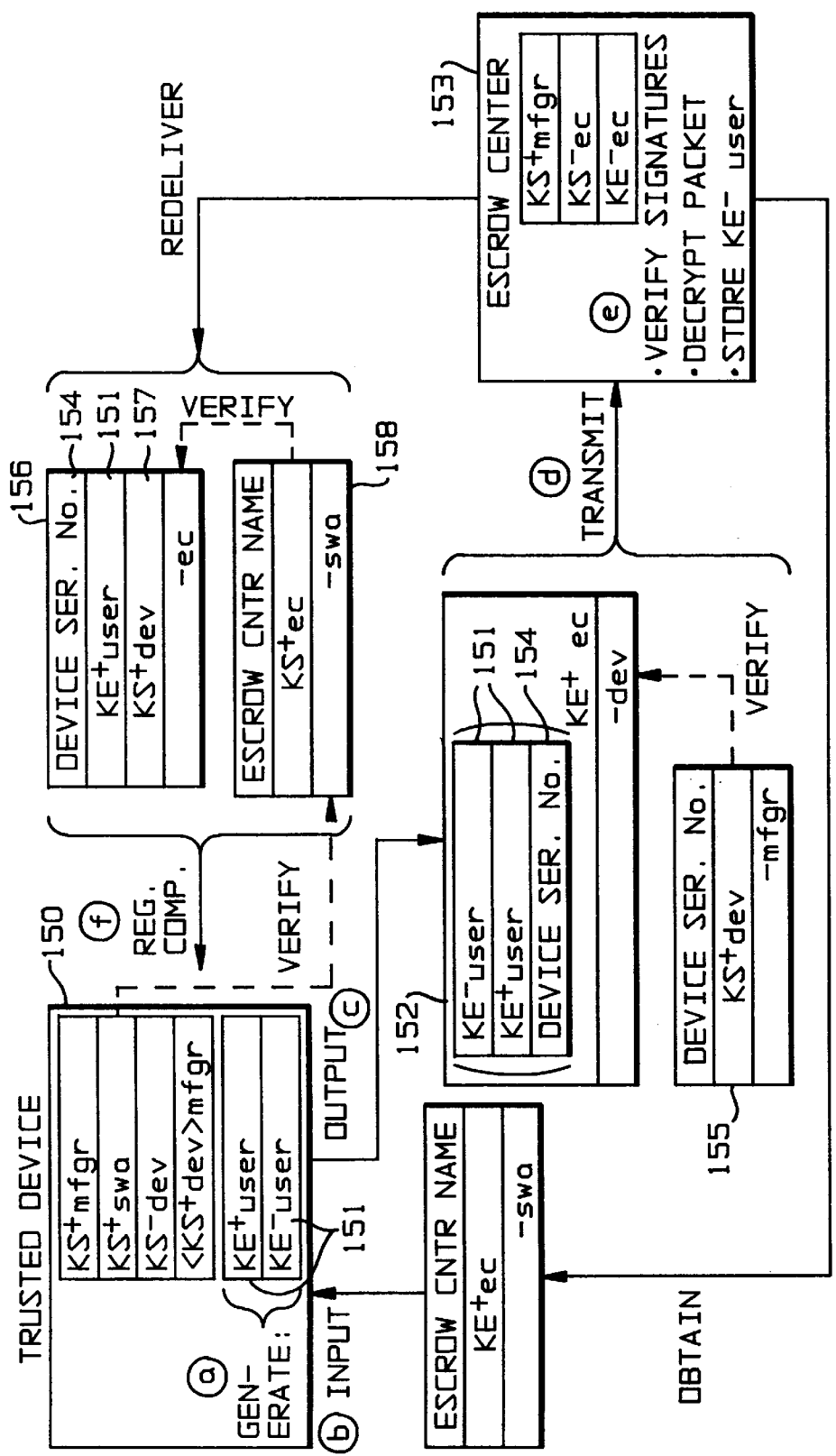
FIG. 15 REGISTERING WITH A SINGLE ESCROW CENTER (EXAMPLE)

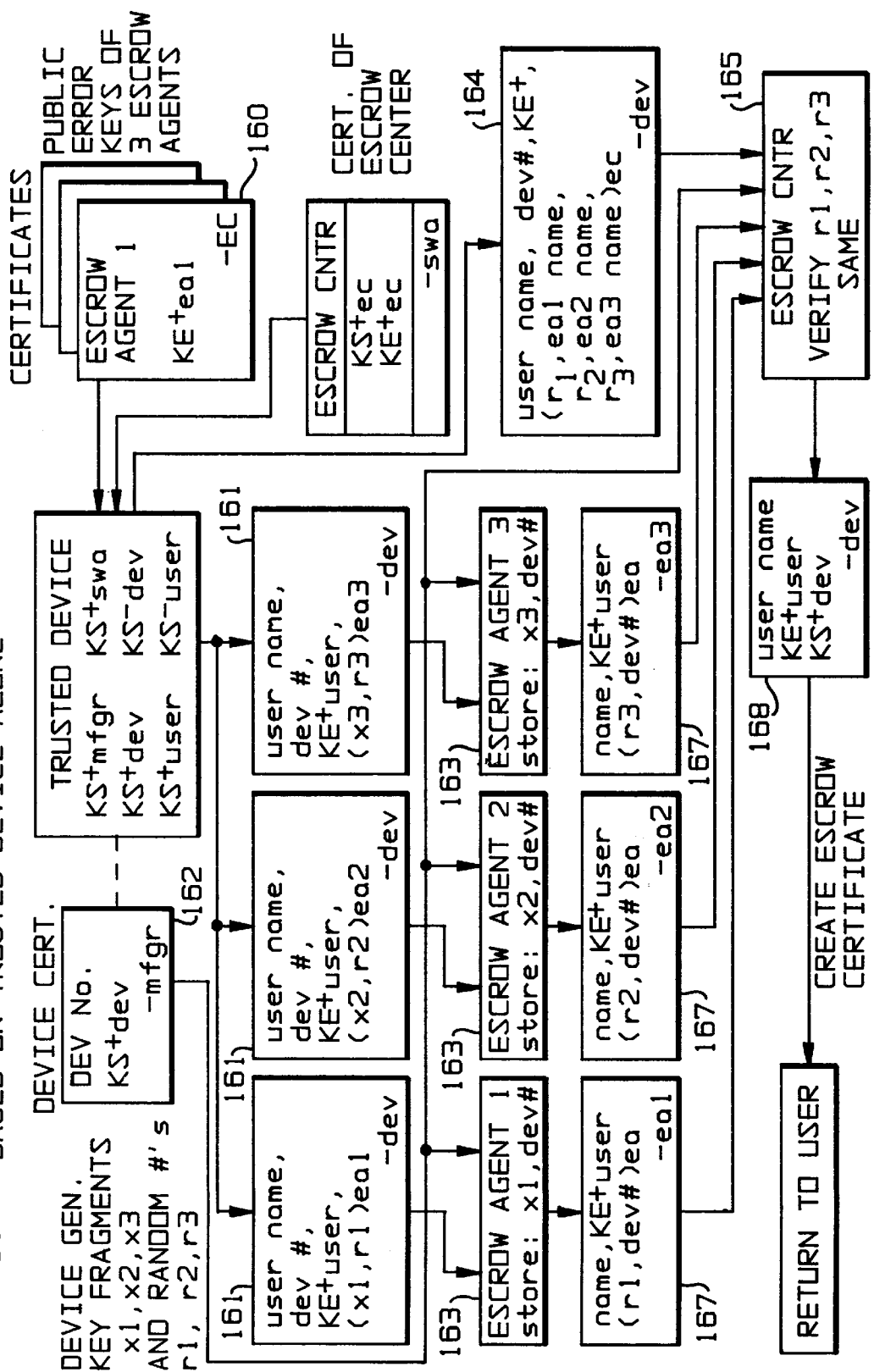
FIG. 16 VERIFIABLE KEY SPLITTING BASED ON TRUSTED DEVICE ALONE

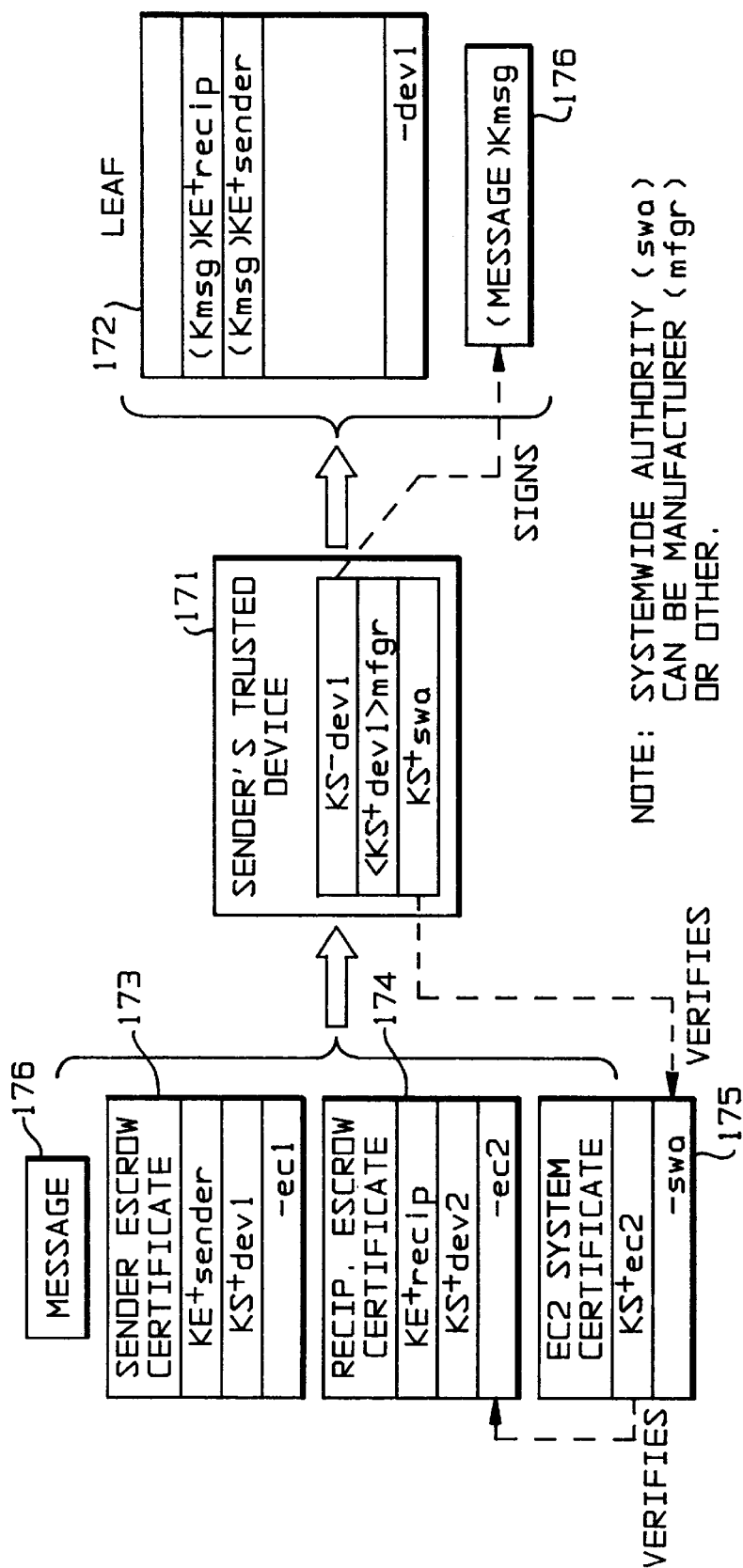
FIG. 17 SEND ENCRYPTED MESSAGE WITH MCH (OVERVIEW)

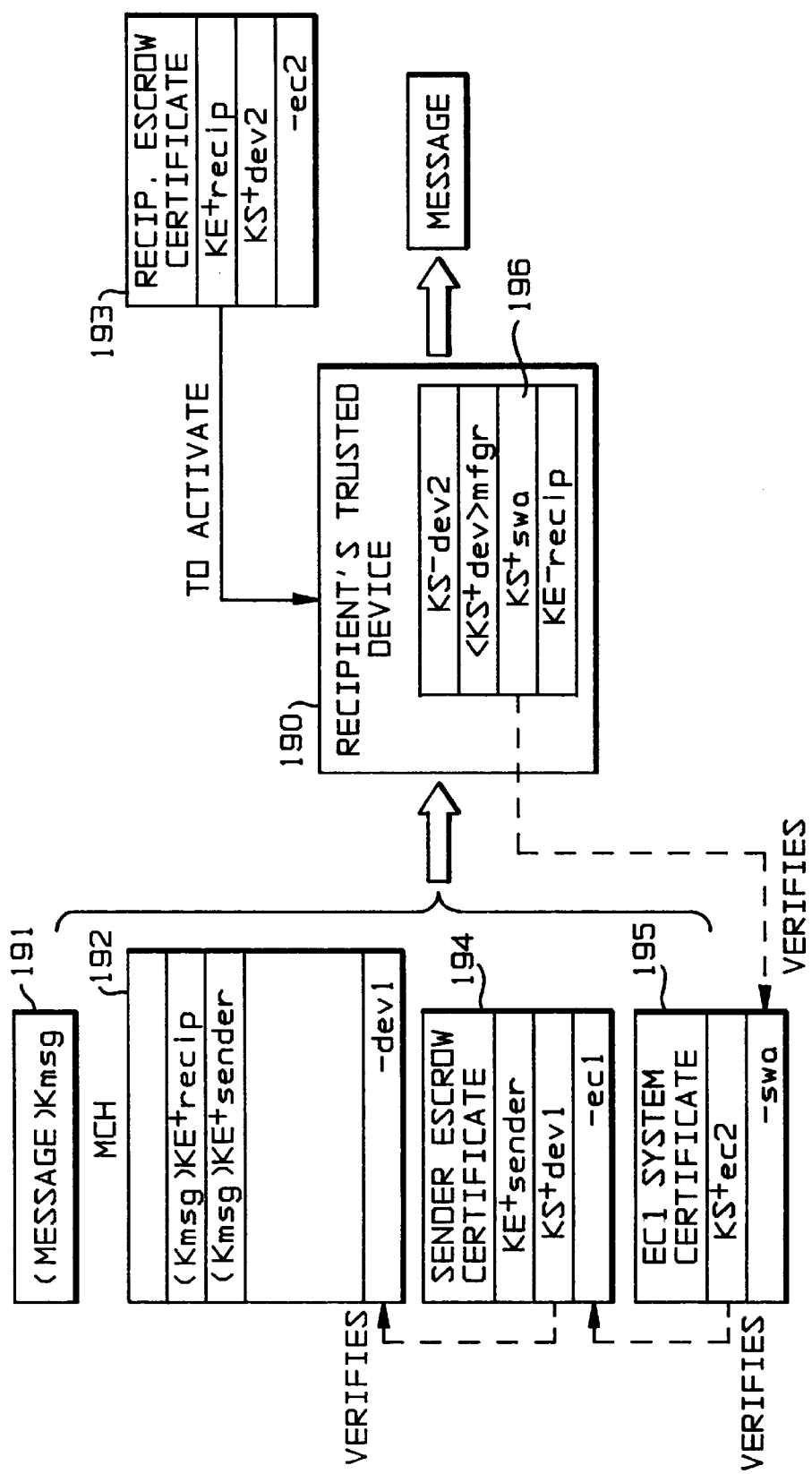
FIG. 19 RECEIVE ENCRYPTED MESSAGE WITH MCH (OVERVIEW)

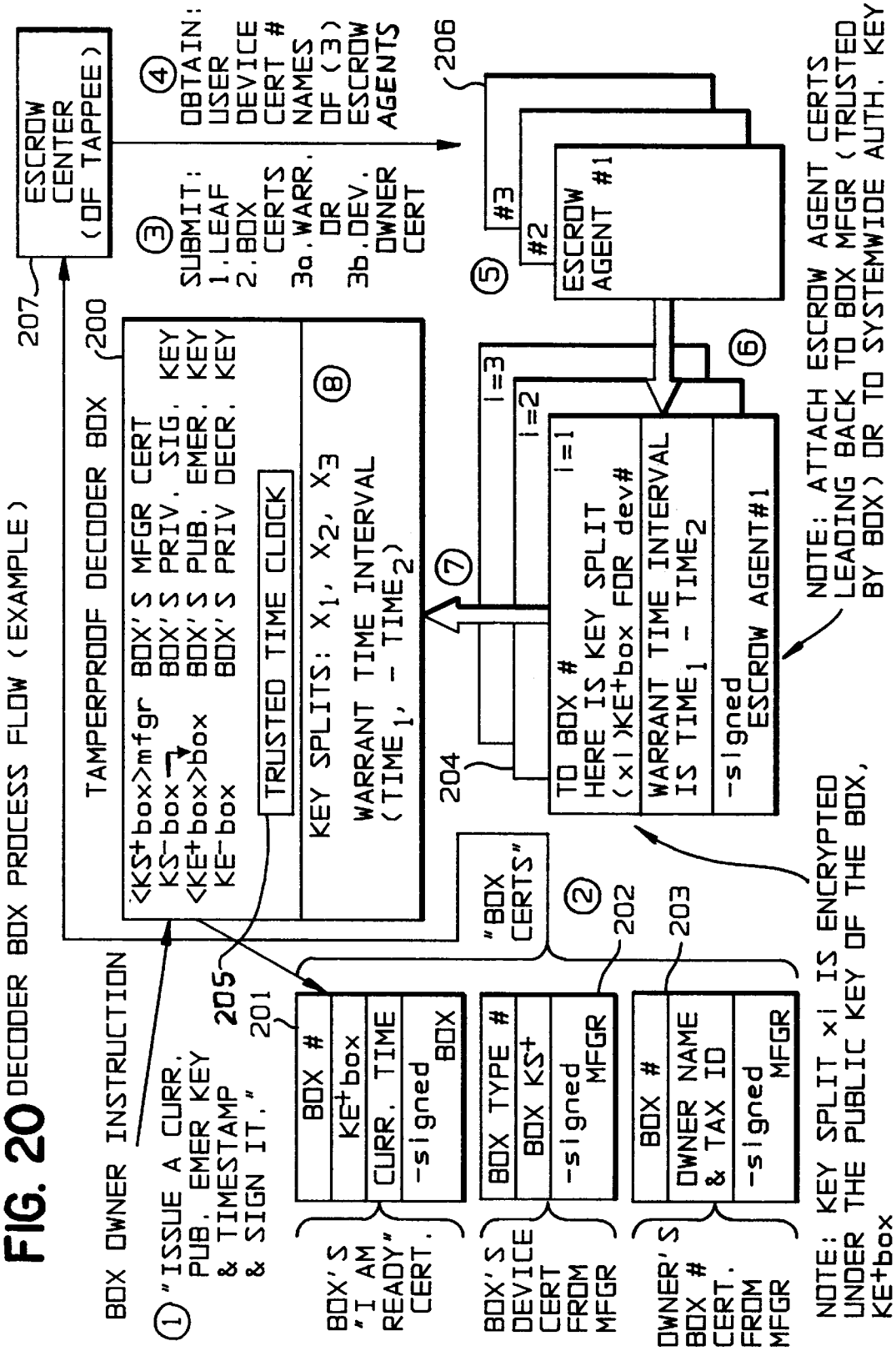
FIG. 20 DECODER BOX PROCESS FLOW (EXAMPLE)

SELF-CERTIFYING TRUSTED TIMESTAMP DEVICE

OWNER REKEY INSTRUCTIONS PROCESS

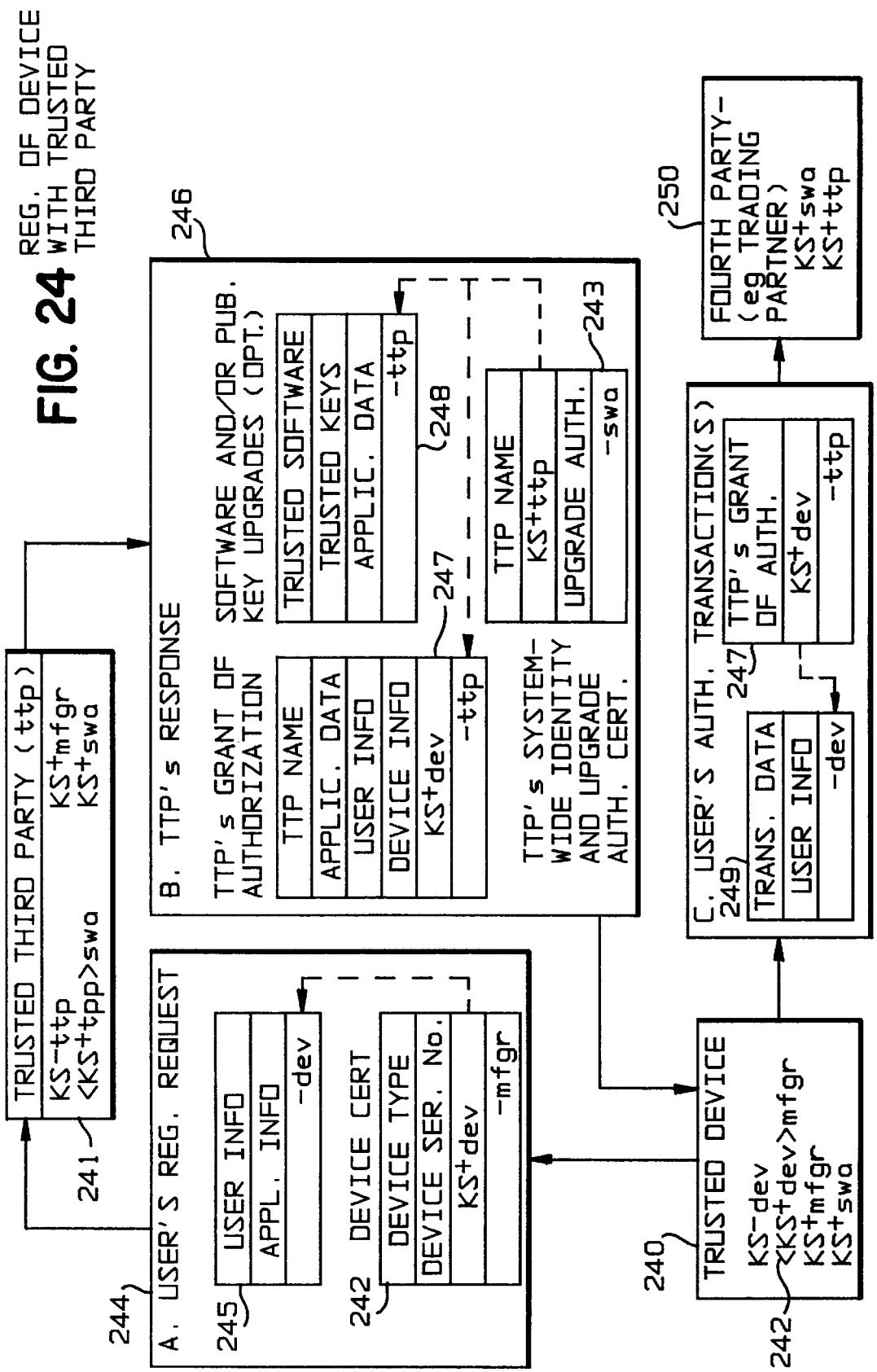
FIG. 24 REG. OF DEVICE WITH TRUSTED THIRD PARTY

| | |
|---|---|
| VERSION NUMBER | |
| RECIPIENT NAME | 254 |
| (MESSAGE KEY) KE⁺RECIP (TO RECIPIENT) | |
| RECIPIENT ESCROW CENTER NAME (ec1) | |
| (RECIPIENT CERTIFICATE No.) KE⁺ec1 | 252 |
| RECIPIENT EMPLOYER 1a NAME (empl 1a) | 256 |
| (MESSAGE KEY, RECIP. CERTIF. No.) KE⁺empl 1a | 257 |
| RECIPIENT EMPLOYER 1b NAME (empl 1b) | 256 |
| (MESSAGE KEY, RECIP. CERTIF. No.) KE⁺empl 1b | 257 |
| ⋮ | |
| SENDER NAME | 253 |
| (MESSAGE KEY) KE⁺SENDER (TO HIMSELF) | |
| SENDER ESCROW CENTER NAME (ec2) | |
| (SENDER CERTIFICATE No.) KE⁺ec2 | 251 |
| SENDER EMPLOYER 2a NAME (empl 2a) | 255 |
| (MESSAGE KEY, SENDER CERTIF. No.) KE⁺empl 2a | 257 |
| ⋮ | |
| SENDER MESSAGE SEQUENCE NUMBER | |
| HASH OF MESSAGE | |
| TIME OF CREATION | |
| SENDER DEVICE SIGNATURE | 258 |

FIG. 25
LAW ENFORCEMENT ACCESS FIELD (MULTIPLE RECIPIENTS)
(IN RSA - KEY - TRANSPORT FORMAT)

EMBEDDING OF OWNER PUBLIC KEY UPON INITIAL SALE

OWNERSHIP TRANSFER

OWNER CONTROLLED REKEY PROCESS

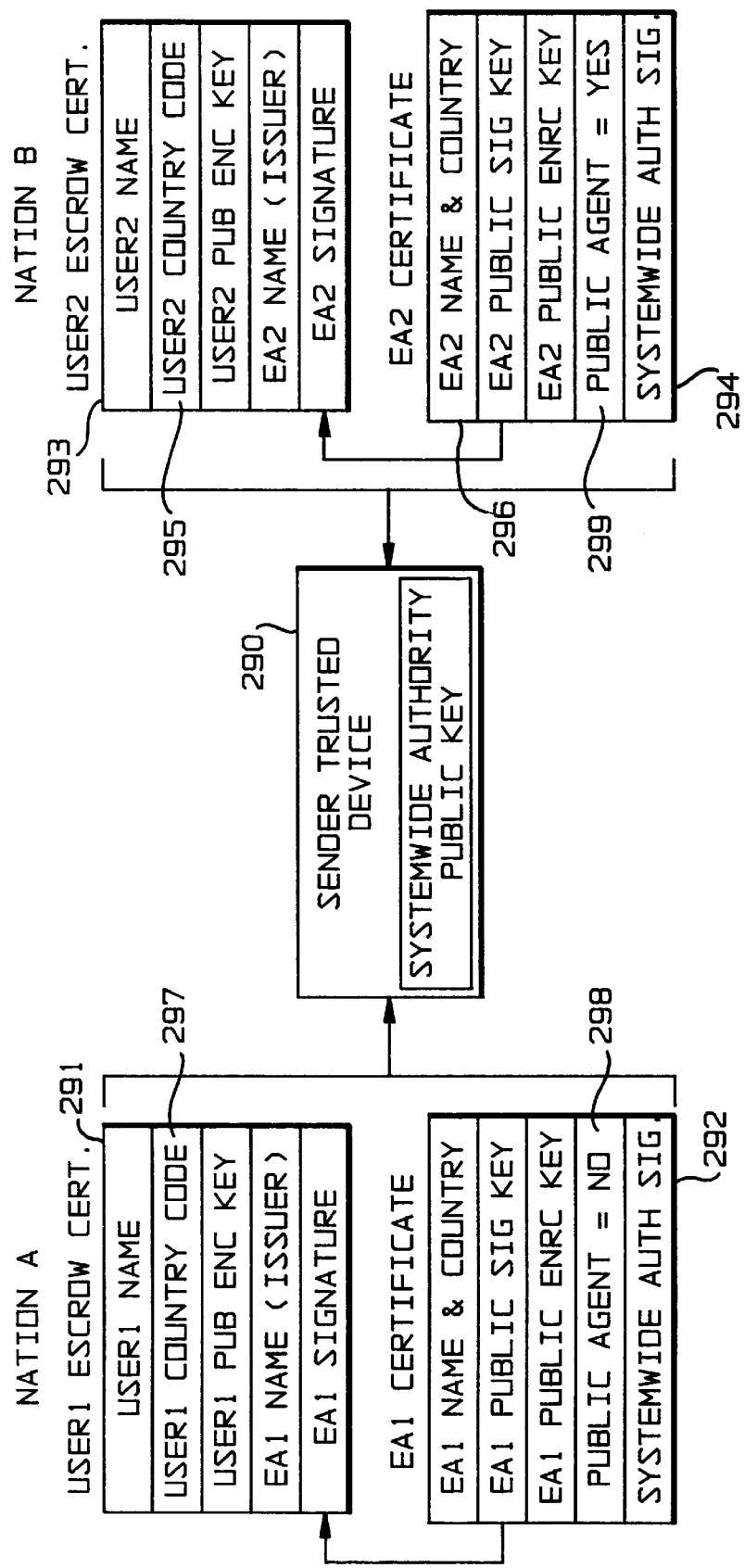
FIG. 29 DOMAIN RESTRICTION - SENDER ENFORCEMENT

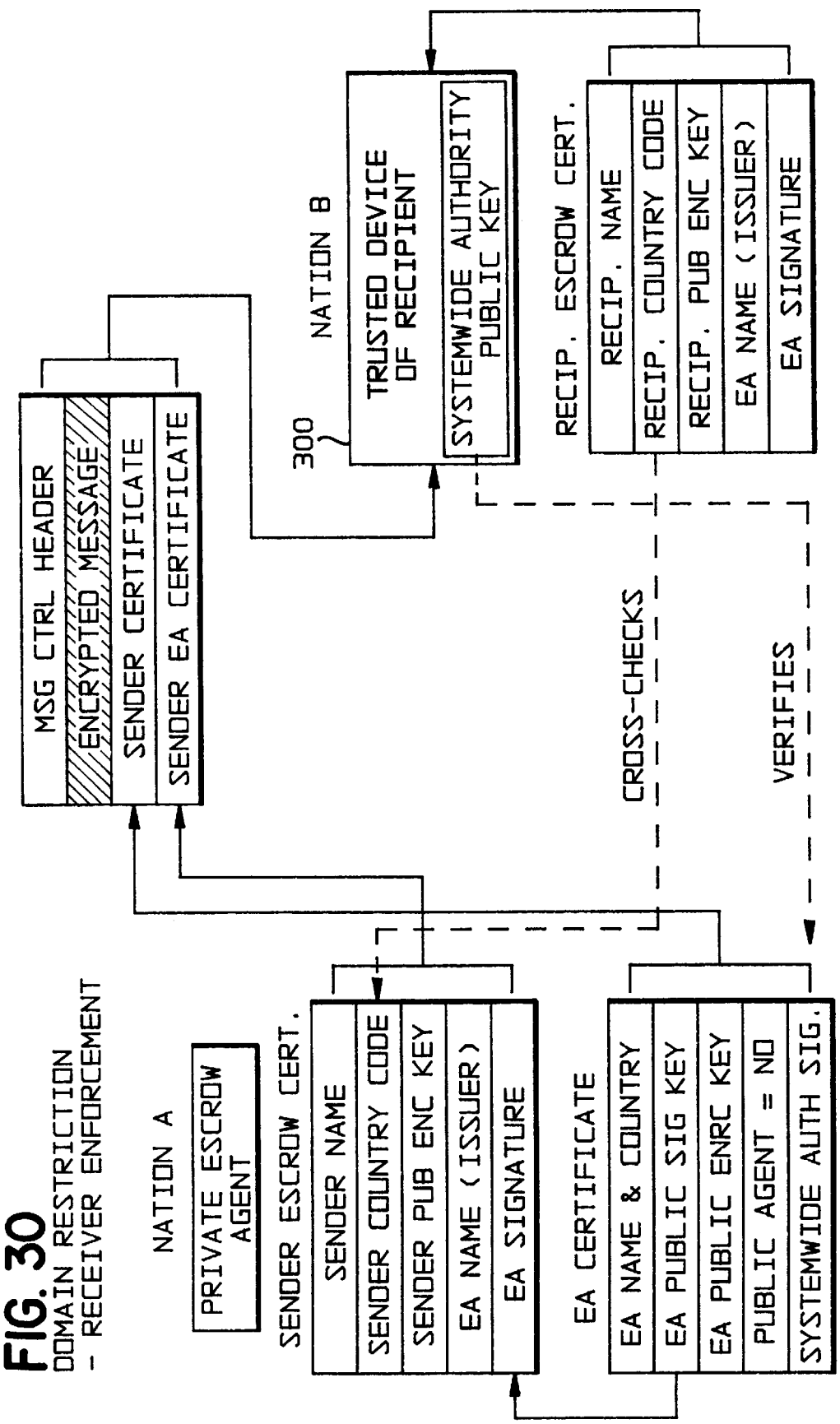

ENHANCED CRYPTOGRAPHIC SYSTEM AND METHOD WITH KEY ESCROW FEATURE

CROSS-REFERENCE TO RELATED APPLICATION

This is a division of application Ser. No. 08/272,203, filed Jul. 8, 1994, now abandoned which is a continuation-in-part of application Ser. No. 08/181,859, filed Jan. 13, 1994, now abandoned.

BACKGROUND OF THE INVENTION

This invention relates to cryptographic communications systems. More particularly, this invention relates to the secure generation, certification, storage and distribution of cryptographic keys used in cryptographic communications systems. Still more particularly, this invention relates to a system of cryptographic key escrow and public-key certificate management enforced by a self-certifying chip device.

The development and proliferation of sophisticated computer technology and distributed data processing systems has led to a rapid increase in the transfer of information in digital form. This information is used in financial and banking matters, electronic mail, electronic data interchange and other data processing systems. Transmission of this information over unsecured or unprotected communication channels risks exposing the transmitted information to electronic eavesdropping or alteration. Cryptographic communications systems preserve the privacy of these transmissions by preventing the monitoring by unauthorized parties of messages transmitted over an insecure channel. Cryptographic communications systems also ensure the integrity of these transmissions by preventing the alteration by unauthorized parties of information in messages transmitted over an insecure channel. The cryptographic communications systems can further ensure the integrity and authenticity of the transmission by providing for recognizable, unforgeable and document-dependent digitized signatures that can prevent denial by the sender of his own message.

Cryptographic systems involve the encoding or encrypting of digital data transmissions, including digitized voice or video transmissions, to render them incomprehensible by all but the intended recipient. A plaintext message consisting of digitized sounds, letters and/or numbers is encoded numerically and then encrypted using a complex mathematical algorithm that transforms the encoded message based on a given set of numbers or digits, also known as a cipher key. The cipher key is a sequence of data bits that may either be randomly chosen or have special mathematical properties, depending on the algorithm or cryptosystem used. Sophisticated cryptographic algorithms implemented on computers can transform and manipulate numbers that are hundreds or thousands of bits in length and can resist any known method of unauthorized decryption. There are two basic classes of cryptographic algorithms: symmetric key algorithms and asymmetric key algorithms.

Symmetric key algorithms use an identical cipher key for both encrypting by the sender of the communication and decrypting by the receiver of the communication. Symmetric key cryptosystems are built on the mutual trust of the two parties sharing the cipher key to use the cryptosystem to protect against distrusted third parties. The best known symmetric key algorithm is the National Data Encryption Standard (DES) algorithm first published by the National Institute of Standards and Technology. See *Federal Register*, Mar. 17, 1975, Vol. 40, No. 52 and Aug. 1, 1975, Vol. 40, No. 149. The sender cryptographic device uses the DES algorithm to encrypt the message when loaded with the cipher key (a DES cipher key is 56 bits long) for that session of communication (the session key). The recipient cryptographic device uses an inverse of the DES algorithm to decrypt the encrypted message when loaded with the same cipher key as was used for encryption. However, the adequacy of symmetric key cryptosystems in general has been questioned because of the need for the sender and the recipient to exchange the cipher key over a secure channel to which no unauthorized third party has access, in advance of the desired communications between the sender and recipient. This process of first securely exchanging cipher keys and only then encrypting the communication is often slow and cumbersome, and is thus unworkable in situations requiring spontaneous or unsolicited communications, or in situations requiring communications between parties unfamiliar with each other. Moreover, interception of the cipher key by an unauthorized third party will enable that party to eavesdrop on both ends of the encrypted conversation.

The second class of cryptographic algorithms, asymmetric key algorithms, uses different cipher keys for encrypting and decrypting. In a cryptosystem using an asymmetric key algorithm, the user makes the encryption key public and keeps the decryption key private, and it is not feasible to derive the private decryption key from the public encryption key. Thus, anyone who knows the public key of a particular user could encipher a message to that user, whereas only the user who is the owner of the private key corresponding to that public key could decipher the message. This public/private key system was first proposed in Diffie and Hellman, "New Directions in Cryptography," IEEE Transactions on Information Theory, Nov. 1976, and in U.S. Pat. No. 4,200,770 (Hellman et al.), both of which are hereby incorporated by reference.

An early type of asymmetric key algorithm allows secure communication over an insecure channel by interactive creation by the communicating parties of a cipher key for that session of communication. Using the asymmetric key algorithm, two interacting users simultaneously and independently generate a secure cipher key that cannot be deduced by an eavesdropper and that is to be used symmetrically to encode that session of communications between the users. This interactive method of generating a secure cipher key was described by Diffie and Hellman in their 1976 paper. Under this prior art method, known as the Interactive Diffie-Hellman scheme, shown in FIG. 2, each of the two users A,B randomly chooses a secret number 21,22 and then computes an intermediate number 23,24 using two publicly-known numbers and the secret number 21,22 chosen by that user. Each user next transmits the intermediate number 23,24 to the other user and then computes the secret (symmetric) cipher key 25 using his own secret number 21,22 and the intermediate number 24,23 just received from the other user. The interactively generated cipher key 25 is then used symmetrically by both users as a DES or other symmetric cipher key to encrypt and decrypt that session of communications over an otherwise insecure channel in the manner of symmetric key algorithm communications. This interactive process requires only a few seconds of real time, and all digital communications, including digitized sound or video transmissions, in a particular session can be encrypted merely by pushing a button at the outset of a session to initiate the interactive key exchange process. Because all the numbers chosen in the Interactive Diffie-Heilman key generation scheme are very large, the computations are infeasible to invert and the secret cipher key cannot be computed by an eavesdropper, thus preserving the privacy of the communication. Because the computations are infeasible to invert, each user knows that any communication received using this algorithm was not altered and could have been sent only by the other user, thus preserving the integrity and authenticity of the communication. This interactive key exchange method, however, requires the parties to interact in real time in order to create the cipher key and may not be useful for unsolicited communications or unfamiliar parties. In particular, the Interactive Diffie-Rellman key exchange scheme does not work for store-and-forward electronic-mail style messaging or for long-term storage of documents in an electronic data storage system, because the recipient is not on-line to negotiate the session key.

A modified, non-interactive form of the Diffie-Hellman scheme, known as Certified Diffie-Hellman, can be used when the communicating parties are not on-line together. The initial, certification step of the Certified Diffie-Hellman session key generation scheme is shown in FIG. 3. One user, the recipient-to-be, randomly chooses a secret number 31 (his private key) and then computes an intermediate number 33 using two publicly-known numbers 32 and the secret number 31 chosen by that user. That user then sends proof of identification along with the intermediate number and the two public numbers, which numbers together form his public key 34, to a certifying authority that then issues a public key certificate 35 digitally signed 36 by the issuing certifying authority binding the user's identity to the user's Diffie-Hellman public key information 34. The public key 34 publicized by that user remains the same until he decides to rekey and choose another private key 31. Messaging using the Certified Diffie-Hellman method is shown in FIG. 4. In order to transmit a message to that-user, a sending user first obtains the receiving user's certificate 35 and verifies the certifying authority's signature 36. The sender next computes the session key 42 for that communication session using the recipient's intermediate number 33 (from the recipient's certificate) and the sender's own secret number 41 (his private key), which he chooses at random. The sender then encrypts a message 43 using the session key 42 and places his own intermediate number 40 unencrypted at the head of the communication. Upon receiving the communication, the recipient computes the session key 42 using the sender's unencrypted intermediate number 40 and his own secret number 31 (or private key), and then uses the session key 42 to decrypt the message 43. As with the Interactive Diffie-Hellman scheme, the session key generated in the Certified Diffie-Hellman scheme is then used by both parties to encrypt and decrypt communications during that session over an otherwise insecure channel using a conventional symmetric algorithm, such as DES. The Certified Diffie-Hellman scheme, however, requires that a trusted entity or a certifying authority sign the receiving user's public key certificate so that a sending user can trust that the information contained within is correct. In addition, the private key randomly chosen by the sender, with which he computes both the session key and the intermediate number for that communication, must not be identical to the private key that is connected to the sender's own public key certificate; in order to avoid others learning his permanent private key numbers (corresponding to the public key numbers that have been certified), the sender should keep them distinct from any ephemeral private keys or intermediate numbers that are generated only for specific messages.

Another asymmetric key algorithm, named the RSA algorithm after the inventors Rivest, Shamir and Adleman, is described in U.S. Pat. No. 4,405,829 (Rivest et al.), which is hereby incorporated by reference, and involves the difficulty of factoring a number that is the product of two large prime numbers. As with the Interactive Diffie-Hellman scheme, the RSA algorithm is relatively straightforward to compute but practically infeasible to invert. Thus, it is not feasible to derive the private key from the public key and, in this way, the privacy of the communication is preserved. Once a message is encrypted with the public key using the RSA algorithm, only the private key can decrypt it, and vice versa. As with the Certified Diffie-Hellman scheme, the RSA algorithm requires a trusted entity to certify and publicize the users' public keys. In contrast to both Diffie-Hellman schemes, however, the RSA algorithm does not itself generate a "session key" to be used symmetrically by the parties. Instead, the public encryption key for a particular user directly encrypts communications to that user and that user's private decryption key decrypts those communications encrypted with the user's public key. In this way, the RSA algorithm is a pure asymmetric key algorithm.

However, because the RSA algorithm is complex and involves exponentiation of the message by very large numbers, encrypting or decrypting a message of even moderate length using the RSA algorithm requires a great deal of time. Thus, it is much simpler, faster and efficient to use the RSA asymmetric algorithm to transport a DES cipher key for use in a symmetric algorithm. This prior art mode of operation is known as RSA key transport and is shown in FIGS. 5 and 6. For example, referring to FIG. 5, a user could generate a random DES key 51 and encrypt a message 52 with that DES key. The user would then encrypt the DES key 51 with an intended receiving user's public RSA encryption key 53 and transmit the DES-encrypted message 54 along with the RSA-encrypted DES key 55 to the receiving user. After receiving the transmission, as shown in FIG. 6, the recipient decrypts the DES key 51 using his private RSA decryption key 56 and uses that DES key 51 to decrypt the message 52. Because the DES algorithm requires much less time and expense to compute than does the RSA algorithm, the symmetric DES key is used to encrypt and decrypt the actual message, while the asymmetric RSA keys are used to encrypt and decrypt the symmetric DES key.

The RSA public/private key cryptosystem also provides for a digital "signature" that is both message dependent and signer dependent, and can be used to certify that the received message was actually sent by the sender and that it was received unaltered. RSA digital signature is based on the additional property of RSA that, in addition to allowing the user's private key to decrypt only those communications encrypted using that user's public key, permits a user's private key to encrypt messages that can be decrypted only by that user's public key. Because only the user has the private key, use of the private key to encrypt allows for proof of origin that can be verified by anyone with access to the user's public key. In practice, the sender first uses his private key to encode the message text into a signed message, which can be decrypted by anyone but could have come only from the sender. If desired, the sender may then optionally use the recipient's public encryption key to encipher the signed message to be transmitted. Upon receipt of the ciphertext, the recipient decrypts the ciphertext with his private decryption key, if necessary, and decodes the signed message with the sender's public encryption key. Because only the sender knows his unique private key, only the sender could have sent the particular "signed" message; the signature thus verifies the identity of the sender. Also, because the recipient has only the sender's public key, the sender cannot claim that the recipient or an unauthorized third party altered or fabricated his message; the signature thus prevents repudiation of the message by the sender. Furthermore, because only the sender's private key transforms the original message and only the sender knows his unique private key, neither the recipient nor an unauthorized third party could have altered the message; the signature thus certifies the integrity of the message.

The RSA algorithm also provides for another type of digital signature that uses a hashing function to create a short message digest that is unique to each document. FIGS. 7 and 8 show RSA signature creation and RSA signature verification, respectively, using a hashing function. A hashing function is another complex mathematical algorithm that is "one-way," i.e. so that it is infeasible to reconstruct the document from the hash result, and is "collision-free," i.e. so that it is infeasible to produce another document that will hash to the same digest. As shown in FIG. 7, the sender first passes the message 72 through a hashing algorithm 73 to produce the message digest 74 and then encrypts the digest with his RSA private key 75, forming a compact digital signature 76 that is attached to the message 72. After receiving the transmission of the message 72 and the message digest 76, as shown in FIG. 8, the recipient decrypts the sender's RSA encrypted message digest 76 (the digital signature) using the sender's RSA public key 77. The recipient also-uses the same hashing algorithm 73 to produce a message digest 74 from the received message. The two message digests resulting from the two transformations performed by the recipient should be identical, thus verifying that the message was signed by the sender.

Another system of digital signature, called DSA for Digital Signature Algorithm, may also be used for sender verification. The DSA Algorithm was disclosed in U.S. patent application Ser. No. 07/738,431, which is hereby incorporated by reference in its entirety. The DSA Algorithm has properties that are similar to those of the RSA signature algorithm in that the sender passes the message through a hashing algorithm to produce a message digest and then encrypts or signs the message digest using his private key; the recipient verifies the encrypted digest using the-sender's public key. However, unlike the RSA signature algorithm that returns the original message digest when the recipient decrypts the signature block, the DSA verification algorithm results only in a positive confirmation of the validity of the signature; communications encrypted using an intended recipient's public key cannot later be recovered by decryption with the recipient's corresponding private key. For this reason, the DSA algorithm may be used quite capably for digital signatures, but not for key transport or for direct message encryption.

In order for the public/private key system to operate efficiently, users must trust a centralized key certifying authority to be responsible for publicizing and updating a directory of public encryption keys. The key certifying authority must be trusted by all users, both senders and recipients, to distribute the correct public keys for all users so that no messages are transmitted to unintended recipients. To this end, as discussed above and elaborated below, the certifying authority would distribute each user's name and public encryption key information, and would affix its own digital signature to the distributed information in order to certify the correctness of the information. However, when more than one entity, or a hierarchy of entities, is involved in the certification process, there are several different methodologies or "trust models" for determining how a user will process the certificates. The three main models are (1) a pure hierarchical model, (2) a model using cross-certification between multiple hierarchies, and (3) a "local trust" model. These models are described in detail in the standards document American National Standard X9.30, "Public Key Cryptography Using Irreversible Algorithms for the Financial Services Industry: Part 3: Certificate Management for DSA" (American Bankers Assn., Washington, D.C., 1992), which is hereby incorporated by reference in its entirety. Although there is not yet a general consensus as to which of the above-mentioned trust models is best, it is assumed throughout this disclosure that an appropriate, generally accepted certification trust model will be established and adhered to whenever certificates issued by more than one entity are involved.

The public/private key system described above takes into account the privacy interests of the users who wish to transmit and receive communications privately. In addition, however, there are also the law enforcement and national security interests of governments to be considered. The ability of the government to monitor or eavesdrop on otherwise private electronic transmissions for law enforcement and national security purposes must be preserved so that suspected criminals, terrorists and foreign spies are not permitted to conspire beyond the reach of the law. Whereas telephone communications can be monitored through wiretapping, cryptographic algorithms make the enciphered data unable to be deciphered even by powerful codebreaking computers. The increase in the volume and percentage of digital and digitized transmissions encrypted with advanced algorithms will, therefore, serve to frustrate and thwart the lawful government electronic surveillance of these communications, especially if cryptographic devices are widely implemented in telephones, computers, facsimile machines and all other data processing equipment.

One way to enable the government or other authorized investigators to monitor communications of suspected criminals is to require all users of cryptographic communications to escrow their private decryption keys with either a private authority or the government, i.e. allow either the private authority or the government to be the trusted custodian of the users' private decryption keys. When necessary for surveillance, the government then will have access to or will be able to gain access to the private keys in order to monitor all encrypted communications. This method, however, is unworkable because it contains insufficient safeguards against abuse by the government of the private decryption keys and against possible leaking of the private decryption keys to unauthorized third parties either by theft from the government or the private authority or by corruption of government or private authority personnel.

Another method of escrowing private decryption keys to preserve both user privacy interests and law enforcement security interests is by using a system such as the method described in "Fair Public Key Cryptosystems," proposed by Silvio Micali at CRYPTO 92 in March 1993 and published by the Laboratory for Computer Science of the Massachusetts Institute of Technology on Oct. 13, 1993, and in U.S. Pat. No. 5,276,737, both of which are hereby incorporated by reference. By this method, shown in FIGS. 9–11, a user who wishes to certify his public key for encryption purposes must escrow his private key in the following manner. As shown in FIG. 9, the user first breaks his private key 91 into several "pieces" 92, each of which. can be individually verified 90 to be a valid part of the complete private key 91. The private key can be reconstructed only with knowledge of all the pieces or some specified number of them. The user then sends 93 each piece to a different escrow agent or agency 94, who, as shown in FIG. 10, verifies 95 the piece as a correct part of the private key 91 using a special algorithm and communicates this verification 96 to a master escrow center. Referring to FIG. 11, after receiving verification 96,97 that each piece of the private key is correct, the master escrow center can then issue a certificate 98 for the user's public key 99, allowing it to be used in a privacy system with the assurance that, if need be and pursuant only to a warrant or court order, law enforcement agencies will be able to obtain the secret pieces of the private key from the user's chosen escrow agents, recombine them and monitor the communications of that user. By this system, users can be assured of the privacy of their encrypted transmissions, and government can be assured of its ability to gain access to encrypted transmissions upon a showing of need. Because no one entity normally ever has access to the complete private key and because the user chooses entities that he trusts, the chances of unlawful or corrupt actions are greatly reduced. Also, because a wider range of entities would be eligible as escrow agents, the chances of simultaneously compromising all the escrow agents, and thereby disrupting all trusted commerce, is even further reduced.

The master escrow center, as a trusted authority certifying the authenticity of the user's public key, periodically issues a publicly-available certificate attesting or notarizing the connection between the public encryption key and its owner's identifying information. The certificate of authenticity assures the sender that transmissions to that named public key user will in fact be received and read only by the intended recipient. The certificate is usually in an internationally recognized electronic format, such as the one specified in CCITT Recommendation X.509 and issued as an international standard by the International Standards Organization (ISO). An example of a public encryption key escrow certificate format is shown in FIG. 12. The certificate contains, among other things, the name of the organization or key management center that created the certificate (the issuer) 121, the owner's public key 122, the owner's identifying information 126, a certificate serial number 123, and validity starting and ending dates 124. The issuer's digital signature 125 "seals" the certificate and prevents its alteration.

U.S. government, however, has proposed as a government (and possible industry) standard another method to enable it to escrow private decryption keys and to monitor communications. The U.S. government has developed a microcircuit, called the "Clipper chip," that can be built into government and commercially-produced telephones and computer devices. The Clipper chip is a low-cost chip that may be used for bulk encryption and key management; the Capstone chip is a more advanced version of the Clipper chip that adds digital signature and message digest capabilities. Like other encryption systems, the Clipper chip uses a symmetric encryption algorithm, albeit a classified algorithm called Skipjack, that scrambles telephone and digital computer data communications in a manner similar to DES, but using an 80-bit key. Each Clipper chip has a unique serial number, a Clipper family key common to all Clipper chips and its own symmetric private device key that will be needed by authorized government agencies in order to decode messages encoded by a device containing the chip. When the device containing the chip,is manufactured, the unique private device key will be split into two components (called "key splits") and deposited separately with two key escrow data bases or agencies that will be established within the government. Law enforcement agents can gain access to these private device keys by obtaining a warrant or other legal authorization to wiretap or monitor the and by presenting the warrant to the two escrow agencies.

When users of Clipper chip devices wish to communicate, they first agree on a symmetric session key with which to encrypt the communications. Any method of deriving the symmetric session key, such as Interactive Diffie-Hellman key derivation process, and any method of transporting the DES session key between users, such as RSA transport, may be used. At the start of each communication, each user sends to the other a Law Enforcement Access Field (LEAF) that contains enough information to allow law enforcement agents to wiretap or monitor the communication. The believed format of the Clipper LEAF is shown in FIG. 13 (note that because the precise details of the LEAF format, creation and verification are currently classified "secret" by the U.S. government, this discussion and FIG. 13 are both somewhat speculative). To form the LEAF, the session key is first encrypted using the private device key; then the device-key-encrypted session key, the sender device's serial number and a checksum (a verifying value) of the original unencrypted session key are together encrypted with the Clipper family key to complete the LEAF. The message is then encrypted using the chosen session key. The session-key-encrypted message and the family-key-encrypted LEAF are together transmitted to the recipient. Upon receiving the communication the receiving user first loads the received LEAF into his Clipper chip in order to check whether the LEAF is valid and whether the session key encrypted within the LEAF matches the session key previously received. If the LEAF is valid, the Clipper chip will decrypt the message with the chosen session key that was previously received.

A law enforcement agent lawfully wiretapping or monitoring the communication, however, does not know the session key and thus must first decrypt the LEAF in order to obtain the session key. The agent intercepts the desired LEAF, decrypts it using the Clipper family key and then presents the chip serial number from the LEAF and a court-ordered warrant or other legal authorization to the two government escrow agents, receiving in return the two key splits of the wire-tapped user's private device key. The agent combines the two escrowed device key components and uses the resulting device key to decrypt the device-key-encrypted session key from the LEAF. The session key can then be used to decrypt the actual messages from the communications. The requirement that the sender and recipient each create a LEAF and validate the other's LEAF insures that law enforcement agents will have a reasonable chance at intercepting the LEAF, since each LEAF is expected to pass between the users over the same communications medium. Further, it allows law enforcement to selectively monitor only one suspected user by decrypting the LEAF generated by that user, regardless of which user originated the communication.

Unfortunately, there are many technical problems with the government's Clipper chip proposal, mostly stemming from the fact that the private keys to be escrowed are permanently embedded in the Clipper chips during manufacture. Because the private encryption key for a particular device is burned into the chip and cannot be changed, the chip and probably the entire device that contains it must be discarded if compromised. It is preferable for the user of a particular device to be able to rekey, reescrow and recertify the device at will if compromise is suspected or at regular intervals to avoid potential compromise. In addition to the inability of the user to rekey and reescrow, the user of the Clipper device has no choice of the number or the identities of the key escrow agents employed by the government to safeguard his private key. Instead, the private key splits are deposited in two escrow data bases or agencies established by the government. Users may not trust the Clipper chip devices due to the risk that the government may have complete access to any transmission or transaction through the device, access that could be abused or corrupted. Users may also desire that their keys be escrowed with more trustees than the government provides, in order that their private keys will be more secure. If the concept of key escrow is to have significance, each user must be able to choose his own trustees with whom to escrow his private keys, based upon the level of trust desired.

Also, it is believed that the government Clipper system allows users to communicate only symmetrically and in real time, and does not provide any direct support for store-and-forward electronic-mail type messaging. Prior to encrypting communications, the sender and recipient must first agree on a symmetric session key with which to encrypt the communications. Typically, this key exchange is done using the Interactive Diffie-Hellman scheme, the only key exchange method believed to be supported by the Clipper chip. Thus, unless they wish to arrange their own key management system, users are restricted to simultaneous, interactive communications, such as real-time voice or facsimile communications. In order to use store-and-forward electronic-mail type messaging, however, a user must be able to access the intended recipient's public key, such as by using a Certified Diffie-Hellman or a certified RSA key transport scheme, even if the intended recipient is not available for an interactive on-line communication. Because it is believed that the government's Clipper system does not facilitate this, store-and-forward messaging is difficult. The government's proposed standard system thus may tend to limit the communications capabilities of users to on-line interaction.

Moreover, under the government system, the users' employers have no access to the encrypted data or transmissions of their employees. Employers, on whose behalf the employees are developing, communicating or transmitting confidential or proprietary data, must retain the right to gain access to their employees' data or transmissions. Many situations could arise wherein encrypted information would be available only to the specific employees directly engaged in using the cryptographic systems and not to the management or boards of directors who are responsible for those employees and who own the corporate data resources. By encrypting data or communications, employees could develop or appropriate for themselves new programs, products and technologies or could conduct illegal activities and transactions, all without their employers' knowledge. Also, movement or reorganization of staff and changes of storage facilities could result in the loss of massive amounts of information that was important enough at the time of encryption to be encrypted. See Donn B. Parker, "Crypto and Avoidance of Business Information Anarchy" (Invited speaker presentation at First Annual AC Conference on Computer and Communication Security, Nov. 3–5, 1993, Reston, Va.), which is hereby incorporated by reference. Aside from the originator of the data or the sender of the transmissions, the Clipper chip allows only the government to have access to the transmissions. Although employers could seek a court-issued warrant in order to monitor their employees' communications, employers may wish to monitor their internal officers in a more discreet fashion than by initiating a federal investigation any time suspicion is aroused.

Furthermore, mandating a classified algorithm that is embedded in the chip and thus available only in hardware and only from government-authorized chip manufacturers injects the government into the rapidly changing and highly competitive market for communications and computer hardware. A government agency or a government-authorized manufacturer may be unable or unwilling to design and market advanced devices and products specially tailored for particular companies as would a private manufacturer. If the government authorizes only certain vendors to manufacture the chips having the classified algorithm, competition will be reduced and the technology will be prevented from being incorporated into other products. Additionally, because the details of the Skipjack algorithm have not been made public, suspicion has arisen as to whether the algorithm could be insecure, due either to an oversight by its designers or to the deliberate introduction by the government of a trap door. An important value of cryptosystem design is that the privacy and security of the encrypted messages should depend on the secrecy of the relevant key values, not on the secrecy of the system's details.

It is, therefore, desirable to provide a commercial key escrow system that uses published algorithms, operates in a manner that inspires the users' trust and confidence, and solves the problems posed by national security and law enforcement demands.

It is also desirable to provide a commercial key escrow system that uses private keys that may be changed by the user at will or at regular intervals.

It is further desirable to provide a commercial key escrow system that allows the user to choose the key escrow agents to safeguard his private key or the separate pieces of his private key.

It is still further desirable to provide a commercial key escrow system that contains safeguards against unrestricted government access, yet allows access by the employers of the users or by the countries of which the foreign users are citizens.

It is also desirable to provide a commercial key escrow system that offers an alternative to the U.S. Government's proposed Clipper chip system.

SUMMARY OF THE INVENTION

It is one object of this invention to provide a commercial key escrow system that uses published algorithms, operates in a manner that inspires the users' trust and confidence, and solves the problems posed by national security and law enforcement demands.

It is another object of this invention to provide a commercial key escrow system that uses private keys that may be changed by the user at will or at regular intervals.

It is a further object of this invention to provide a commercial key escrow system that allows the user to choose the key escrow agents to safeguard his private key or the separate pieces of his private key.

It is still a further object of this invention provide a commercial key escrow system that contains safeguards against unrestricted government access, yet allows access by the employers of the users or by the countries of which the foreign users are citizens.

It is yet another object of this invention to provide a commercial key escrow system that offers an alternative to the U.S. Government's proposed Clipper chip system.

These and other objects of the invention are accomplished in accordance with the principles of the invention by providing a cryptographic key escrow system that uses a method, such as the Micali "Fair" escrow method, for verifiably splitting users' private encryption keys into components and for sending those components to trusted agents chosen by the particular users, and by providing a system that uses modern public key certificate management, enforced by a chip device that also self-certifies. In a preferred embodiment of this invention, the new chip encrypts or decrypts only if certain conditions are met, namely, (1) if a valid "sender certificate" and a valid "recipient certificate" are input, where "valid" means that the particular user's private decryption key is provably escrowed with a specified number of escrow agents and that the master escrow center is registered and certified by the chip manufacturer, and (2) if a valid Message Control Header is generated by the sender and validated by the recipient, thereby giving authorized investigators sufficient information with which to request and obtain the escrowed keys. Because this invention relies upon a system of certificate management, it can be made very flexible and independent of location and time, unlike purely on-line systems. The methods for escrowing a private decryption key and receiving an escrow certificate are also applied herein to a more generalized case of registering a trusted device with a trusted third party and receiving authorization from that party enabling the device to communicate with other trusted devices.

A further preferred embodiment of this invention provides a method for generating verifiably trusted communications among a plurality of users, comprising the steps of escrowing at a trusted escrow center a plurality of asymmetric cryptographic keys to be used by a plurality of users; verifying each of said plurality of keys at the escrow center; certifying the authorization of each of said plurality of keys upon verification; and initiating a communication from each of said plurality of users using a respective one of said plurality of keys contingent upon said certification. Further embodiments of this invention provide for decoding of communications by authorized law enforcement agents, based upon use of the Message Control Header included with each communication, using a special law enforcement decoder box and auditing of the law enforcement wiretaps to prevent abuse by law enforcement and other officials. Further preferred embodiments provide for rekeying and upgrading of device firmware using a certificate system, and encryption of stream-oriented data.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIGS. 1A–1G are lists of symbols and abbreviations that are used in the figures of this invention;

FIG. 2 is a flowchart showing the steps of the prior art Interactive Diffie-Hellman key derivation method;

FIG. 4 is a flowchart showing the steps of the messaging portion of the prior art Certified Diffie-Hellman method;

FIG. 5 is a flowchart showing the steps of encryption using the prior art RSA key transport method;

FIG. 6 is a flowchart showing the steps of decryption using the prior art RSA key transport method;

FIG. 7 is a flowchart showing the steps of signature creation using the prior art RSA method;

FIG. 8 is a flowchart showing the steps of signature verification using the prior art RSA method;

FIGS. 9–11 are flowcharts that together show the steps of the prior art Micali key escrow process;

FIG. 12 is an example of the format for a prior art public encryption key escrow certificate;

FIG. 13 is an example of the believed format of the Clipper device Law Enforcement Access Field (LEAF);

FIG. 14 is an example of the format for a device certificate issued by the manufacturers of the device of the present invention;

FIG. 15 is a flowchart showing the steps of a method of verifiably escrowing a key with only one escrow agent;

FIG. 16 is a flowchart showing the steps of a method of verifiably escrowing a key, based on the trusted device alone;

FIG. 17 is a flowchart showing the steps of a method of sending an encrypted message with a Message Control Header (MCH);

FIG. 18 is an example of a MCH in RSA key transport format;

FIG. 19 is a flowchart showing the steps of a method of receiving an encrypted message with a MCH;

FIG. 20 is an example of a MCH decoder box and a flowchart for its process flow;

FIG. 22 is an example of the format for a device owner certificate issued by the manufacturer of the device of the present invention;

FIG. 24 is a flowchart showing the steps of a method for registration of the trusted device of the present invention with a trusted third party.

FIG. 25 is an example of a format for a Law Enforcement Access Field for multiple recipients.

FIG. 29 and 30 are flowcharts showing the steps of a method for enforcement of the escrow requirements by either sender or recipient.

DETAILED DESCRIPTION OF THE INVENTION

Figure 3:
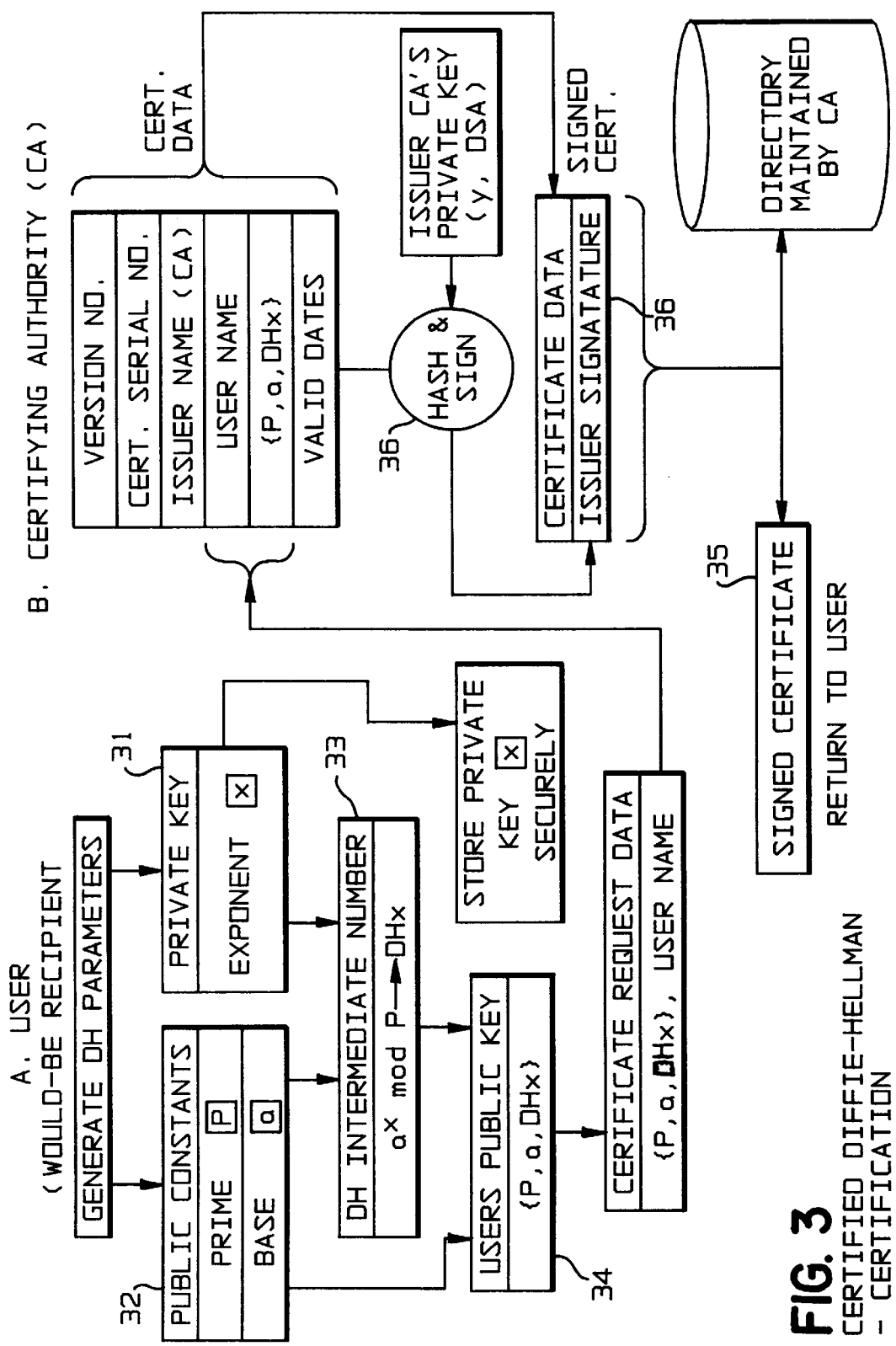
FIG. 3 is a flowchart showing the steps of the certification portion of the prior art Certified Diffie-Hellman method.

Public key cryptosystems, including the use of digital signatures, can potentially be the cornerstone of the creation of national, or even global, paperless electronic document systems. Use of these systems will have enormous commercial significance in terms of costs savings. The critical element in the development and widespread acceptance of these systems is the reliance placed upon the underlying cryptosystems and the digital signatures by governments, banks, corporations and other users, including individual users. Reliance on these systems should arise not from trust by each user of its own internal system or of other users, but rather from trust by each user of the public key cryptosystem and of the certification mechanisms it provides. The commercial cryptosystem of the present invention satisfies these concerns by using self-certifying and, therefore, trusted, encryption devices as the impartial arbiters of trust.

In a preferred embodiment of the present invention, the tamper-resistant chip, or a tamper-resistant trusted device containing the chip, that performs the encryption, decryption and digital signature is embedded with a non-modifiable public/private signature key pair unique to that chip and with a "manufacturer's certificate." The embedded manufacturer's certificate enables the device containing the chip (a) to digitally "sign" documents and communications ("data structures") using its own private device signature key proving that they uniquely originated from that device and (b) to prove by appending the manufacturer's certificate to documents and communications that those data structures can be trusted because the originating device is one of known and trusted type and is made by that trusted manufacturer. The manufacturer's certificate in effect says, "The device whose private key matches the public key certified herein is of type XXX. Signed, Manufacturer." Because the private signature key is embedded in a tamper-resistant manner and because the manufacturer is trusted, documents and communications issued by the device and signed using the private signature key will also be trusted.

A preferred embodiment of the present invention contains seven major phases of use: (1) creation or manufacture of the chips contained in the device, (2) registration of the device's encryption key with escrow agents, (3) normal encryption and decryption of user messages, (4) decoding of communications by authorized law enforcement agents, (5) rekeying and upgrading of the device by the owner or employer, (6) auditing of law enforcement wiretaps, (7) encryption of stream-oriented data, and (8) national security safeguards.

Manufacture of the Trusted Device

Manufacture of trusted devices of the present invention is based on the presence of-the following general features:

(1) An embedded microprocessor (or microcontroller), a miniature computer that mediates all outside access and performs various computational and programming operations;

(2) An optional cryptographic coprocessor, which can perform standard mathematical encrypting and decrypting operations at much higher speed than can a general purpose microprocessor and which will preferably contain a hardware noise source, such as a diode noise source, to assist in the generation of certifiably random numbers as needed for cryptographic key generation;

(3) An input-output interface or subsystem to assist in handling the flow of data and commands to and from the microprocessor, which may include a status display or monitor; and (4) A memory subsystem that may potentially employ several types of memory storage technology, each having a different characteristics of permanence and accessibility, such as (a) Read Only Memory ("ROM") that can contain permanent and unchangeable programs and data, (b) Electrically Erasable Programmable Read Only Memory ("EEPROM") or "FLASH" memory, that can contain semi-permanent programs and data, i.e. they can be changed but nevertheless are not lost when device power is lost or shut off, and (c) Random Access Memory ("RAM"), which can be used for temporary calculations and temporary data storage but is lost when power is shut off.

The entire device is designed and manufactured in such a way that all its elements, including especially the permanent and semi-permanent memory areas, are shielded from tampering that might reveal their contents or alter their modes of operation. One way to shield the device elements from tampering is through the use of special coatings that are difficult to remove without destroying the information that underlies the coatings. In addition, there are other features that can cause the memory to be erased if any alteration to the physical enclosure of any of the memory areas is attempted or if suspicious actions that may signal tampering attempts, such as cooling the device to abnormally low temperatures in an attempt to deactivate and defeat the device's internal defense mechanisms, occur. Some of these protective features may require a constant source of battery power, such that the device can take electrical actions to delete important data if tampering is suspected. The present invention does not specify any particular preferred method of making the devices tamper-resistant, but rather relies on existing or future technologies that may be or may become generally regarded as providing an acceptable degree of protection from unauthorized disclosure or modification of the data contained in the devices. A device with such characteristics is sometimes referred to as a tamper-resistant secure module (TRSM), of which a current example is the Clipper/Capstone device, discussed earlier, commercially available from Mykotronx, Inc.

The manufacturer of the chips may be any of the many major computer microprocessor chip manufacturers. The manufacturer should preferably be one who is known to the cryptographic industry and is trusted with respect to chip quality and security and the integrity of its manufacturing process.

The chips manufactured in order to be used in an embodiment of this invention would include the following capabilities. The chip would first include an embedded device public/private key pair for device signatures to be issued by the device, where the private signature key is non-readable and tamper-resistant. The cryptographic signature keys may be of any acceptable cryptographic type, such as RSA. However, because RSA has both encryption and signature capabilities and because it is desirable to isolate the signature and encryption processes, the cryptographic signature key should preferably be DSA. The chip would also include an embedded and tamper-resistant manufacturer's certificate for the device signature key, an example of the format for which is shown in FIG. 14. The device containing the chip can append this certificate to its signatures in order to prove that the signatures originated from a device of known and trusted type having the qualities described below.

A chip manufactured for use in an embodiment of the present invention would also include the manufacturer's public signature verification key embedded within the chip in a tamper-resistant manner. The manufacturer's public signature key can be used by the user to verify instructions received from others by checking whether those instructions have attached a valid digital signature created by the manufacturer's private signature key, in order to determine whether those instructions originated with the manufacturer or one trusted by the manufacturer. The chip may also include embedded and tamper-resistant public instructions keys that can be used by the user to verify instructions received from others. The public instructions key could be the public key of some other trusted entity, such as Bankers Trust Co., selected by the manufacturer or could be the public key of a trusted national or global system-wide authority, and may optionally be embedded into the chip by the manufacturer for use as a "short-cut" to avoid having to verify the extra manufacturer-to-trusted-entity certificate. The manufacturer could install several instruction keys of various qualified key escrow houses that the manufacturer selects and believes to be capable and trusted.

Furthermore, the chip used in an embodiment of the present invention would have the ability to generate a public/private key pair for encryption and decryption of data and communications by the individual user. The cryptographic encryption keys may be of any acceptable asymmetric cryptographic type, such as RSA. The cryptographic keys should, however, preferably be of the Diffie-Hellman type, i.e. the user's secret number is the private key and the user's publicized intermediate number is the public key, which are together used in the Certified Diffie-Hellman scheme to generate a session key that is used to encrypt and decrypt communications. The private key so generated is then stored inside the chips in a non-readable and tamper-resistant manner. In addition, the chip would also have the ability, once a public/private encryption key pair for that device has already been generated, to rekey and generate a new public/private encryption key pair in place of the previous key pair. In another embodiment, Interactive Diffie-Hellman key generation can also be used, as discussed later, in order to ensure that all senders and recipients contribute new random numbers to generate the message session keys.

In the preferred embodiment of this invention, the trusted device will have the ability to decrypt encrypted communications only on two conditions. The first condition is that valid master escrow center certificates for both the sending and the recipient devices must have been fed into the device prior to its receiving the encrypted transmission. Each certificate is valid if it is signed by a master escrow center certifying that the private decryption key of that device has been escrowed with one or more qualified escrow agents, and preferably with two or more Micali-style agents that employ a verifiable key-splitting protocol. This master escrow center certificate either must be accompanied by another certificate issued by the manufacturer establishing the named master escrow center as a valid escrow agent, or must be signed by a third party (a trusted national or global system-wide authority) named as a holder of a public instructions key embedded into the chip by the manufacturer. The second condition for decryption is that the message to be decrypted must be preceded by a valid Message Control Header (MCH) data field (the format for which will be described later) so that law enforcement or employer security personnel will have sufficient data from which to obtain the recipient's escrowed private keys and therewith monitor the communication.

In another embodiment of this invention, the chip will also have the ability to generate a public/private key pair to be used for user signatures, distinct from the embedded key pair that is used for device signatures. As with the device signature key pair, the cryptographic user signature keys may be of any acceptable cryptographic type, such as RSA, but should preferably be DSA, again to avoid any possible confusion with the keys used for message encryption. The user signature private key should be non-readable and tamper-resistant. The user would use the signature private key to sign his communications for sender verification and non-repudiation purposes. In still another embodiment of this invention, the chip also has the ability to use the device signature key in order to sign a request for certification of the user public signature key that it has generated for the user, thus proving that the user signature key pair was generated by, and the private key is being safeguarded by, a device of known tamper-resistant properties. In further embodiments of this invention, the chip may also have a hardware noise source, such as a diode noise source, to generate random numbers during key generation, and a unique physical device serial number to allow the device or its actions to be tracked in accounting, network management and inventory systems. In this embodiment, the device signature would certify not only that the user's device is of known tamper-resistant properties but also that every key or random number generated by the device was randomly generated anew each time using a high-quality random number generator, preferably a diode noise source.

In manufacturing the trusted device containing the chip of the present invention, the chip's memory is divided into at least three general areas as follows: (1) permanent and non-modifiable memory space containing data and firmware embedded into the chip during manufacture; (2) semi-permanent and modifiable memory space containing data, such as the user's private encryption and signature keys, generated for the user and held in trust for the user by the chip, which data and keys may be utilized by the chip to make digital signatures or to decrypt on the user's behalf but which are never disclosed outside the device; and (3) non-permanent and temporary memory space containing work area used for temporary storage of the inputs, intermediate results and final results of various data processing operations. Depending on the design, these three general areas could each reside in a different type of memory storage system, such as ROM for permanent data, EEPROM or FLASH memory for user data held in trust, and RAM for volatile temporary storage. Another approach might be to use FLASH memory for both permanent and non-permanent data. Yet another option is to utilize a chip operating system that would manage the microprocessor's memory using a directory of objects. Under this approach, one portion of memory can be devoted to a table or directory of the other items in memory and may include standardized information for each object, such as:

logical name (e.g., "manufacturer's public key");

type (e.g., key, certificate, code routine, etc.);

start address and length of data (in bytes);

date last modified (optional);

protection level (permanent, user or volatile);

disclosure level (externally readable or not externally readable).

In this manner, so long as the whole memory is equally temper-resistant, no special areas need be designated for protected or non-protected data because the microprocessor can readily enforce the desired level of protection based on the code contained in the relevant directory entry for the data object. This scheme can also apply to firmware code routines just as easily as to data, and may be advantageously applied when upgrading or replacing trusted firmware code routines without needing to physically replace the device or any of its memory units.

The protected memory areas of a device of a preferred embodiment of the present invention might contain the following types of information, including both data and firmware program code.

A. Permanently Embedded by Manufacturer
  1. May Be Externally Disclosed
    a. system-wide authority public key (optional)
    b. manufacturer public key
    c. manufacturer certificate from system-wide authority
    d. device public key
    e. device certificate from manufacturer
    f. device unique serial number
    g. firmware version numbers
    h. trusted bank public instruction keys 2. May Not Be Externally Disclosed
   a. device private signature key
3. Firmware
   a. operating system and file system
   b. basic cryptographic library routines
   c. escrow system routines
   d. other trusted applications code B. Generated by User Operations and Held in Trust for User
   1. May Be Externally Disclosed
      a. user's public encryption key
      b. user's public encryption key escrow certificate
      c. user's public signature key
      d. user's public signature key certificate
   2. May Not Be Externally Disclosed
      a. user's private decryption key
      b. user's private signature key C. Other Non-Volatile Read-Write Storage (Optional)
   a. correspondents' signature certificates
   b. correspondents' escrow certificates
   c. correspondents' device certificates (for MCH verification)

D. Working Storage (Could Be Volatile)
   Public keys (all types), certificates (all types), hash values, signature blocks, other data structures being processed.

Key Escrow Process

After the chip of the present invention has been manufactured and prior to using the chip to encrypt or decrypt communications, the user's public decryption key must be registered with a master escrow center or with escrow agents approved by the chip manufacturer. Either the user may perform this operation himself or the manufacturer may initialize and register the chip with an escrow agent during manufacture, thus relieving the user of the requirement to escrow his keys by himself. However, the manufacturer could still leave the user the option to rekey by himself at a later time. For many individual users, allowing the manufacturer to register-the chip, either with or without a rekey option, will be sufficient. In addition, consumers would most likely trust in the escrow agents chosen by the chip manufacturer. Corporations or other employers could program their own chips and the chips of their employees, and could register the chips with escrow agents of their own choice. Corporations, however, would generally not permit their employees to rekey on their own, because this could result in loss of control over corporate information and assets, as discussed above.

In order to generate and register a decryption key, the user (or whatever entity is performing the operation) invokes a firmware program that has been embedded into the chip and that instructs the chip to perform the particular steps of the Micali key escrow method or of the specific key escrow method that is used. See FIGS. 9–11, 15 and 16. Using whichever method is chosen for escrowing the private key with one or more escrow agents, the chip will first randomly generate, or choose, a secret number that will be the private decryption key for that user (as well as the other, public numbers that will be required, if those numbers have not already been set by some other prior random generation). The chip will store the private key in a non-readable and tamper-resistant manner. As shown in FIG. 15, the private decryption key can be escrowed with a single escrow agent. The trusted device 150 first generates a public/private encryption key pair 151 for the user and then sends to the escrow center 153 an encrypted and signed message 152 consisting of the encryption key pair 151 and the device serial number 154, with the manufacturer's certificate 155 for signature verification. The escrow center 153 verifies the signatures, decrypts the message packet and stores the user's private decryption key. The escrow center 153 also sends to the user a signed certificate 156 consisting of the user's device serial number 154 and the user's public encryption key 151 and the device's public signature verification key 157, with the escrow center's certificate 158 for signature verification. Once the user's device verifies the escrow center's signature, registration is complete.

If the private key is to be escrowed with more than one escrow agent, then the chip will then break the private key into several pieces called key splits, according to a specific formula. Using the Micali escrow method and algorithm described earlier and shown in FIG. 9, the chip will next compute certain values 90 using the special Micali algorithm such that each value is based upon a mathematical transformation of one of the private key pieces 92. The chip then forms one share packet for each trustee or escrow agent 94 designated by the user, each share packet 93 containing the unique serial number of the user's device, one private key split and the set of certain values that enable the particular trustee to verify the received private key split as a valid part of the complete private key, without giving the trustee knowledge of the complete private key. As discussed later, if the user is not the owner of the device but rather, for example, an employee of the employer-owner, the trustee share packet would also include the unique identification number of the owner of the device and the device's owner certificate so that employer-owner would be able to obtain the private key of the employee-user without having to first obtain a warrant. The chip then signs each trustee share packet using the unique device private signature key and attaches the manufacturer's certificate for the transmitting chip, thereby attesting that the information transmitted originated from a device of known and trusted type. Finally, the chip will output each signed trustee share packet for delivery by the user to a trusted escrow agent.

There is another, preferred way for the master escrow center to verify the separate key splits, without using the Micali method, by relying upon the trusted device alone. Using this method of verifying the key splits, shown in FIG. 16, the chip generates one random number for each key split of the private encryption key. The chip then forms one share packet 161 for each trustee or escrow agent 163 designated by the user, each packet containing the unique number of the user's device, one private key split and one of the random numbers. The chip signs each trustee share packet using the unique device private signature key and attaches the manufacturer's certificate 162 for the transmitting chip, thereby attesting that the information transmitted originated from a device of known and trusted type. As with the Micali method, the chip will then output each signed trustee share packet 161 for delivery by the user to a trusted escrow agent 163. In addition, the chip must also create a message (encrypted) 164 to the master escrow center 165 containing, among other things, the user's public encryption key and the names of the escrow agents designated by the user and along with the random number given with the key splits to each respective escrow agent.

It is possible, however, because each trustee share packet contains a private key split, that a third party with access to communications from a user to the escrow agents could read the contents of all the user's share packets and recombine the private key splits within those packets in order to reassemble the complete private key. Then, using the private key, that third party could decrypt and encrypt communications in the name of the user. The best way to avoid this situation is by using encrypted communications systems when sending share packets from users to escrow agents. The user would obtain the public encryption key certificate 166 of each escrow agent selected for escrowing the user's private key, where each certificate is signed by the master escrow center certifying that the particular escrow agent is trusted by the master escrow center to receive and store a key split packet, and would then verify the master escrow center's signature either using a certificate from the device's manufacturer (or from a system-wide authority) or using a preembedded instructions key. The device would then encrypt for each escrow agent based upon that agent's certified public encryption key a transmission 161 that includes the user's private key share packet. Alternatively, the manufacturer could embed into the chip the public encryption keys of several trusted escrow agents matched with an instructions key for each, as discussed earlier, in order for the user to send his private key splits to escrow agents trusted by the holder of the instruction keys, which is typically the master escrow center. This way, all the escrow agents in the master escrow center's or the manufacturer's "family" could decrypt user requests for escrow, while sparing the user the burden of obtaining the public encryption key certificates of all escrow agents.

Once each escrow agent or trustee 163 receives the appropriate share packet 161 from the user or from the user's device, the trustee inspects the private key split received in the trustee share packet 161 from the user's device and, together with the master escrow center 165, verifies that it is a valid and correct part of the complete private key. It is necessary for the escrow agents and the master escrow center to have a reliable means of proving or verifying that the fragments of the user's private decryption key have in fact been deposited. It is desirable that verification of the key splits be accomplished by the escrow agents and the master escrow center without ever inspecting or possessing those fragments itself, or ever bringing them together in one location. The Micali "Fair" escrow system provides one highly trusted way for the escrow center to verify the separate deposits of the key fragments. In the Micali method, shown in FIGS. 10 and 11, this verification is done with the set of certain values that were computed by the user's chip during preparation of the share packet through use of a special Micali algorithm and that were included with the key split in each share packet to the escrow agents. The Micali algorithm and key split verification are known in the art and need not be repeated here. Each trustee 94 then stores the device's manufacturer's certificate for later use in decoding, and approves the key split 93 by sending an appropriate signed message 96 to the master escrow center, along with the user's name and device certificate, and by signing and storing the key split 90. Only when presented with either (a) a warrant or court order or (b) a signed request from the lawful owner of the device will the trustee reveal the piece (or pieces) of a given private decryption key in its possession.

Using the preferred escrow and verification method relying on the trusted device alone, shown in FIG. 16, each trustee 163 transmits a message 167 to the master escrow center 165 identifying the user's name, public encryption key, device number and the random number it received. In addition, the user device sends a packet to the master escrow center 165 containing the random numbers used for verification of the private key splits, and that packet should be encrypted using the master escrow center's public encryption key. The master escrow center 165 receives the messages 164,167 from the user device and from the trustees 163, and verifies that the individual random number received from each trustee matches the random number that the user device stated was given to that trustee. Note that under this method the escrow agents 163 and master escrow center 165 rely solely upon the trusted device's signature on the share packets 161 to assure themselves that the escrow is proper. This escrow and verification method does not need to perform any secondary mathematical operations in order to verify that the escrow is proper or that the public key presented for certification matches the deposited key fragments. Although from the standpoint of public, user or systemwide trust, it might still be desirable to utilize a verifiable key escrow algorithm such as the Micali process, it is clearly not necessary and may be dispensed with when the added cost of using such a process cannot be justified. In addition, by this method of relying upon the trusted device alone, there is no limit to the complexity of the key splitting schemes that can be devised, because there is no need to devise complex secondary algorithms to verify correct performance of any given scheme. It is necessary only to trust the integrity of the device manufacturer that embedded the firmware code and to trust that the device will resist tampering.

After verifying all the user's private key splits, the master escrow center itself further approves the public encryption key that corresponds to the private decryption key that was approved by all the user's trustees; the master escrow center 165 approves the public key by issuing a signed certificate 168 (called the master escrow center certificate, the public encryption key certificate, or simply, the escrow certificate) certifying that the private key corresponding to the public key being certified has already been escrowed in the proper fashion. The public signature key of the user's device, obtained from the device's manufacturer's certificate, can also be placed in the master escrow center certificate, thus eliminating the need to send or reverify the device manufacturer certificate at later points in the process. The master escrow center certificate could be formatted as follows:

Version Number

Escrow Certificate Serial Number

Master Escrow Center Country Code

Master Escrow Center Name

Master Escrow Center Public Encryption Key (for use in creating LEAF)

User Distinguished Name

User Public Encryption Key (hereby being certified)

User Device Public Signature Verification Key (to verify device signature)

Validity Date (start/end)

Master Escrow Center Signature

[Master Escrow Center System-wide Certificate]

Public encryption key certificates that have been issued by the master escrow center are distributed and can be used either by the device owner in order to activate his device to originate encrypted messages or by others to encrypt messages to the owner of the device containing that user's public/private encryption key pair.

It should be noted that the present invention does not require more than one escrow agent to be the recipient of the user's private encryption key splits; in some cases, it might be enough merely to deposit the user's private decryption key with a single escrow agent (or escrow center). However, in order to enhance user and public trust in the system, it is desirable to split the user's private decryption key among several escrow agents such that all the key splits, or some specified number of them, are required in order to reassemble the user's key and decrypt his communications. It is further desirable that each escrow agent be an independent, trusted business operation, thereby effecting "split knowledge," so that in the event of attempted corruption, bribery, extortion or abuse, it will be much more difficult to wrongfully obtain the user's private decryption key than it would be if the private key were stored with a single entity. It is also desirable that the entities be separated geographically in order to further suppress attempted subversion or corruption.

Encryption of Communications

A user who desires to send an encrypted communication to another user must have an escrow certificate for his own device and an escrow certificate for the intended recipient's public encryption key, because the device of the present invention will neither encrypt nor decrypt if either is missing. First, the sender must load his own valid certificate into the device, typically when he first receives it from the master escrow center. Then, the intended recipient's public key certificate can be obtained either from the intended recipient directly, from a directory service listing public key certificates, or from the sender's local file, e.g. a file of users with whom the sender has previously exchanged encrypted communications. In one embodiment of the present invention, because the sender's device will not encrypt and the recipient's device will not decrypt unless the recipient's public encryption key certificate is "valid," in order for the recipient's device to decrypt the encrypted message, the recipient's public encryption key certificate must be signed by either (a) the recipient device's manufacturer (this is unlikely to be the case because device manufacturers will most probably not be escrowing user's private keys); (b) the master escrow center, and accompanied by a manufacturer's certificate approving the master escrow center as a valid trustee; or (c) a trustee or master escrow center whose instructions key was embedded into the device during manufacture. Using the intended recipient's certified public encryption key as set forth in the recipient's public encryption key certificate, the sending user then generates a session key for use by both the sender and the recipient to encrypt and decrypt the communication. This session key can be generated preferably using the Certified Diffie-Hellman method or, alternatively, any other equivalent system. In the Certified Diffie-Hellman method, the user first randomly generates his ephemeral private key for that message and then computes the session key based upon his own private key and the recipient's public key (i.e., the recipient's intermediate number and the two public numbers, which are all contained with the recipient's public encryption key certificate). Then, using the session key, the sender encrypts the message to be sent to the recipient user.

However, in deciding whether or not to send an encrypted message to the intended recipient, the sender may be unable to verify the properties of the recipient's public encryption key certificate or of the digital signatures thereon if the sender's device were made by a manufacturer different from the one that made the recipient's device. The fact that the recipient's device was made by a different manufacturer would prevent the sender's device from easily verifying either the manufacturer's signature or the certificate of the manufacturer (that certified the master escrow center that signed the recipient's key escrow certificate) stating that the recipient's master escrow center is valid and approved by that manufacturer. Likewise, the recipient's chip would be unable to verify these conditions with respect to the sender's certificate before decrypting. Enforcement of the escrow restriction on both parties is needed in order to enable law enforcement agents to lawfully intercept and decrypt messages being both sent and received by a given suspected user, without necessarily obtaining the other, non-monitored party's private decryption key and, thereby, access that non-monitored party's unrelated messages.

One way to address this issue, while still allowing more than one manufacturer to make cryptographic devices, is to embed into the device or into a certificate issued by either the user's master escrow center or the chip manufacturer a public key from a trusted national entity, for example the Federal Reserve Bank ("FRB"), which could be used to verify yet another certificate issued by the FRB to each of the other various master escrow centers or manufacturers. Such a certificate would verify the trustworthiness of the particular master escrow center or manufacturer and would be signed by the FRB. A sending user could then obtain the public encryption key certificate of an intended recipient and could trust the master escrow center that issued the certificate because the master escrow center was accredited by the FRB, rather than by the chip manufacturer, as certified by the FRB public key or certificate. Also, the signature of a particular device could be trusted because the other manufacturer that certified that device was accredited by the FRB, as certified by the FRB certificate or public key. In order to deal with this issue on a less parochial United States-based level and promote a more international and worldwide system, the public key of a trusted global entity, such as the Bank for International Settlements in Switzerland, could be embedded into either the trusted device, the FRB certificate or the master escrow center or manufacturer certificate (depending upon the trust model employed), and could operate the same way discussed regarding the FRB key, in order to accredit master escrow centers and manufacturers on a worldwide basis. Another way, albeit one not involving U.S. or world authorities, for one device to trust the escrow centers certified by another manufacturer is for the device manufacturers or master escrow centers to cross-certify each other. This would allow the sender's device to help enforce the recipient's escrow restrictions by allowing the sender's device to verify the certification path of the recipient's escrow certificate back through the recipient's device manufacturer or master escrow center to his own. In the preferred embodiment, the public key of a trusted system-wide entity would be embedded into the trusted device and would operate the same way discussed above regarding the FRB or global entity key, in order to accredit all the master escrow centers and manufacturers on a system-wide basis.

Whenever any user, entity or device "verifies" a digitally signed "certificate," whether a manufacturer's certificate or an escrow certificate, issued by a certifying authority or manufacturer, it is common practice in most or all actual and proposed public key certificate management systems (and it is assumed throughout this disclosure) that the user, entity or device also checks any applicable "certificate revocation list" ("CRL") in order to determine whether the certifying authority or other issuer has distributed, propagated or otherwise made available a list of revoked certificates that is updated in accord with an appropriate security policy and whether, based upon the issuer name and certificate number, the certificate has been revoked. A certificate issued to a user could be revoked for death, name or employment change, or loss, theft or destruction of the device (the personal smart card) containing the private key. A certificate issued to an entity may be revoked due to cessation of business, name change, or loss, theft or destruction of the device containing the private key. A certificate issued to a device may be revoked due to loss, theft, removal from service or destruction of the device. The checking of CRLs during certificate verification is well-described in the public literature (e.g., ANSI X9.30—Part 3) and does not require further discussion. All users, entities and devices will normally have access to appropriate telecommunications facilities and can retrieve CRLs or perform inquiries as desired. Likewise, under the present invention, all entities issuing CRLs are presumed to make them available to all interested parties.

Message Control Header Format

When sending an encrypted communication, the sending user must also form a suitable Message Control Header (MCH) field containing the following information:

(1) The sender's intermediate number for the encrypted message, computed by the sender using the sender's randomly generated ephemeral private key that was also used by the sender to compute the session key with which the message was encrypted. The recipient user must have this intermediate number in order to compute the session key for decrypting the message.

(2) The name and country code of the sender's master escrow center.

(3) The name and country code of the recipient's master escrow center, obtained from the recipient's public key certificate.

(4) The sender's escrow certificate number, encrypted using the public encryption key of the sender's master escrow center (obtained from the sender's escrow certificate) so that only the sender's master escrow center may decrypt it.

(5) The sender's intermediate number (different from the sender's previous intermediate number) that was used by the sender to compute the ephemeral session key with which the sender's certificate number was encrypted to the sender's master escrow center. The sender's master escrow center must have this number in order to compute the ephemeral key for decrypting the sender's certificate number.

(6) The session key for the encrypted message, encrypted using the sender's own public key (the intermediate number from the sender's own public certificate), so that in effect the sender sends the message session key to himself. Law enforcement can gain access to this message session key once it obtains the sender's private key components from the sender's escrow agents.

(7) The sender's intermediate number (different from the sender's two previous intermediate numbers) that was used by the sender to compute the ephemeral key with which the message session key was encrypted to himself. Law enforcement must have this number in order to compute, using also the sender's private key (his secret number) obtained from the sender's master escrow center, the ephemeral key for decrypting the message session key.

(8) The recipient's certificate number, encrypted using the public encryption key of the recipient's master escrow center (obtained from the recipient's escrow certificate) so that only the recipient's master escrow center may decrypt it.

(9) The sender's intermediate number (different from the sender's three previous intermediate numbers) that was used by the sender to compute the ephemeral key with which the recipient's escrow certificate number was encrypted to the recipient's master escrow center. The recipient's master escrow center must have this number in order to compute the ephemeral session key for decrypting the recipient's certificate number.

(10) Timestamp (optional), for tracking purposes and possibly to assist in the enforcement of warrant date and time restrictions.

(11) The signature of the sender's device.

(12) The sender's public key escrow certificate issued by the sender's master escrow center. The sender's escrow certificate contains the sender's device public signature key, which the master escrow center had pre-verified and then copied from the sender's device's manufacturer's certificate.

(13) The master escrow center's certificate from the FRB, the manufacturer or whatever system-wide authority is trusted, if the recipient's chip is made by a different manufacturer, appended to the sender's escrow certificate. The certificate of the manufacturer, the FRB or the system-wide authority is needed only for the first communication between the two parties. The certificate could also be a cross-certificate from the recipient's manufacturer or master escrow center.

The MCH thus described could be summarized as follows:

Sender Intermediate Number (to allow the recipient to decrypt the message)
Sender Master Escrow Center Country Code
Sender Master Escrow Center Name
Recipient Master Escrow Center Country Code
Recipient Master Escrow Center Name
Sender Escrow Certificate Number, encrypted for Sender Master Escrow Center
Sender Intermediate Number (for encrypting the sender certificate number)
Message Session Key, encrypted for sender
Sender Intermediate Number (for encrypting the message session key to the sender)
Recipient Escrow Certificate Number, encrypted for Recipient Master Escrow Center
Sender Intermediate Number (for encrypting the recipient certificate number)
Timestamp
Sender Device MCH Signature
[Sender Escrow Certificate]
[Escrow Center Certificate]

FIG. 17 shows a process for sending an encrypted message 176 with a MCH. The entire MCH 172 (the appended certificates 173,174,175 are not technically part of the MCH) is signed by the sender's device 171, using the device private DSA signature key, with the embedded certificate of the manufacturer appended thereto (within the sender's escrow certificate) in order to certify the device's public signature key. This guarantees that the entire MCH is delivered intact to the recipient and that the recipient's chip can easily verify that the MCH has not been modified. The manufacturer's certificate might be accompanied by an national (FRB) or a world-authority certificate to certify the trustworthiness of the manufacturer of the sender's chip in case the recipient's device was manufactured by a different manufacturer.

In another embodiment of this invention, a second, shorter MCH format could be used for the case in which total privacy is not crucial. In this MCH, neither the Sender Certificate Number nor the Recipient Certificate Number are encrypted for the respective master escrow center. Not encrypting the certificate numbers saves much time and space in creation of the MCH. In still another embodiment of this invention, a third, even shorter MCH format could be used for the common case in which the sender and the recipient both utilize the same master escrow center for key escrow purposes, by making EC1 identical to EC2. By eliminating the need in the MCH for identifying information of the second master escrow center and for the special intermediate number that is used for encrypting the recipient certificate number to the second master escrow center, the MCH can be made significantly shorter. Furthermore, the size of the MCH could be further reduced by using RSA key transport to encrypt a DES key for the message and for each of the three encrypted inner LEAF components. According to this method, each sender intermediate number would be replaced by a smaller RSA-wrapped DES key. Thus, the sender could RSA-encrypt the message session key for the recipient and eliminate the need for the first intermediate number in the MCH. The sender could also RSA-encrypt the message session key for himself (actually, for law enforcement to decrypt later) and thus eliminate the need for the third intermediate number in the MCH. The sender could further RSA-encrypt his own and the recipient's certificate numbers and thus eliminate the need for the second and fourth intermediate numbers in the MCH. As shown in FIG. 18, eliminating the four intermediate numbers and its associated encryption and replacing each intermediate number with a smaller RSA transport encryption 181 saves a significant amount of space of the MCH size.

Contribution of Random Material

Some may be concerned that a message session key exchanged using only the RSA key transport method or the Certified Diffie-Hellman scheme is not sufficiently secure because, with either of these two methods, although both the sender and the recipient provide information, only the sender generates the message session key. However, under military standards for secure communication, both sender and recipient must contribute random material in generating a session key prior to each communication session, apparently in order to reduce the chance that the sender might use a weak key or use the same key repeatedly and thereby subject the recipient to an undesired security risk against his will. The system of trusted devices contemplated under this invention can alleviate this fear in two ways. First, it can ensure that the sending device will generate each key separately using random numbers derived from the noise of a built-in hardware noise source, such as a reverse-bias diode, as discussed earlier. Then, so long as the device signs the MCH or message control header, the recipient would be assured that each message session key and the random numbers used in generating it are strong and unique. Still, those insistent upon greater security may demand contribution of random material by both sides of the communication, as defined for Type-1 military systems for classified information.

Thus far in this disclosure, the sender has been described as generating message session keys based on the recipient's public encryption key as contained in his escrow certificate, but not based on random material received from the recipient during the setup phase of the communication. Arranging for the sender to receive a contribution from the recipient, however, creates a new problem. The recipient cannot simply be allowed to generate a Diffie-Hellman intermediate number on his own and send it to the sender for use in generating a message session key, because the recipient then would no longer be using the escrowed private key within his trusted device to decrypt messages and because their communications could never be monitored by law enforcement. Continued success in enforcing the escrow scheme requires that neither sender nor recipient be able to read a message without using a registered trusted device.

In order to allow a situation in which both the sender and the recipient contribute random material to the message session key prior to communicating, the initial key-exchange protocol may be modified to allow a would-be recipient's device to generate a new ephemeral Diffie-Hellman secret number, separate and apart from that recipient's escrowed private key, that will be used to compute a new intermediate number that will, in turn, be sent to the sender for use computing the message session key for encrypting the message. The recipient's escrowed private key would still be used to generate the intermediate numbers (included in the MCH) and the ephemeral session keys that are used to encrypt the various portions of the MCH. This modification requires, however, that generation of the new secret number occur inside the would-be recipient's device, that this new secret number remain inside the trusted device, and that the new intermediate number be signed by the would-be recipient's device prior to being sent to the sender's device for the purpose of attesting that the new ephemeral secret number is indeed confined securely inside the recipient's device. As before, the sender's device generates a new secret number that is separate and apart from the sender's escrowed private key and, using that new secret number and the recipient's new intermediate number, generates the message session key for decrypting the message. The sender's device will also use the sender's new secret number to generate the sender's new intermediate number, which will be sent to the recipient's device as an element of the MCH for wiretapping purposes. In this method, the message session key would, therefore, include random material contributed by both the sender and the recipient, as desired.

However, under this modified key-exchange protocol, because the recipient and sender in effect use new Diffie-Hellman private keys for each message, the escrow feature still "disappears," as law enforcement and corporate management would never be able to obtain those ephemeral message session keys from the escrow agents. Therefore, the needs of the escrow system and the-community of interest require that the message session key be transported in the MCH as before. In fact, in order to assure equality of tapping, all fields that were before disclosed as part of the MCH remain so. The field transporting the message session key to the sender (which is the only way for law enforcement agents who are wiretapping the sender to read the message) must still be included in the MCH in order to preserve the principle of equality of tapping. The message session key will be encrypted into the MCH, as before, using the sender's public encryption key, to which law enforcement will still have access. The sender's new intermediate number will be sent to the recipient as the first element of the MCH, as before, in order to allow law enforcement to wiretap the recipient and compute the message session key. Thus, in order to accommodate the Interactive Diffie-Hellman key exchange technique, this protocol requires that the would-be recipient's new intermediate number be generated inside and be signed by his device, and requires that the sender's new intermediate number be added to the MCH, not used in place of the previously stated key transport methods, as that is the only way the community of interest (law enforcement, employers, and others) can read the message. This method, however, would not be economical for transactions besides on-line phone, network, or dial-up transactions, because the device would have to remember too much, i.e. the special intermediate numbers for each counterparty. This method is preferably to be used in cellular phone, network logons, etc., through which a purely real-time interactive session is desired.

Community of Interest Headers

The MCH will generally be placed before the encrypted message, as a message header. In many current electronic mail and document systems, several recipients are enabled to read one encoded message, using the RSA transport embodiment of the MCH design as discussed above, by RSA-encrypting the message session key using the public encryption key of each recipient. That is, when several recipients are intended to receive the same encrypted message, the MCH header can include, for each intended recipient, the intended recipient's name followed by the message session key, RSA-encrypted to each intended recipient using that recipient's public encryption key. Thus, each intended recipient can locate his entry in the MCH header, decrypt his copy of the message session key and read the message. Even with several intended recipients, the correctness of the MCH is enforced on both ends of the communication: on the sending end, the MCH output is enforced by the internal logic of the sender's device, i.e. the requirement that it create a valid MCH prior to encrypting a message; on the receiving-end, the MCH correctness is enforced by verification by the receiver's device of the digital signature of the sender's device. As previously noted, because the recipients' copies of the message key are integral to the MCH, no recipient can decrypt the message unless the MCH is sent and received intact, unlike the Clipper system in which the MCH is not itself linked to the key transport mechanism.

Under this MCH formatting concept, the MCH could be summarized as shown in FIG. 25. As in previous MCH formats, the authenticity of the MCH is guaranteed by the digital signature of the sender's device 258. Furthermore, as before, the escrow certificate numbers of the sender and the recipient are encrypted under the public encryption keys of their respective master escrow centers 251,252. In this format, however, the MCH, signed by the sender's device, becomes a modified "list of recipients" that is more flexible and easier to understand in relation to the way contemporary encrypted electronic mail systems work. For example, the sender's and recipient's names (or system IDs or addresses) are now shown unencrypted in the MCH 253,254. Although this impinges on the anonymity of the sender and the recipient, as a practical matter it is difficult to send messages in an electronic mail system without tagging the messages with the names and addresses of the senders and recipients. Hence the loss of privacy is slight. In addition, the names of the sender's and recipient's employers 255,256 (or their unique IDs, such as tax numbers or DUNS numbers) are also shown unencrypted, thus greatly reducing the burden on the employers' security staffs to find messages sent and received by their respective employees. Alternatively, instead of leaving the sender, recipient and employer name blocks unencrypted, these entries could just as well read "sender," "addressee," "sender's employer" and "recipient's employer" (or their equivalents) unencrypted, with the actual identifiers inside the encrypted areas, as before. Thus, an intended recipient of the communication would look in the MCH for his unencrypted identifying abbreviation and in this way will attempt to decrypt and read only the portions of the MCH that are directed to and encrypted for him.

In addition, this MCH format as shown in FIG. 25 allows access by possible sub-units within the employer organization, by defining secondary employer lines (a, b, etc.). For secrecy-conscious employers, the MCH could read "sender empl sub-unit b" unencrypted, as discussed above, and contain the actual company unit identifier in the encrypted area. Because each MCH entry is labeled, there is no limit on how many layers of employer access there can be; all of them become in some sense authorized "recipients" of the message. Furthermore, in contrast to previous MCH formats, this MCH format can include the message session key encrypted directly to the employer 257 so that the employer need not go to the master escrow center and agents in order to obtain the message session key for decrypting the message. Although possibly impinging on employee expectations of privacy in the workplace, this format can allow employers to check or recover their employees' files with minimal effort.

In order to create a MCH in this format prior to sending a communication, the sender must first obtain all the necessary names/codes and public keys of the intended recipients and their employers. This information can be garnered from the recipient's escrow certificate and from his own escrow certificate. However, in order to generalize this approach and make this information available to a user who desires to send a communication, the master escrow centers must include into each user's standard form escrow certificate, as discussed earlier, the unique identification or code number and public encryption key of both his employer and any employer sub-units. The escrow certificate layout could be designed by using repeating subgroups, for efficient handling of variable numbers of "community-of interest" parties. Each community-of-interest party entry would have a unique identification number, a public encryption key and, possibly, an instruction code (or policy code, as discussed below) instructing the sender's device how to encode that party's MCH entry. The instruction code could include elements of choice giving the sending device the options of including (1) the party's unique identification number either unencrypted or using an alias, e.g., "empl-a;" (2) the message session key in the coded area or not; (3) the party's unique identification number in the coded area or not; and (4) the timestamp or a random number at the start of the coded area or not. These (and possibly other) instruction codes could be defined as bitmask flags. The list of parties (and/or their codes), their public encryption keys and the instruction flags would tell the sender's device how to format the community-of-interest portions of the MCH in accord with the desires of each party for partial or total anonymity. It is anticipated that in practice, many community-of-interest parties will not bother with anonymity, because it will be much easier for them to search for and identify their employees' messages if they keep their own names and identification numbers in the clear.

Decryption by Recipients

When the intended recipient receives the encrypted message 191 and the MCH field 192, several things must be done in order for the recipient to read the message, as shown in FIG. 19. First, the recipient must load his own valid escrow certificate 193 into his chip 190 because, under the preferred embodiment of this invention, the chip will not decrypt without it. Typically, the recipient's escrow certificate will already be stored in the device's memory in a pre-verified state. The recipient next loads the MCH 192 and the sender's escrow certificate 194, which also contains the sender's device's public signature verification key (with the appropriate system-wide, national or world authority certificate 195, if necessary) into his chip 190. The recipient's chip 190 checks the sender's escrow certificate 194 in order to verify that the sender's private decryption key has been escrowed. This is done by using the public key of the manufacturer to verify the signature of the manufacturer on the device certificate or, if necessary, the signature of the system-wide authority on the escrow center certificate and by checking whether the escrow center's signature on the sender's escrow certificate is valid. In the preferred embodiment, the public signature key 196 of the system-wide authority is used to directly verify the escrow certificate 195. The recipient's chip then checks the MCH signature before proceeding in order to verify that (1) the sending device is trusted, (2) the sender's key is escrowed, as also verified by the sender, and (3) the MCH 192 is valid, i.e. the MCH is in the proper format and contains all the requisite information. This is done by verifying the sender's device signature, the sender's device manufacturer's certificate signature and, if necessary, the manufacturer's system-wide authority certificate. The manufacturer's and the system-wide authority's public keys could be embedded into the recipient's chip 190 to facilitate this verification process. In the simplest case, the recipient need validate the sender's escrow certificate 194 only once, against its own embedded manufacturer's public key or system-wide trusted entity instructions key. Once those are shown to be valid for a particular sender, the recipient needs only to use the sender's pre-validated device public key to validate the MCH signature, resulting in only a single signature validation per message. If either the sender's certificate 194 or the MCH 192 is invalid, the recipient's chip will not decrypt the message. Finally, after verifying these certificates and signatures, the recipient computes the message session key based upon the sender's intermediate number, which was included in the MCH, and the recipient's own private key (his secret number) corresponding to his public key as publicized in his public encryption key certificate 193. Using the session key, the recipient decrypts the message sent by the sending user.

Decryption by Law Enforcement

In order to intercept and decrypt communications to and from a particular user, law enforcement must have court authorization or a warrant to monitor that particular user's communications. The court authorization will, in all probability, include (1) a "start monitoring" date and time at which law enforcement may begin to monitor the user's communications, (2) an "end monitoring" date and time after which law enforcement may not monitor the user's communications, and possibly (3) a grace period to follow the "end monitoring" date, during which grace period the law enforcement may retain the user's private key in order only to decrypt the previously-intercepted communications but not to intercept or monitor any additional communications of that user. In monitoring the communications of the sending user, law enforcement intercepts the communication and identifies from the MCH the name and country of the sender's master escrow center in order to determine from whom to request the sender's private decryption key. Law enforcement then presents the court authorization and the MCH from the intercepted communication to the sender's master escrow center, which uses its private key to decrypt the sender's certificate number that was encrypted into the MCH. Using the sender's certificate number, the sender's master escrow center looks up the sending user's name and the names of the sender's escrow agents, and reveals them all to the law enforcement agent along with the sender's device manufacturer certificate, which law enforcement will need later during decoding. The law enforcement agent then contacts each of the sender's escrow agents and presents to it the sender's name and the warrant, and obtains from each escrow agent the key splits entrusted to it by the sender. Because the preferred method of intercepting and decrypting encrypted communications by law enforcement in this invention is by using the decoder box specified below, the law enforcement request to the escrow agents will also include the public encryption key of the law enforcement decoder box, so that the key splits can be sent directly to the law enforcement decoder box and not to the law enforcement agents themselves. Each escrow agent sends the sender's key split in its possession to the law enforcement decoder box as an encrypted message having a "start monitoring" date, an "stop monitoring" date and an optional "grace period" so that the decoder box can enforce the terms of the warrant. The decoder box then decrypts the encrypted key split messages, combines the key splits and uses the sender's reassembled private key to obtain the session key for the communication, which session key was encrypted by the sender into the MCH as a message sent to himself. The decoder box can then monitor and intercept communications to and from the sender only during the monitoring period specified in the warrant, and can continue to decrypt those intercepted communications only until the end of the grace period specified in the warrant.

A similar procedure is used to monitor communications to and from the recipient. From the MCH of the intercepted communication, law enforcement identifies the name and country of the recipient's master escrow center and then presents the warrant and the MCH from the intercepted communication to the recipient's master escrow center, which uses its private key to decrypt the recipient's certificate number that was encrypted into the MCH. Using the recipient's certificate number, the recipient's master escrow center looks up the recipient's name and the names of his escrow agents and reveals them all to the law enforcement agent. The law enforcement agent then contacts each of the recipient's escrow agents and presents to it the recipient's name and the warrant. Each escrow agent sends the key split entrusted to it by the recipient user to the law enforcement decoder box as a message encrypted to the decoder box having a "start monitoring" date, a "stop monitoring" date and a grace period for enforcement of the terms of the warrant by the decoder box. The decoder box then decrypts the encrypted key splits, combines them and uses the recipient's resulting reassembled private key, along with the sender's intermediate number, which is at the head of each MCH, to compute the session key for the communication. The decoder box can then monitor and intercept communications to and from the recipient only during the monitoring period specified in the warrant, and can continue to decrypt those intercepted communications only until the end of the grace period specified in the warrant.

In another embodiment of the present invention, the format for each escrow agent's encrypted key split message to the law enforcement decoder box might be as follows:

User's Certificate Number
Private Key Fragment: X(i)
Begin Monitoring Date and Time
Stop Monitoring Date and Time
Court-allowed Grace Period (days/hours)
Date and Time (of this key split message)
Escrow Agent Signature
[Escrow Agent Certificate]

In this format, all information except for the Certificate Number would be encrypted under the encryption key of the decoder box. Because the key split messages from the escrow agents are encrypted for that particular decoder box, no other user or decoder box can read them. Furthermore, the "Begin Monitoring" and "Stop Monitoring" dates and times instruct the decoder box when to begin monitoring and decoding communications and when to stop monitoring; the Grace Period allows the decoder box an additional, specified time period to decode any backlog of the previously intercepted communications, after which time period the decoder box must stop decoding and must erase the subject's private key. Thus, the decoder box can be used to decrypt the monitored user's communications until the date specified in the warrant, at which time the decoder box and its embedded time clock prevent any further decryption. The decoder box could also refuse to process key split messages having a Message Date and Time older than twelve (12) hours (or some other specified time period) or having an Expire Date and Time that has already passed.

Decoder Box Implementation

In a preferred embodiment of this invention, law enforcement employs a special tamper-resistant decoder box for intercepting and decrypting the communications of monitored users under certain defined and controlled conditions. An example of a decoder box and its process flow is shown in FIG. 20. The decoder box 200 is designed to be a trusted device of a similar design within the system of trusted devices of the present invention and, therefore, can enforce various conditions in order to prevent improper action by law enforcement agents. The decoder box 200 has a private device signature key embedded by the manufacturer and a manufacturer's public signature key certificate 202 for the public signature key that matches the device private signature key. In addition to the manufacturer's certificate 202, the decoder box may also have a certificate 203 issued by (or on behalf of) a law enforcement authority or corporate security department that owns the decoder box, attesting or notarizing the connection between the decoder box and the law enforcement or security authority, and attesting that the decoder box is under its sole possession and control. The decoder box 200 also has the ability to generate a public/private key pair, just like the regular user chip of the present invention, for encryption and decryption of administration and control messages to the decoder box. The decoder box 200 further has the abilities to store its private key securely and to issue the corresponding public encryption key within a certificate 201 signed by itself, with its device certificate 202 signed by the manufacturer attached. Having this ability to generate (and use) the public/private key pair enables the escrow agents 206 of a wiretapped user, upon presentation by law enforcement agents to the master escrow center of a warrant to monitor the user's communications, to send the key splits 204 of that wiretapped user to the decoder box encrypted using the decoder box's public encryption key and enables the decoder box to decrypt those key splits using its private decryption key. However, unlike a regular user chip of the present invention, which decrypts a message and returns the unencrypted result to the user, the decoder box never outputs the wiretapped user's private key to the law enforcement agents. Instead, the decoder box stores this information securely until the end of the Grace Period specified in the warrant and in the key split messages, at which time the decoder box erases the information permanently.

Accordingly, in order to perform its duties as a trusted device and enforce the date and time restrictions imposed by the wiretap authorization, the decoder box 200 must also contain a trusted, calibrated and certified date/time clock 205. The decoder box manufacturer certifies and attests to the validity and the calibration of the clock 205 when the manufacturer issues a device certificate 202 with its list of known device properties. When the decoder box 200 receives from the escrow agents 207 the key splits 204 containing time limits (based upon the warrant) before or after which the warrant is not valid, the decoder box 200 uses its internal time clock 205 to verify that the law enforcement warrant is still valid. If the warrant is not yet valid, the decoder box will not monitor or decrypt the communications of the wiretapped user. If the warrant (and any applicable grace period) has expired, the wiretapped user's private key is erased and will not be recreated again under that warrant by the decoder box (unless a new warrant having a new time period is issued). It should be noted that, although the trusted time clock 205 is optional for a regular user chip of the present invention, it is mandatory for the decoder box 200 in order to allow the decoder box to enforce the date and time limits of the wiretap warrant. However, the user of the regular user chip can assist in the time limit enforcement by maintaining the calibration of his chip's time clock. If the user's clock is not calibrated, the MCH generated by the user's device during communications will contain a null value in the timestamp field. In that case, the decoder box intercepting the communication will be able to enforce only the Stop Monitoring Date of the warrant by refusing to decrypt after the expiration of the warrant and grace periods. Then, the decoder box cannot enforce the Begin Monitoring Date because, as long as the warrant is still valid, the warrant allows decrypting of all MCHs submitted with null timestamp values even if they were intercepted prior to the warrant period Begin Monitoring Date and Time. But, if the user's clock is calibrated, the law enforcement decoder box can and will refuse to decrypt all MCHs containing a valid and trusted timestamp for a date and time prior to the warrant Begin Monitoring Date and Time. Most preferably, the decoder box of the present invention will decrypt only communications that are reliably timestamped during the warrant time periods. It is anticipated that this added immunity from potential abuse of warrant time periods by law enforcement may motivate users of the chip of this invention to maintain their chips in a calibrated state. Indeed, where the system is used to encrypt large numbers of messages in a data storage system, the enforcement of time periods for a later warrant or discovery order may be highly desirable, because otherwise many messages outside the lawful scope of the order might become subject to inspection.

Law Enforcement Auditing Features

With an escrowed encryption system, there is a concern that law enforcement agents might be easily bribed in order to obtain cryptographic keys that protect data of high economic value. For example, members of a well-funded criminal enterprise might be able to steal a set of valuable industrial plans from a particular company, first by illegally tapping that company's communications in order to obtain some message headers and escrow agent names, then by bribing a low-paid police official to request a warrant for a drug investigation in order to obtain the company's private decryption key from the escrow agents, and finally by using the private decryption key to steal the plans. Because encryption is now used for secure communication between many computers, it is no longer acceptable for law enforcement to wiretap a telecommunications system with minimal safeguards. A much stronger set of safeguards is needed in order to bring police procedures and controls up to the level of modern corporate computer security practices and prevent this type of situation from occurring.

One such safeguard for the trusted device is an internal counter for numbering each message control header, which counter will increase sequentially after each access. The message sequence number (MSN) can be placed in each message header encrypted so that it would not be visible to an outsider. This can be done by encrypting the number either (1) under the sender's public encryption key, along with the sender's copy of the message session key, (2) under the public encryption key of the escrow agent of either the sender or the recipient, or (3) preferably under at least the sender, receiver, and their escrow agents, and possibly under all parties in the community of interest. However, the sender's escrow agent could also, as a matter of policy, elect to allow the sequence number to be displayed in the clear, on the grounds of economy of space and the low risks of exposing it. It is critical to avoid duplicate numbers of message control headers, and gaps in numbering should also be avoided to the extent possible.

Another safeguard feature might be to allow the user to include an optional secret "title line" in the message control header. If a user feared illegal tapping under improper warrants, the user could encode a short title, such as "Plan #123," in order to alert himself and others to the contents of the message. Alternatively, a user could simply keep his own log (through a mail software system) relating the device-assigned message sequence numbers and the user-assigned titles. In order to save space, the title line would be of length zero if no title was entered, as would often be the case.

A third protection is to add to the signed portion of the message control header a digest or hash of the message contents in order to prevent either the user or law enforcement from later claiming that the contents of the decrypted message were other than as actually sent. That is, for example, the user could not later substitute a harmless message for the drug deal message that had previously been sent, nor could corrupt law enforcement officials later substitute a drug deal or harmless message for the valuable industrial plans the officials were stealing.

These safeguards could be used as additional security measures. First, the sender device-generated message sequence number would be used to track the message, by both sender and receiver, as well as by law enforcement and the court system. Although law enforcement access may be difficult to effectively control, especially during the hot of pursuit of criminals, and although the court system may not always be able to carefully analyze law enforcement requests prior to issuing wiretap authorizations, diligence after the fact can be exercised in order to audit the results of a wiretap, either of every wiretap, of a random sample of wiretaps, or of wiretaps that in some way appear unusual. The trusted device of the law enforcement agents, the decoder box, is therefore modified to include a secure internal log of the message sequence numbers and message digests (and title lines, if any) of the messages that it has monitored and allowed to be read by law enforcement. The electronic authorization sent to the decoder box by the escrow agents of a wiretapped user with that user's key splits may also include the public encryption and signature keys of the court that issued the warrant. The decoder box is then able to respond to a request to print out the log of message sequence numbers and title lines, possibly encrypted under the key of a suitably authorized recipient such as the court that issued the warrant.

In another embodiment, the decoder box will not start to decrypt the monitored communications until it receives a specific court order that matches the key splits received from the escrow agents. For example, the key split messages that are received from the escrow agents and encrypted using the decoder box's public encryption key can be enhanced to include (from each escrow agent) the public encryption and signature keys of the court that issued the warrant. Or, the escrow agents might refer in their key split messages to the date and number (if any) of the warrant, and the decoder box might then receive from the court the court's public encryption and signature keys, as well as the court's public key certificate that had been attached to the original wiretap authorization. For example, the court authorization to the escrow agents can be enhanced to convey the following data, which is needed for the key split message:

Master Escrow Center Name or ID Number
Monitored User's Certificate Number
Court Name or ID Number
Warrant Number (if any)
Date and Time of Warrant
Begin Monitoring Date and Time
Stop Monitoring Date and Time
Maximum Number of Messages (optional)
[Judge Signature]
Judge Certificate
Judge Certifier Certificate (e.g., court, etc.)

The escrow agents could then "recertify" the court's public encryption and signature keys to the decoder box by having the encrypted key split messages from the escrow agents to the decoder box include the following additional information, which must be present in each key split from each escrow agent:

Master Escrow Center Name or ID Number
Monitored User's Certificate Number
Escrow Agent Name or ID Number (sending this key split message)
Court Name or ID Number
Court Public Encryption Key
Court Public Signature Key
Warrant Number (if any)
Date and Time of Warrant
Maximum Number of Messages (optional)
Escrow Agent Signature
[Escrow Agent Certificate]

The decoder box thus receives the assurance that all the key split messages came from the same judge and the same warrant.

The fact that decoder box also has the judge's public encryption and signature keys allows the judge to request and receive (in confidence) the log of all message sequence numbers and message title lines intercepted and decrypted by the decoder box during the wiretap period, as a post-wiretap audit to safeguard against unjustified, unlawful or corrupt conduct of law enforcement agents. Furthermore, the decoder box will not delete, erase, or reuse any memory assigned to the monitored message log until the decoder box receives a separate order from the judge or court, verified against the previously received public signature key, stating that the decoder box may do so. Such an order will be issued either because the court has already received from the decoder box the monitored message log that it previously requested, or because the court has decided that no audit is needed in this instance. If the monitored message log memory storage area becomes full, the decoder box will not decrypt any more messages until the log is sent to the judge or court and an order signed by the court is received allowing the decoder box to erase the monitored message log. Law enforcement can continue to intercept new messages pending clearing of the monitored message log, although the new messages will not be decrypted until the full message log has been cleared for audit. The decoder box will also have a feature alerting law enforcement that the monitored message log is nearing capacity, so that they can request that the message audit log be uploaded so that the decoder box will not cease decrypting. These transactions and communications may be fully automated and nearly instantaneous.

Each entry in the audit log may contain, in addition to a digest of the message, a second digest that is the product of (a) the message digest plus (b) the full text of the previous log entry concatenated together and redigested. This can prevent any dishonest court personnel from adding, deleting or resequencing the entries in the log. This concept is discussed in U.S. Pat. Nos. 5,136,646 and 5,136,647, which are hereby incorporated by reference.

As a followup action, the court could later request that law enforcement submit the message headers and the full content of the message digests in the audit log that the court has received. Also, in its wiretap authorization, the court could artificially limit to less than full message log capacity the number of monitored messages that may be decrypted by the decoder box before the monitored message log and message headers must be audited. Although this type of limit would have no effect on the overall ability of law enforcement to investigate, because downloading of the log to the court for auditing is almost instantaneous, it might alert the court to unusual circumstances. In specific cases that require controls that are stronger than merely sending the monitored message log to the court, the court might limit law enforcement to less than full message log capacity before law enforcement must seek a new warrant to monitor additional communications.

Thus, if (1) both sender and receiver keep track of the sequence numbers of the messages they send and receive, and either associate title lines in the message control headers or log the messages in their local software systems, (2) both law enforcement and the court retain a complete log of each message decrypted by law enforcement, and (3) each message header includes a digest of the message in order to prevent any party from-later altering the message to cover up its actions, then a credible post-tapping audit can determine whether there might have been any abuse or corrupt action by the law enforcement agency. Although this system still cannot prevent, a priori, the stolen plan scenario mentioned above, the knowledge by the criminal enterprise that its actions can be fully audited by both the court and the subject users can provide a worthwhile check on improper police actions. It might also be made a matter of regulation that the law enforcement agency record and submit to the court all messages intercepted under a warrant and allow the wiretapped parties to request an audit of the wiretap, particularly where the subject is associated with a business enterprise and no criminal charges are filed based upon that wiretap.

Stream-Oriented Data

In communications involving stream-oriented data, such as a telephone call, in which each communication consists of a stream of several message packets from two or more users, it is impossible for the sender device to hash and sign the entire message as part of the MCH. Although it might be possible to send a MCH with each packet of a communication, doing so would be very costly in terms of processing time and network bandwidth. Hence, the MCH should thus be transmitted only once, at the time of call setup. A preferred way to handle continuous streams of encrypted data is to designate the calling user as the "sender" and to negotiate the MCH at the start of communication, as before, including the message sequence number (MSN) and hash of the first packet (if any) signed by the device. Then, the sender's device could generate a series of unique packet sequence numbers (PSN), whose sequence begins with zero at the start of each communication. For all subsequent packets, the device needs only to hash and sign that particular packet, and to include (and sign) the hash, MSN (same for entire message) and the PSN for the packet. The callee will perform similar actions for each packet it sends, by referencing the caller's MSN for the communication, sequentially numbering its own packets starting with zero, and having the callee device sign a group consisting of the packet hash, the caller's MSN and the callee's PSN, thereby forming a "packet control header" (PCH). The devices might optionally include the current time as an offset from the time start of the communication (in seconds or milliseconds), which is already present in previously disclosed versions of the MCH. This could enable the call to be replayed more realistically.

In order to further distinguish the caller's and callee's packets after the communication, it will also be desirable to include a call party code (CPC) with a simple coding scheme assigning numbers to the parties to the communication, such as caller=0, callee=1, and any additional parties to the same encrypted session receiving higher numbers. Or, in place of the CPC, a unique identification number, such as the device serial number, the device serial number plus the device manufacturer ID number, or the hash of the foregoing, may be used.

These methods could also be generalized as a method for multi-party session key generation. For example, a caller could generate a session key and use that same key to initiate calls with several callees simultaneously using RSA key transport. There will then be a separate MCH for each added party after the first two parties (caller and callee). The caller's device could treat the multi-party call as separate calls or as a single call having the same session key but having multiple CPCs. Each callee would then be responsible for using the caller's MSN and for maintaining its own CPC and PSN. Alternatively, assuming use of conventional two-party session key generation methods (such as Diffie-Hellman methods), conference calls could exist in which a central party (e.g., a system operator) places all the calls and performs real-time decrypting and re-encrypting of each party's packets for all the others. The central party could also be the individual who patches in the next callee, in which case that callee's packets would be decrypted by that individual's device and then re-encrypted using the session key(s) that the callee is using to communicate with the other party (or parties). See also B. Schneier, *Applied Cryptography*, J. Wiley 1994, p. 276, regarding use of Diffie-Hellman with three or more parties.

A Packet Control Header (PCH) could be formulated as follows:

Original Caller's MSN
User Call Party Code (CPC) (caller=0, etc.)
User Packet Sequence Number (PSN)
Time Offset from call setup (msec)
Hash (of this packet)
[Device Signature]

It might be preferable not to send a PCH with each packet of communication, due to resulting heavy overhead in some systems that use short packets, but rather to send the PCH only periodically. This is akin to the technique known as "sliding windows" in network communications, in which packet sequencing and retries are not performed for each packet but only for large numbers of packets. Usually such systems dynamically adjust the "window," or the number of packets that are sent between error checks, based on line noise, i.e. making the window large for a clear line but making it small for a noisy line that is causing many error retries. If errors occur often, a small window would require the user to resend only a small amount of data; if errors are rare, checking can be performed infrequently, albeit with a high cost to resend lost data in case of an error. Packet control headers could be directly integrated into the sliding window scheme of a communication system, thereby providing the desired capacity to audit law enforcement actions down to the packet level, while also allowing maximum system throughput in a modern communications network.

To further strengthen the auditability of the wiretap process, it is advantageous to positively mark the end of a communications session with some special packet. This packet may be sent automatically by each device to the others prior to disconnecting, unbeknownst to the users, in order to prevent either the users or law enforcement agents from later claiming that a conversation either had or had not ended, when the opposite in fact occurred. This could be accomplished by instructing each device to accept a "want to hang up now" input from its human user, whereupon the device would send out a "prepare to disconnect" packet, which would then stimulate the other device(s) to do the same. The device(s) would terminate their data streams with a "final" packet containing no additional data but preferably including the totals of all packets sent and received, call duration, etc.

Timestamp Device

Figure 21:
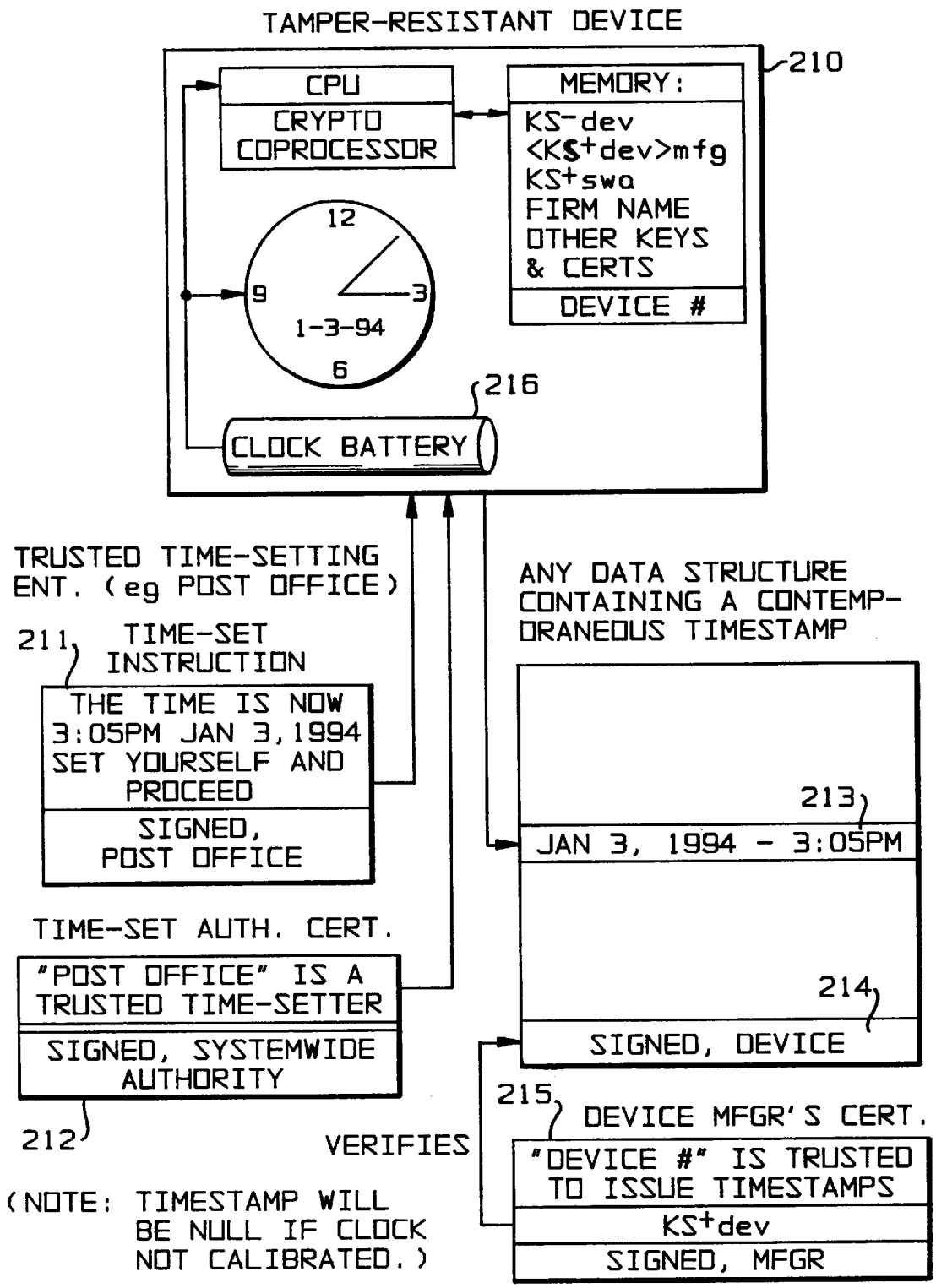
FIG. 21 is an example of a self-certifying trusted timestamp device.

Another feature of this invention in its preferred embodiment, as discussed above regarding the decoder box, is a trusted and tamper-resistant timestamp device that self-certifies that it can issue (or affix) digitally signed timestamps (or data structures containing such timestamps) that can be considered trustworthy by third parties. Such timestamp devices are described in U.S. Pat. Nos. 5,001,752 and 5,136,643, by Addison M. Fischer. In its preferred embodiment, shown in FIG. 21, the timestamp device 210 (or subsystem) can be calibrated and set into operation only by a trusted authority, such as the manufacturer or one trusted by the manufacturer, in much the same way that a postage meter can be set only by the local United States Postal Service branch office and is from then on trusted by the public and the postal system to dispense postage-meter stamps only up to the prepaid amount. Once calibrated, the timestamp device 210 (or subsystem) will respond to a "time-set" instruction 211 (or recalibration) only if that instruction is signed either by the manufacturer itself or by an entity that has attached a certificate 212 from the manufacturer, or one trusted by the manufacturer, stating that the entity is trusted to set and calibrate the timestamp device (or subsystem) of the host device. The time-set instruction operation would-probably need to be performed in person with the time setting authority taking momentary physical possession of the device and immediately erasing the time-set instruction 211 in order to prevent the possibility of a device owner capturing the instruction and replaying it at a later time in order to "back-date" a device's clock.

Once calibrated and for as long as it is undisturbed, the timestamp device 210 will affix timestamps 213 or complete timestamp data in structured data fields based upon its internal clock mechanism, signing 214 the resulting data structures with its private device key and furnishing its manufacturer certificate 215. If the host device should lose power, be tampered with or receive an instruction to deactivate itself, the timestamp device will cease issuing timestamps. In that case, in order to avoid impairing other possibly useful functions that do not as an absolute matter require trusted timestamps, the timestamp device will utilize a convention, such as filling the timestamp field with a pre-agreed "null" value, such as all binary zeros or binary ones (or an equivalent convention), when a structured data field calls for a timestamp to be entered. However, when a structured data field or the host device requires that an actual timestamp be issued, such as in the case of a law enforcement decoder box, if the timestamp device has ceased to issue timestamps, the host device functions that require timestamps will not operate; in the case of the decoder box, the box will refuse to decrypt intercepted communications. In order to avoid or minimize the occurrence of the situation of lost host device power, each trusted timestamp device should preferably be equipped with its own separate long-lived battery 216 for clock use only, some "low battery" warning indicator to prevent timestamp device loss of power before a battery change and some means of retaining an adequate electrical charge (such as a storage capacitor, a second battery compartment or an optional external power supply) during battery change operations.

For each timestamp issued by the timestamp device, there could be a timestamp device certificate issued by the manufacturer (or another time-setting authority) stating the quality and reliability of the timestamp clock, the date on which it was last set, as well as its expected time drift. When a recipient user receives a data structure that has been digitally signed by the host device, that recipient knows that, if the timestamp field is completed with a valid value, the device's signature and certificate certify that the time was correct when the data structure was created, signed and issued. This certification is based on (1) the trustworthiness of the authority that most recently calibrated the timestamp clock, (2) the clock's drift tolerances as stated by the manufacturer in the device certificate, and (3) the clock's ability to deactivate itself upon tampering or a loss of power. The recipient further knows that, if the timestamp field contains a "null" value, then the timestamp clock was not in a state of trusted calibration at the time the device created, signed and issued the data structure. This information concerning the trusted properties of the timestamp device and its internal clock mechanism can be preferably encoded directly into the device certificate using a suitable attribute-value coding scheme. However, this information could also be implied from the manufacturer name and device type, which could be published by the manufacturer in a specification and performance certification as part of a publicly stated "policy statement" at the time the device certificate is issued.

Such timestamps could also be issued by the device as part of other message handling operations beside MCH creation and decoding. These timestamps could be attached to the personal signature of the device's user when the user signs another document or transaction using his personal signature key, which is securely confined inside the device. The device would sign or co-sign the timestamp element of the user's signature, or might alternatively sign over the user's entire signature block (which contained the timestamp, also signed by the user, along with the hash-result message digest of the document). The device could then supply its certificate in order to make the timestamp believable and trustworthy to a third party who knows the manufacturer's public key.

Trusted Upgrading, Replacing and Rekeying

Another feature of this invention is a tamper-resistant trusted device that contains an embedded manufacturer's public key, a protected non-volatile memory area and a secure central processor unit (CPU) and can upgrade or supplement in a trusted manner any firmware routines embedded by the manufacturer. The trusted device does the upgrading or supplementing by accepting as input a body of data containing new or additional firmware code that is suitable for that type of device and is digitally signed with the manufacturer's signature, which signature assures the device that the new firmware code has been developed, tested and approved by the manufacturer and that the device should therefore either (a) overlay one or more currently embedded firmware routines with the new firmware code or (b) add the new firmware code as one or more new routines in a currently unused area of protected memory. In the preferred embodiment, the protected memory would be of the FLASH type, which can retain its information indefinitely while powered down but can also be erased by the-device (albeit, relatively slowly) and reused if desired. The protected memory could also include any data storage area (such as a disk drive), whether or not tamper-resistant, in which the code to be upgraded or supplemented could be stored in an encrypted form for which the decryption key is known only by the trusted device. By storing the programs in an encrypted form, the device effectively prevents them from being modified by anyone without knowledge of the decryption key. When the device receives such a signed body of new firmware (or software) code, the user inputs the code along with the manufacturer's signature and issues a "process firmware upgrade" instruction to the device. The device then verifies the manufacturer's signature using the public signature key of the manufacturer, which was embedded in the device during manufacture. If the manufacturer's signature verifies, the code is accepted and the device performs the desired upgrade.

The process of a trusted upgrade to the firmware of a trusted device as described above can be further extended to accommodate authorized third parties that desire to upgrade firmware routines that pertain to device functions relevant to those third parties, including functions such as the present key escrow system, which may be largely designed and administered by a bank master escrow center independently of the trusted device manufacturer. In an instance of third party upgrade, the manufacturer could sign a firmware upgrade certificate containing a public key of the third party firmware provider and issue it to that third party. The third party could then develop, test, and approve replacement or additional firmware routines, sign them with the third party's private signature key, and attach its upgrade certificate from the manufacturer thereto. Upon receiving such an upgrade, the user would load both the signed code routines and the manufacturer's upgrade certificate into the device and then issue a "process third party firmware upgrade" instruction. The device would then verify the third party's signature on the new code routines against the manufacturer's upgrade certificate and then verify the upgrade certificate against the manufacturer's public signature key that was embedded in the device during manufacture. If both signatures verify, the upgrade is accepted and the device performs the desired upgrade.

In addition to accepting instructions to upgrade or supplement device firmware routines, a tamper-resistant trusted device can also accept instructions to replace or supplement "instructions" public keys that were embedded during manufacture. As discussed earlier, a trusted device may have public keys besides those of the manufacturer embedded during manufacture of the device. Such "instructions" public keys might include those of one or more master escrow centers as described in the present invention. These embedded keys, including those of the manufacturer or other trusted third parties, can be used to verify various certificates such as escrow certificates, device certificates, upgrade certificates, time-set instruction certificates and others that may be presented to the device for it to act upon. In addition to relying only on public keys embedded during manufacture, the device can also accept external instructions to embed new public keys or to replace existing ones. In order for a device to accept and store in a non-public area the public signature key of a trusted third party, the manufacturer will enclose the new public key in a signed instruction data packet (or certificate) signed by the manufacturer instructing the device to discard the enclosing certificate and store the designated public instructions key within. The special packet may also instruct the device as to what types of transactions the new key is trusted (e.g., for use with a key escrow application, car rental application, medical data application, or other use). Upon receiving such a public key data packet from the manufacturer, the device would first verify the manufacturer's signature and then accept and store the new public key along with the restriction on the public key's use.

The manufacturer may also designate at the time of embedding a third party public instructions key, either during manufacture or later as part of an instructions data packet, that one of the transactions for which that third party key is approved is the replacement of the manufacturer's own underlying public signature verification key. Although such a replacement of the manufacturer's own public signature key should almost never be required, there is the chance that the manufacturer's corresponding private signature key (for issuing device certificates and other instructions to the device) might be compromised through theft. Theft of the manufacturer's private signature key would allow the thief to issue seemingly valid instructions, to approve new escrow centers (of dubious trustworthiness) and to approve new time set authorities. Alternatively, and more likely, the manufacturer's private signature key might simply be lost or destroyed, thus preventing the issuance of any further valid instructions. Either of these events would be classified as a "disaster" in computer systems terms and could result in all of that manufacturer's devices having to be recalled. However, through the present invention, the expense of such a recall could be prevented or mitigated by allowing a trusted third party to replace the manufacturer's compromised signature key. Assuming that the manufacturer had already embedded-the instructions keys of one or more trusted third parties into the device, either during manufacture or later using an instructions data packet, and had included the replacement of its own public key among the transactions that the third party's public instructions key could approve, the manufacturer could then turn to that trusted third party and request that it issue an instruction data packet to all of the manufacturer's devices authorizing the replacement of the manufacturer's public signature key, thus saving itself and its users the potentially huge expense of physically replacing all the physical devices. Because all the device certificates issued by that manufacturer would also have to be replaced, this could be accomplished by having each device issue a certificate request for the device's own public device signature key. If the manufacturer's private key was lost or destroyed, and not compromised, then all previous signatures would still be valid and a user would need only to present his old device certificate in order to have a new device certificate issued for the same information signed by the manufacturer's new signature key. The manufacturer would then return new device certificates (most likely via an on-line or an electronic-mail transaction).

While this would still be expensive, it would be far cheaper and less detrimental to the reputation of the manufacturer than the wholesale physical replacement of all of that manufacturer's trusted devices in the field.

The incorporation into the trusted device of the present invention of a mechanism to replace a manufacturer's public key or any other trusted public instructions key could mitigate some of the systemic security risks that are posed by the use of system-wide root public keys. This would allow greater reliance upon purely hierarchical trust models, which generally allow shorter and simpler certification paths requiring fewer certificates, less effort to determine which certificates to utilize and less computational time to verify the signatures.

Owner-Controlled Rekeying

As previously described, the user also has the option of rekeying his device as to its user encryption key pair at any time after manufacture. The user does this by issuing a firmware instruction to the trusted device to perform the particular steps of the key escrow method, i.e. to generate a new private and public encryption key pair, send the key splits to the escrow agents and ultimately receive a new escrow certificate from the master escrow center. However, it is also desirable to permit a user's employer or sponsor (or owner, if the user is another device or process) to control the key and rekey processes in order (a) to make sure that the user selects escrow agents that the employer deems acceptable and (b) to assure that the employer, as the true owner of the device, will remain known to those selected escrow agents and hence will be able to request the user's key splits from the escrow agents without having to first obtain a warrant or court order. The employer may require access to a particular device's keys for any number of reasons, such as to conduct internal surveillance or to recover encrypted proprietary data after the relevant device has been lost, stolen or destroyed. The employer may also need to rekey the device for any of a number of reasons, such as for a device whose previous encryption or signature keys have been compromised or erased, for a device that has been given to a different employee, or for a device whose owner-organization rekeys all cryptographic devices at periodic intervals as a matter of policy.

In the preferred embodiment, the trusted device is pre-set by the manufacturer such that it will not initiate the key generation and escrow process unless the device first receives an owner's certificate for the device 220, such as one shown in FIG. 22, containing the particular device's permanent serial number 221 and signed 225 by the manufacturer. The owner's certificate 220, issued at the time of purchase by the manufacturer to the corporate purchaser of the device, also contains the corporation's name 222, the corporation's unique identification number 223 (such as Internal Revenue Service Employer Identification Number (EIN) or Dun & Bradstreet Number (DUNS)) and the corporation's public signature verification key 224, which corresponds to the private signature key retained by the corporation and which will be used to verify rekey or other instructions issued by the corporation to the device. Subsequent to receiving this information, the device will respond only to rekey or other instructions that are signed using the corporate owner's private signature key corresponding to the public key contained in the device's owner's certificate.

Figure 23:
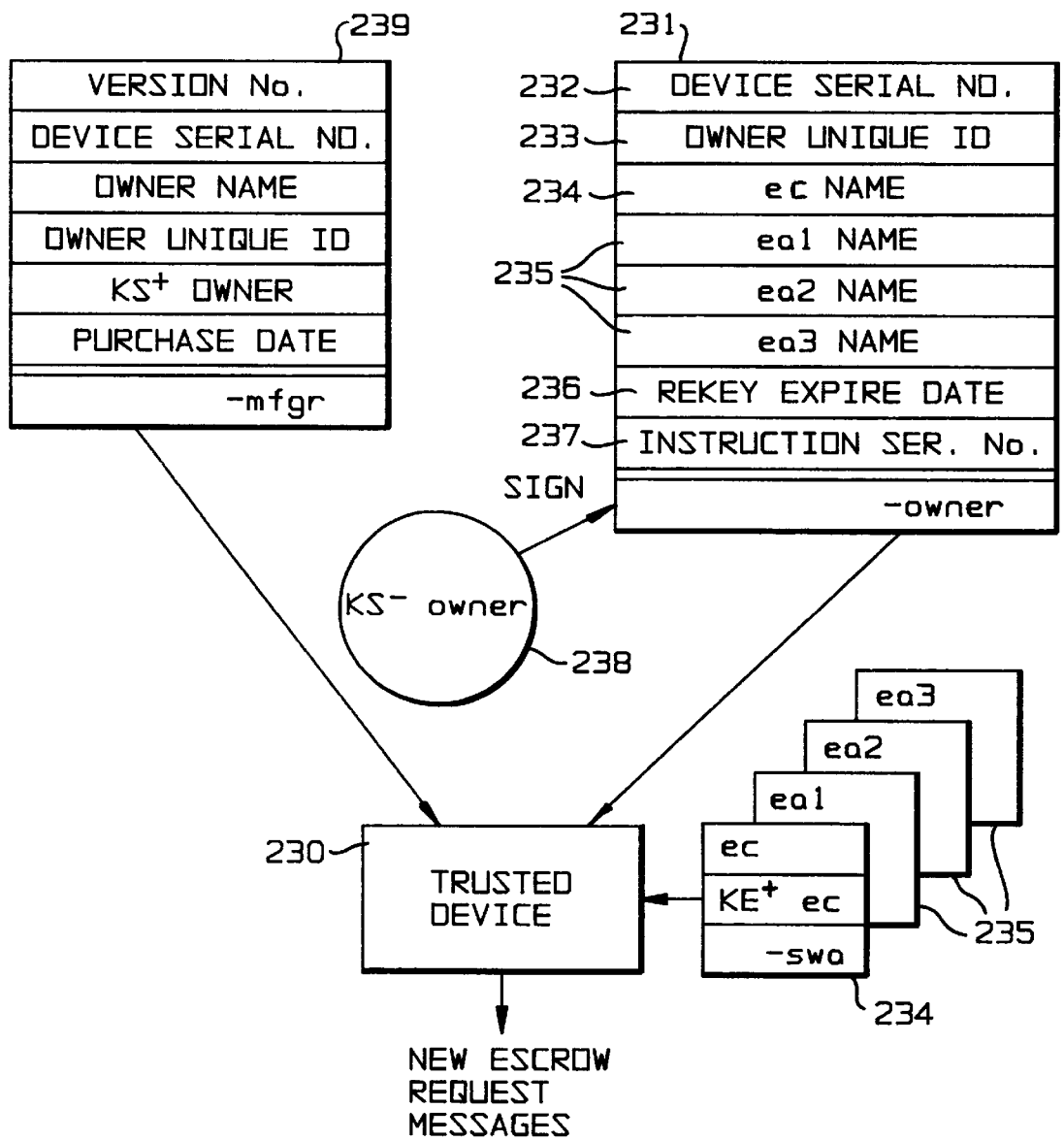
FIG. 23 is a flowchart showing the steps of a method of re-escrowing a key (rekeying) by the owner of the device of the present invention.

Referring now to FIG. 23, when the employer (the owner of the device) desires to rekey the device 230, the employer issues a signed instruction 231 to the device 230, including (1) the device's serial number 232, the unique owner identification number 233, (2) the names of the escrow agents 235 and the master escrow center 234, (3) the date and time of the rekey instruction, (4) the date and time of the rekey instruction expiration 236 and (5) the rekey instruction unique serial number 237, and signs the instruction using the employer's private signature key 238. Upon receipt of a valid owner's certificate 239 and a valid rekey instruction 231, the chip within the trusted device 230 first verifies the manufacturer's signature on the owner's certificate 239 and the employer's signature on the rekey instruction 231. The trusted-device then completes the key generation and escrow process, as before, including the owner's unique identification number 233 within each escrow share packet, and sends the share packets only to the escrow agents 235 designated by the employer in the rekey instruction 231. Subsequent replay of these instructions (which may be issued electronically) can be limited by designing the device so that the device retains in non-volatile storage the serial numbers of the last several rekey instructions it received and refuses to execute the instructions again. Assuming the device's time clock is maintained in good order, subsequent replay of the rekey instructions can also be limited merely by instructing the device's time clock to honor the expiration date and time in the instruction. In a preferred embodiment, a device whose clock is uncalibrated would refuse to process a rekey instruction that has a non-null expiration date/time but would proceed if the expiration date/time were left null.

Upon receiving from a user device the key (or rekey) split share packets containing a unique owner identification number, the escrow agents and master escrow center would record that unique identification number in their respective databases and would subsequently honor requests from that owner for access to the private encryption key. In a preferred embodiment, the escrow agents and escrow center would each require that a key split share packet that designates a unique owner identification number must also be accompanied by the respective device owner certificate signed by the manufacturer. This device owner certificate would allow the escrow agents and the master escrow center to act upon key request messages signed with the owner's private signature key corresponding to the owner's public key in the device owner's certificate.

Figure 26:
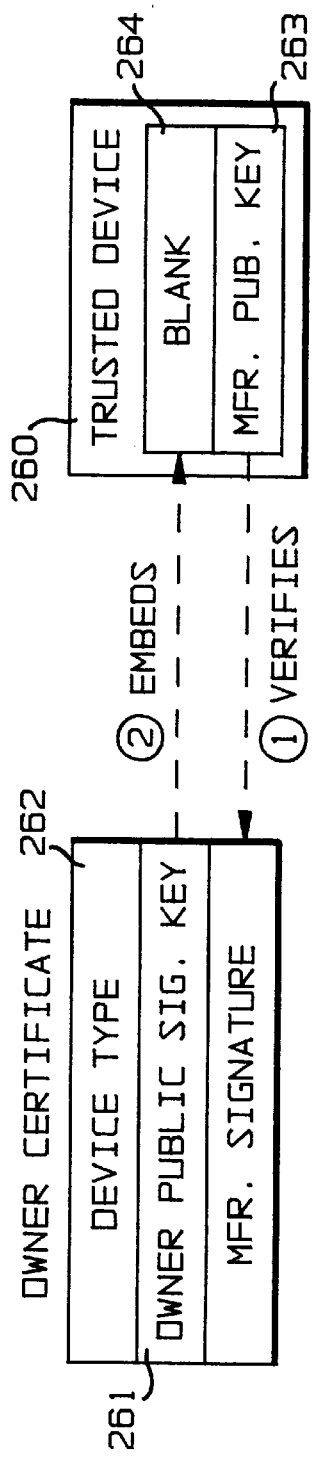
FIG. 26 is a flowchart showing the steps of a method for embedding of an owner public key upon initial sale.

In another embodiment, the trusted device can be allowed to accept rekey, reescrow, ownership transfer or other instructions from the device owner without having to use a separate device owner's certificate. The requirement of having to use a separate owner's certificate for instructions to the device is an administrative burden, because the owner must maintain a database of certificates for all its owned devices and locate the appropriate certificate each time it wants to rekey a device or send the device some other instructions. A better approach, as shown in FIG. 26, is to have the manufacturer issue the owner a single certificate for the owner's public instructions key for a given family of devices, let the seller install its public instructions verification key 261 inside the device 260 when the device 260 is sold, and then institute a system based on the internal storage of those keys. Upon initial sale of the device by its manufacturer to an owner, the device 260 will first verify the vaildity of the owner's manufacturer certificate 262 using the manufacturer's public instructions key 263 that was embedded within the device by the manufacturer. If the owner public instructions key area 264 within the device is blank, the device will copy the owner's public instructions key 261 from the owner's manufacturer certificate 262 into the owner public instructions key area 264 of the device. If an owner public instructions key already exists in the device and is different from that of the owner attempting to initialize the device, the device assumes that the manufacturer has sold the device to another entity. Because each device will have at most one primary owner, ownership of that device will be determined by the presence or absence of an owner's public instructions key 261 inside the device 260, in lieu of (or in addition to) the prior concept of an owner's certificate.

Figure 27:
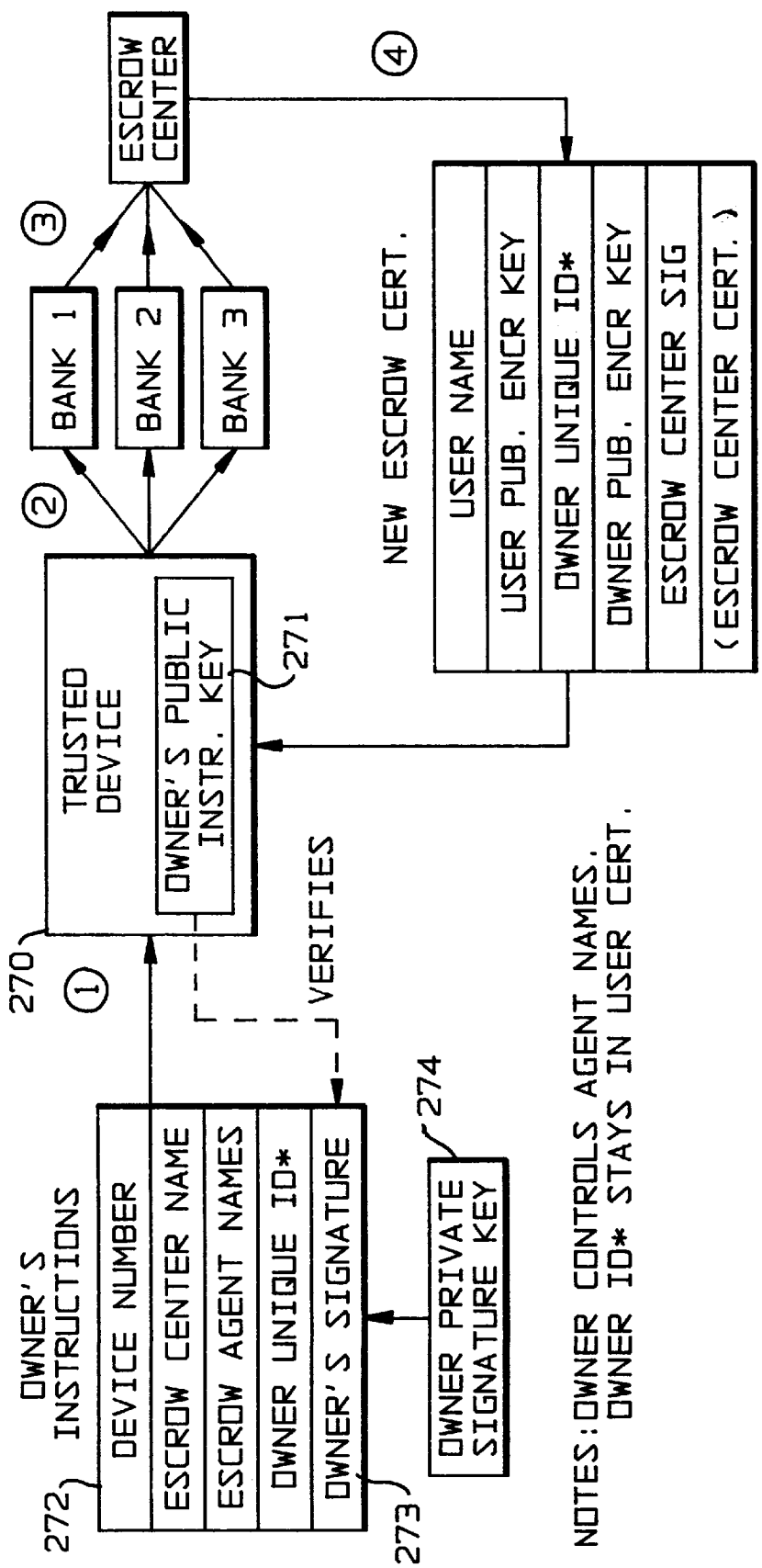
FIG. 27 is a flowchart showing the steps of a method for a rekeying process controlled by an owner.

If no owner public instructions key is installed, the device is considered to be a single-user consumer device that is unrestricted with regard to rekeying or ownership transfer of the device; as such, the device will consider the non-existence of an installed owner's key as a signal to obey the user's instructions without invoking the rekey, reescrow and ownership transfer rules discussed above. If an owner public instructions key 271 has been installed within the trusted device 270, as shown in FIG. 27, then user rekey, re-escrow and ownership transfer instructions 272 will not be processed unless those instructions are signed 273 by the corresponding owner private signature key 274. Once the owner's signature 273 has been verified, the trusted device 270 performs the steps of the re-escrow procedure, as described previously. Thus, the owner need not append an owner's certificate proving his ownership of a given numbered device when instructing that device. However, the owner's signed instructions must of course be limited to a numbered device or perhaps to some class of devices whose device numbers conform to a given rule or template, in order to prevent the instructions from being fed into every device owned by that owner.

Figure 28:
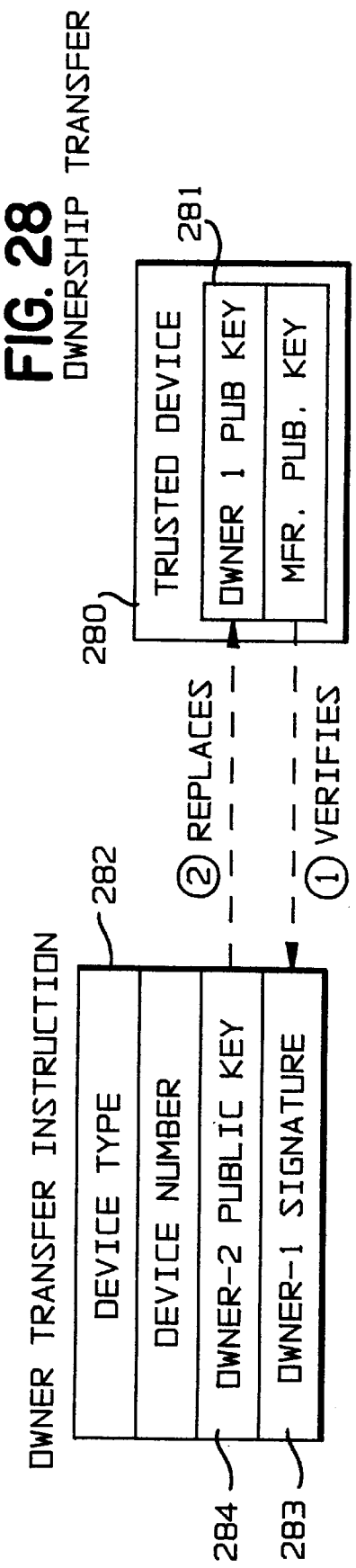
FIG. 28 is a flowchart showing the steps of a method for transfer of ownership.

In addition, as shown in FIG. 28, the owner can send an instruction to transfer device ownership by replacing the originally-installed owner public instructions verification key with another (from the buyer, the new owner of the device). The device owner sends an ownership transfer instruction 282 to the device 280, including the new owner's name and public instructions verification key, signed using the current owner's private instructions signature key 283. The device verifies the ownership transfer instruction 282 using the current owner's public instructions key 281, replaces that key with the new owner's public instructions key 284 and thereafter responds to instructions only from the new owner. In addition, the owner could also add another "secondary owner" by installing a second public instructions key. This second public instructions verification key would have a "rights" field, indicating for which operations it is authorized to accept instructions. Among those rights might be: rekey, addition of another owner, deletion of an owner (same as a conditional sale), deletion of all owners, and reverting back to a consumer device having no stated owner. However, these defined rights may include more or fewer rights than, or the same amount of rights as, the original or primary instructions verification key, including the right to replace or remove the primary owner instructions key.

Generalized Device Registration

Note that the foregoing general methods for escrowing a private decryption key and receiving an escrow certificate can also be applied to the more general case of registering a trusted device with a trusted third party and receiving an authorization from that third party enabling the device to communicate with other trusted devices, not necessarily limited in scope or purpose to the key escrow situation. In this general process, depicted in FIG. 24, a programmable trusted device 240 that communicates with a trusted third party (TTP) 241 is equipped with a private signature key and a manufacturer's certificate 242 for the corresponding public signature key. It also contains secure copies of the manufacturer's and systemwide (or global) authority's (SWA) public keys, which could be the same, and secure system-level firmware that can support the remote installation of additional application-level firmware and related public keys, as discussed elsewhere in this disclosure. The device 240 can register with any one of a potentially unlimited number of TTPs 241 that are admitted into this general registration system by having been issued a certificate of authority 243 signed by the SWA (the SWA could also appoint an additional tier of certifiers to authorize TTPs to be admitted to the system, in accord with well known principles of public key certification hierarchies). Once users have registered their devices with a given TTP, they can then engage in specialized transactions with other trading partners.

In the first step of this process, the user initiates a request 244 to register his device 240 with a given certified TTP 241. This request 244 contains some information 245 to identify the user and the nature of the registration request and is signed by the device and accompanied by the manufacturer's device certificate 242 in order to vouch for the signature and the known type of the device. The selected TTP 241 may also request other information and assurances from either the user or from other parties to verify the user's identity, affiliation, creditworthiness, etc., which are outside the scope of this protocol but may influence the TTP's decision to grant or deny the desired authorization to perform transactions. The TTP 241, using the appropriate public keys, verifies the manufacturer's signature on the device certificate 242 and the device signature on the information 245 in the user's registration request 245.

When satisfied that the user can be permitted to engage in the requested class of transactions, the TTP 241 then issues a response 246 containing a certificate 247 specifically authorizing the device to perform those transactions on behalf of the user. The TTP's device authorization certificate 247 will typically contain information identifying the TTP, the user, the user's device, and the transactions for which permission is granted, as well as a recertified copy of the user's device public signature key as a matter of convenience (and as later discussed) so that the user need not submit his device certificate 242 in each subsequent transaction with trading partners. The TTP response 246 may also contain downloadable firmware and or public keys 248 to be loaded into the user's trusted device to enable it to perform the authorized transactions. Where the TTP response 246 calls for the user to securely load new firmware or public keys into his device, the response 246 will also include the TTP's certificate of authority 243 issued by the SWA certifying the TTP's public signature key and conveying firmware and public key upgrade authority. When the user's trusted device 240 receives the TTP's response 246, it uses its embedded SWA public signature key to verify the TTP's certificate of authority 243 and uses the TTP public signature key contained therein to verify the firmware and public key upgrades 248 and the TTP's device authorization certificate 247.

Referring again to FIG. 24, when the user wishes to perform a transaction with a trading partner 250, its device will formulate the transaction data 249 in accord with the rules embodied in the firmware program installed on the device (either at time of manufacture or upon subsequent downloading), as has been extensively discussed throughout this disclosure, and will sign the transaction 249 and attach a certificate for its corresponding public key. This certificate could be the manufacturer's device certificate 242 but will more likely be the TTP's device authorization certificate 247, which contains a copy of the device public key recertified for convenience. The trading partner 250 will typically utilize the public key of the TTP to verify the TTP's signature on its device authorization certificate 247 and then use the device public signature key contained therein to verify the device's signature on the transaction 249, thereby confirming the device's compliance with the transaction protocol requirements imposed by the relevant firmware. In the event that the trading partner 250 does not already have the specific TTP's public signature verification key, the user can include in his transaction 249 the TTP's SWA certificate of authority 243, which the trading partner can verify using the SWA public key, which it must already possess in order to be a participant in this system.

The generalized process thus far described is general enough to allow (a) the escrowing of a private encryption key in return for an escrow certificate signed by an escrow center (TTP), where the information contained or implied in the user device certificate conveys to the escrow center that the device is already equipped with firmware that is capable of performing the specialized functions of the herein-described key escrow encryption system, or (b) if such device is not so equipped but is capable of becoming so equipped, the downloading of a secure software upgrade that upon installation will enable the device to fulfill the escrow system transactional requirements. The transaction data 249 sent to the trading partner 250 can be an encrypted message prefixed by a message control header and accompanied by an authorization 247 (the user's escrow certificate), as issued by a TTP 241 (the master escrow center).

The generalized system of FIG. 24 therefore possesses many highly desirable properties which can facilitate complex forms of business and government transactions in open communication network environments. In particular, there can be many different device manufacturers, as long as each participating device is able to execute secure multi-step transactions, download firmware to perform additional types of secure multi-step transactions, and sign the transactions so created. Also, there can be any number of trusted third parties, each issuing a different type of transactional authorization and each creating and certifying a different class of firmware application, such as key escrow, digital cash management, car rental or user medical records management. Thus, although a trading partner may be required (by the user device's firmware and protocols) to utilize a comparably equipped trusted device, that device may be made, issued and equipped by different parties than those of the original user, yet the original user's transactions will still be accepted and processed in accord with the system rules, so long as the partner possesses a copy of the SWA public signature verification key 247, which enables all versions of the devices and their programs to recognize each other and work together, if so certified by the SWA and its TTPs. Some examples of business purposes that can be fulfilled by this protocol include systems that enforce transactional requirements for (a) encryption using provably escrowed keys, (b) management of digital representations of cash or other high-value documents, and (c) access to and use of medical or other personal information of the user.

Unique Owner Identification Number

Depending on the need to balance ease of use with privacy rights, the unique owner identification number may also optionally appear in either (a) the user's escrow certificate or (b) MCHs issued during normal communications, as well as in the key split messages to escrow agents. It would be desirable for an investigator attempting to decrypt communications to be able to determine by looking at a MCH containing the owner identification number whether one or both of the devices involved in the communication from which the MCH was taken belong to a given owner. However, other privacy interests, including those of certain owners, might suggest that the owner identification number be omitted from the MCH in order to enhance the privacy of communications. In cases in which the owner identification number is included only in the device escrow certificate and not in the MCHs of communications, an investigator, hired by a particular employer in an attempt to determine whether a particular communication originated from employees of that employer, confronted with many MCHs that have no listed device owners, would inquire of a master escrow center listed in a given MCH whether that MCH originated from a device owned by the employer. The master escrow center would decrypt the certificate number of the party to the MCH communication whose keys are escrowed with that master escrow center and check whether that user certificate was issued to the investigator's employer. If so, and if the investigator's request is signed using the employer-owner's signature key (i.e., the investigator has authorization from the employer-owner to investigate), the master escrow center would reveal this information. If the investigator has no authorization, the investigator would then be required to seek a warrant or court order to investigate suspicious activity reflected in MCHs of unknown device owners. It is anticipated that most device owners will not object to being openly named in their user's escrow certificates and MCHs, because in most electronic communications systems it is impractical to suppress the physical and logical network address information that often strongly identifies the sending and receiving institution of a given message. Thus, little is lost by publicizing the unique owner identification numbers, and much is gained by providing the ability to quickly sift and sort messages by sender device owner and recipient device owner names.

The unique owner identification number may, however, still be included within the employee's escrow certificate or within the MCHs of communications without being publicized. The employee's escrow certificate and MCHs would include an Employer Public Encryption Key along with the other keys as described above. These keys would normally be present in both the sender's and recipient's escrow certificates (assuming that both sender and recipient have employers). When the sender's device forms the MCH, it will incorporate into the MCH one or both employer unique identification numbers, each encrypted using the public encryption key of the respective employer so that, in effect, the sender's device uses the MCH to send to each employer-owner a message consisting of that respective employer-owner's own unique ID that only it can decrypt. This method is similar to that discussed above regarding the sender's use of the MCH to send the certificate numbers of both the sender and recipient encrypted under the public encryption keys of their respective escrow centers, and to send the message session key to the recipient (the MCH's normal function) as well as to the sender in order to allow tapping of both parties. This technique allows the employer to readily determine which MCHs belong to its employees, while avoiding a situation in which all messages belonging to the owner-employer's employees are readily identifiable in the message traffic flow and in which owner ID numbers are unencrypted and readily obtainable.

Still, this approach has the drawback that the unique employer identification number encrypted using the employer public encryption key will always produce the same, and thus recognizable, value. A better implementation of this approach would be to encrypt a data block containing a current timestamp (or another random number) along with the employee's escrow certificate number (which the employer clearly has the right to know) under the employer's public key, so that the timestamp would give high variability to the encrypted data block. Several bytes of a distinct "eyecatcher" text, such as "EMPL" (or possibly the employer's unique ID, space permitting) could also be included inside the encrypted block in order to make successful decryption obvious to an entity that is decrypting the field (in case the other data items are in binary, in which case one might not know for sure). In this case, proof of the employer's ownership consists of the employer merely being able to read this field. In addition, yet another random number could be added to the data block for increased variability, in case the timestamp is not sufficiently trusted to be different each time and to therefore make all employer MCH data blocks unique.

This improved approach, which would be done for the employers of both the sender and recipient with every message that is sent, would make it possible for employers and other sponsors to determine which communications were generated or received by their employees without having to submit the encrypted MCH for every communication to the appropriate escrow center for a determination as to whether or not any of those communications originated from a device owned by that employer, thus probably saving a considerable amount of money. Each employer will still have to contact the master escrow center and the escrow agents, as before, in order to obtain its employee's private encryption key, and must prove that it is in fact the owner of the employee's device by signing its requests with the private signature key that matches the public signature verification key contained in its owner certificate as issued by the device manufacturer. At least the employers will be spared the time, effort and expense of any additional requests to those parties regarding the MCHs of communications originating from what later turn out to be non-owned devices. And, as before, if an employer suspects criminal or other improper activity in messages accompanied by MCHs from communications by non-owned devices, the employer can always contact an appropriate law enforcement agency, tell that agency why it suspects criminal activity and have that agency go to court to obtain a warrant for interception and/or decoding of those communications, which appear to be originated by third party non-employee criminals or, more likely, by individuals on the employer's premises, whether employees or not, who are using encryption devices not owned by and registered to the employer.

This method of placing information in the MCH encrypted so that the information can be read only by the party entitled to read it can obviously be extended to parties in addition to the sender and recipient (each of whom can decrypt the message session key), each party's master escrow center (each of which can decrypt its respective user's certificate number), and each party's employer-owner (each of whom can decrypt its employee's certificate number or its own unique owner identification number, so as to ascertain whether it owns the communicating device without having to contact anyone else, while avoiding being identified on every message). This can also be extended to other parties such as divisions within a very large company or, for example, local law enforcement in certain foreign nations that have no warrant requirements. Of course, all the information encrypted under these keys could also be shown in the clear, i.e. unencrypted, as discussed earlier, providing that these parties have no objections to being openly named and routinely identifiable on every message. This information can also be omitted whenever a party is irrelevant, for example when a user has no employer. The simplistic approach-would be to use one MCH format for all situations, leaving fields blank when inapplicable. Otherwise, the preferred embodiment would be to utilize various different MCH formats within the same system, each format being identified by a unique version number in the first field, such that each device processing a MCH would be able to determine which fields to expect and parse the MCH accordingly. This method would allow for an indefinite nesting of interested parties in the MCH, which would be the most flexible possible system. The computational overhead would depend mainly on how many of those fields actually had to be encrypted under each respective party's public encryption key.

An employer can more easily control the information that is included in the MCH by accompanying each entry with a "policy field" or an instructions code containing code instructing the employer's device as to what information to include in the MCH. As before, the instructions code could include elements of choice giving the employer options of including the following information: (1) the employer's name and unique identification number, either encrypted or using an alias; (2) the word "employer" unencrypted, with the employer's unique identification number encrypted inside a MCH field; (3) the user certificate number in an encrypted field; (4) the message session key in an encrypted field; (5) a timestamp in an encrypted field; and (6) a random confounder number within any of the other encrypted fields. Many of these options can be in effect simultaneously. In addition, these policy options would be the same for all members of the community of interest, including the parties to the communication themselves, thereby allowing the parties to be labeled by their mail or system IDs or simply by using the word "sender" or "receiver" in the relevant clear MCH fields.

Multiple Simultaneous Escrowed Keys

In addition to the above-described features for upgrading device firmware routines and for replacing manufacturer's public keys, the trusted device of the present invention should also have the ability to maintain and manage several sets of escrowed encryption keys simultaneously. Normally, when the device begins the cycle of rekeying, i.e., generating and escrowing a new private decryption key, and as a result receives an escrow certificate for the corresponding new public encryption key, the device will erase the previous private key in order to force reliance of the device on the newly escrowed private key. Alternatively, the device could retain the previous private key for only a short time as needed, e.g. for the time needed to recover data encrypted into data storage using the previous private encryption key. However, in an alternate embodiment, the device may also accept and process a re-escrow instruction, either from the user or from the device owner as described above, to create a second valid escrow certificate concerning the same private/public encryption key pair. In this embodiment, the device would proceed with the escrow process using quite possibly a different list of escrow agents and a different master escrow center, and would receive a different, equally valid escrow certificate for the same public/private encryption key pair that is signed and issued by the second master escrow center and can be used interchangeably with the first escrow certificate. This second public encryption key certificate can be of use in cases in which the device's user travels internationally or corresponds with parties located in other countries, especially when those other nations may desire to conduct lawful surveillance of communications originating or terminating in that other nation. In such cases, by re-escrowing the same device key in another nation, the user (or the user's employer) could help to satisfy possible legal requirements in that other nation, while still allowing the user or employer the convenience of doing business with the original set of escrow agents in his own nation (lawful owner monitoring, recovery of lost key, etc.). Then, in order to allow the owner to track its employees' MCHs, it may be enough if the sender and recipient owner IDs appeared in each MCH, thus telling the owner that it does indeed-have the ability to obtain the key. To save time and effort, the owner may then send such an MCH to the foreign master escrow center to obtain the foreign escrow certificate number, the underlying device number and the underlying device certificate, but then apply to its domestic escrow agents who can verify the owner's certificate already in their possession and release the actual private key splits. This procedure relieves the device owner of any extra legal formalities that might be required in order to obtain the actual key splits from the foreign escrow agents.

National Security Export Safeguards

The current policy of the United States government is to allow unregulated use of encryption within the United States by American citizens but to impose heavy restrictions and penalties for the export of encryption devices, software or know-how. It is possible to modify the present system to allow relatively free private use of cryptographic devices in the United States while simultaneously imposing restrictions on their international use. Such a system could allow separate inter-operable "policy domains" that are open to all software-and hardware vendors with minimal or no design changes to the standard message formats used throughout the system. It is further desirable to allow the use of private escrow agents in purely intra-corporate, single country situations, in which the key escrow system is being used solely to allow a particular corporation to monitor and control its own employees' uses of encryption, without any obligation, express or implied, to facilitate law enforcement access to communications that have been encrypted using keys the corporation has escrowed. In particular, such companies might buy the software and hardware for their own use but might decline to assume any public duty to provide access to private keys in short time frames, as might be desired by law enforcement in hot pursuit of criminals or terrorists.

This can be done by first assuming that all devices throughout the system are linked directly or indirectly to a system-wide authority (SWA) that (as previously disclosed) issues certificates to escrow agents, master escrow centers and device manufacturers in order to enable each to be recognized by devices within the system as being authentic and trustworthy. A national or global communications system must for practical purposes support the existence of multiple and unrelated master escrow centers and agents, each of which must be certified by the SWA as being authentic. In each certificate issued to a master escrow center or to an escrow agent, the SWA will designate it as either "public" or "private." A "public" master escrow center or escrow agent is one that is equipped and committed to respond promptly to national security or law enforcement warrants and subpoenas. Users whose keys are escrowed with such agents may be permitted to engage in transborder communications. A "private" master escrow center or escrow agent includes those single-company or single-country key centers that have installed key escrow system technology for their own use but do not undertake any commitment to a public level of service. The certificate from the SWA to the master escrow center or escrow agent will also include a country code. Then, each user's escrow certificate that is issued and signed by a master escrow center and has the master escrow center SWA certificate attached will also carry the user's country code. Note that, as a matter of convenience, the user's escrow certificate should also state that it originates from either a public or non-public escrow agent, although it may not be possible for the SWA to enforce the correctness of that information. This could allow the device to enforce these rules even more easily than always requiring the master escrow center's SWA certificate.

FIGS. 29 and 30 show the enforcement of the escrow requirement when sending and receiving international cryptographic communications. As shown in FIG. 29, the trusted device 290 of the sender enforces this system by requiring the escrow certificates 291,293 of both the sender and the recipient, and, if the sender and recipient are not escrowed with the same master escrow center, their master escrow center SWA certificates 292,294, prior to sending an international communication. The country codes 295,296 of the recipient user and its master escrow center must match in order for a sending device 290 to send a communication. Furthermore, if the sender and recipient are in different countries 295,297 and if either user is using a non-public master escrow center 298,299, the sending device will refuse to originate a communication to that recipient. As shown in FIG. 30, the recipient trusted device 300 will also enforce this system by refusing to decrypt a communication, if one is somehow originated, in which the sender and recipient are in different countries and if either user is using a non-public master escrow center. These rules will effectuate the desired policy of disallowing unescrowed international cryptographic communications, because the master escrow center cannot falsify its public status, which is certified by the SWA, and, even if the master escrow center could falsify the user's country code (to make the user appear to belong in a foreign domain), the devices will not allow a discrepancy between the user's and the master escrow center's country codes. Although these rules do not prevent a user from improperly transporting his trusted encryption device across national boundaries, they do allow easy compliance with national requirements by permitting him to maintain an escrowed key in each nation and to communicate using only the proper key in each policy domain.

Multi-User Device Versions

Another feature of this invention is the ability to initiate and simultaneously manage several different sessions of communications with different local or remote users using the same device. Many larger computers support multiple users who are often simultaneously logged on via terminal sessions but who may wish to initiate encrypted sessions with other entities around the world. However, because it would be highly inefficient to require a separate trusted device for each user session on a shared computer, the trusted device could track the message session key for each communication by storing it along with a unique message sequence number (MSN) for that session. Then, when any additional message packets bearing that MSN arrive, they could be decrypted, and responses encrypted, without delay. Furthermore, the device could escrow the private decryption keys of several users while linking each user private key with a particular user unique identification number and allowing each key to be used only on presentation of some suitable user authentication, such as a password, smart card, PIN, biometric, challenge response, etc. By assigning a user identification number and password or the equivalent to each public/private key pair as it is generated for escrow, the usual controls on passwords, such as length, expiration, retry lockouts and ease of guessing, could then be imposed by the device in order to limit the possibility of unauthorized access.

Thus, a cryptographic system and method with key escrow feature is provided. One skilled in the art will appreciate that the present invention can be practiced by other than the described embodiments, which are presented for purposes of illustration and not limitation, and the present invention is limited only by the claims that follow.

What is claimed is:

1. A method of upgrading firmware of a trusted device, comprising the steps of:

receiving a communication of firmware at a trusted device;

confirming the source of said communication using a key embedded in said trusted device, said key being a key associated with a firmware source; and incorporating the firmware into the trusted device contingent upon the firmware source being confirmed;

wherein the key embedded in the trusted device is a public signature verification key of a trusted entity and wherein said confirming step includes a step of:

verifying, using the public signature verification key of the trusted entity, that the communication includes an upgrade certificate signed using a private signature key of the trusted entity; and wherein the upgrade certificate includes a public signature key of the firmware source.

2. The method of claim 1, wherein said confirming step further includes a step of verifying, using the public signature verification key of the firmware source, that the communication has been signed using the private signature key of the firmware source.

3. The method of claim 2, wherein the trusted entity is a manufacturer of the trusted device and wherein the firmware source is a trusted third party.

4. The method of claim 3, wherein the communication of firmware includes a public signature verification key to be embedded in the trusted device's firmware.

5. The method of claim 1, wherein the communication of firmware includes a public signature verification key for a trusted third party.

6. The method of claim 5, wherein the communication of firmware further includes information identifying transactions that may be performed by the trusted third party.

7. The method of claim 6, wherein the trusted third party is authorized to replace a public signature verification key of the firmware source.

8. The method of claim 7, wherein the firmware source is a manufacturer of the trusted device.

9. A method of upgrading firmware of a trusted device, comprising the steps of:

receiving a communication of firmware at a trusted device; and confirming the source of said communication using a key embedded in said trusted device, said key being a key associated with a trusted entity;

wherein said confirming step includes the steps of:

verifying that the communication includes an upgrade certificate signed using the private signature key of the trusted entity, wherein the upgrade certificate includes the public signature key of the firmware source; and verifying, using a public signature verification key of the firmware source, that the communication has been signed using a private signature key of the firmware source;

incorporating the firmware into the trusted device contingent upon the firmware source being confirmed.

10. The method of claim 9, wherein the communication of firmware includes a public signature verification key for the trusted entity.

11. The method of claim 10, wherein the trusted entity is a manufacturer of the trusted device.

12. A method of upgrading firmware of a trusted device, comprising the steps of:

embedding a public signature verification key of a trusted entity in the trusted device;

issuing a certificate for a cryptographic key of a third-party firmware source;

receiving a communication of firmware of the firmware source at the trusted device;

using the public signature verification key of the trusted entity to authenticate the certificate;

authenticating the firmware source using the key of the certificate; and incorporating the firmware into the trusted device contingent upon the firmware source being confirmed.

13. The method of claim 12, wherein the trusted entity is a manufacturer of the trusted device and wherein the firmware source is a trusted third party.

14. The method of claim 13, wherein the communication of firmware includes a public signature verification key to be embedded in the trusted device's firmware.

15. The method of claim 12, wherein the communication of firmware includes a public signature verification key for a trusted third party.

16. The method of claim 15, wherein the communication of firmware further includes information identifying transactions that may be performed by the trusted third party.

17. The method of claim 16, wherein the trusted third party is authorized to replace a public signature verification key of the firmware source.

18. The method of claim 17, wherein the firmware source is a manufacturer of the trusted device.

* * * * *